US012707285B2

(12) United States Patent
Hotchkiss et al.

(10) Patent No.: US 12,707,285 B2
(45) Date of Patent: Aug. 11, 2026

(54) NETWORK OPERATION CENTER DASHBOARD FOR CLOUD-BASED WI-FI AND CELLULAR SYSTEMS

(71) Applicant: Plume Design, Inc., Palo Alto, CA (US)

(72) Inventors: Adam R. Hotchkiss, Richardson, TX (US); Yoseph Malkin, San Jose, CA (US); Ali Wahid, Atlanta, GA (US); William J. McFarland, Portola Valley, CA (US); Manikanden Balakrishnan, San Mateo, CA (US)

(73) Assignee: PLUME DESIGN, INC., Palo Alto, CA (US)

(*) Notice: Subject to any disclaimer, the term of this patent is extended or adjusted under 35 U.S.C. 154(b) by 916 days.

(21) Appl. No.: 17/948,458

(22) Filed: Sep. 20, 2022

(65) Prior Publication Data

US 2023/0020832 A1 Jan. 19, 2023

Related U.S. Application Data

(63) Continuation-in-part of application No. 16/897,371, filed on Jun. 10, 2020, now Pat. No. 11,937,101, (Continued)

(51) Int. Cl.
*H04W 24/02* (2009.01)
*H04L 41/0253* (2022.01)
(Continued)

(52) U.S. Cl.
CPC ......... *H04W 24/02* (2013.01); *H04L 41/0253* (2013.01); *H04L 41/12* (2013.01); (Continued)

(58) Field of Classification Search
CPC ..... H04W 24/02; H04W 16/18; H04W 16/00; H04W 36/0083; H04W 88/18; (Continued)

(56) References Cited

U.S. PATENT DOCUMENTS

| | | | |
|---|---|---|---|
| 10,178,578 | B1 | 1/2019 | McFarland et al. |
| 10,299,405 | B2 | 5/2019 | Chang et al. |

(Continued)

FOREIGN PATENT DOCUMENTS

| | | | |
|---|---|---|---|
| CA | 3016072 | A1 | 9/2017 |
| CA | 3083495 | A1 | 10/2019 |

(Continued)

OTHER PUBLICATIONS

Feb. 14, 2019, International Search Report for International Application No. PCT/US2018/055263.

*Primary Examiner* — Brian T Le
(74) *Attorney, Agent, or Firm* — Nicholas Martin; Greenberg Traurig, LLP

(57) ABSTRACT

System and methods for managing a Wi-Fi network of a plurality of Wi-Fi networks from a cloud-based Network Operations Control (NOC) dashboard are provided. A method, according to one implementations, includes the step of obtaining Wi-Fi metrics and cellular metrics from a network. The method also includes the step of displaying a dashboard on a user interface for use by a support agent at a Network Operations Center (NOC). Also, the method includes the step of displaying both the Wi-Fi metrics and the cellular metrics on the dashboard.

18 Claims, 52 Drawing Sheets

Related U.S. Application Data which is a continuation of application No. 15/782,912, filed on Oct. 13, 2017, now Pat. No. 10,687,227.

(51) Int. Cl.

| | |
|---|---|
| ***H04L 41/12*** | (2022.01) |
| ***H04L 41/14*** | (2022.01) |
| ***H04L 41/147*** | (2022.01) |
| ***H04L 41/22*** | (2022.01) |
| ***H04L 43/045*** | (2022.01) |
| ***H04L 43/0876*** | (2022.01) |
| ***H04L 43/0882*** | (2022.01) |
| ***H04L 43/0888*** | (2022.01) |
| ***H04L 43/0894*** | (2022.01) |
| ***H04W 84/12*** | (2009.01) |

(52) U.S. Cl.

CPC .............. *H04L 41/14* (2013.01); *H04L 41/22* (2013.01); *H04L 43/045* (2013.01); *H04L 43/0876* (2013.01); *H04L 41/147* (2013.01); *H04L 43/0882* (2013.01); *H04L 43/0888* (2013.01); *H04L 43/0894* (2013.01); *H04W 84/12* (2013.01)

(58) Field of Classification Search

CPC .. H04W 40/24; H04W 84/12; H04L 41/0823; H04L 41/0253; H04L 41/22; H04L 41/12; H04L 41/122; H04L 41/34; H04L 41/342; H04L 41/344; H04L 41/40; H04L 41/14; H04L 41/149; H04L 41/147; H04L 41/0233; H04L 41/085; H04L 41/06; H04L 43/0811; H04L 43/00; H04L 43/045; H04L 43/0876; H04L 43/0882; H04L 43/0888; H04L 43/0894; H04L 45/02; H04L 67/75; G06F 11/1446; G06F 11/32

See application file for complete search history.

(56) References Cited

U.S. PATENT DOCUMENTS

| | | | | |
|---|---|---|---|---|
| 10,341,193 | B2 | 7/2019 | Rengarajan et al. | |
| 10,431,868 | B2 | 10/2019 | Samardzija et al. | |
| 10,431,869 | B2 | 10/2019 | Samardzija et al. | |
| 10,433,194 | B2 | 10/2019 | McFarland et al. | |
| 10,462,929 | B1 | 10/2019 | Su et al. | |
| 10,554,733 | B2 | 2/2020 | Edara et al. | |
| 10,687,227 | B2 | 6/2020 | Rusackas et al. | |
| 10,777,877 | B2 | 9/2020 | Su et al. | |
| 11,109,244 | B2 | 8/2021 | Rengarajan et al. | |
| 11,398,946 | B2 | 7/2022 | Rengarajan et al. | |
| 2012/0259965 | A1 | 10/2012 | Tsuzuki et al. | |
| 2013/0339515 | A1 | 12/2013 | Radhakrishnan | |
| 2014/0328190 | A1* | 11/2014 | Lord .................... | H04W 24/08 370/252 |
| 2015/0327272 | A1 | 11/2015 | Fink et al. | |
| 2015/0341797 | A1 | 11/2015 | Madan et al. | |
| 2015/0382208 | A1 | 12/2015 | Elliott et al. | |
| 2016/0043962 | A1 | 2/2016 | Kim et al. | |
| 2016/0254968 | A1 | 9/2016 | Ebtekar et al. | |
| 2017/0272317 | A1 | 9/2017 | Singla et al. | |
| 2017/0272965 | A1 | 9/2017 | Kumar et al. | |
| 2019/0171259 | A1 | 6/2019 | McFarland et al. | |
| 2020/0358196 | A1 | 11/2020 | Samardzija et al. | |
| 2021/0029559 | A1 | 1/2021 | Agarwal et al. | |
| 2021/0105639 | A1 | 4/2021 | McFarland | |
| 2021/0151875 | A1 | 5/2021 | Samardzija et al. | |
| 2021/0195441 | A1 | 6/2021 | Agarwal et al. | |
| 2021/0195442 | A1 | 6/2021 | Agarwal et al. | |
| 2021/0195443 | A1 | 6/2021 | Agarwal et al. | |
| 2021/0257733 | A1 | 8/2021 | Samardzija et al. | |
| 2022/0102860 | A1 | 3/2022 | Samardzija et al. | |
| 2022/0132400 | A1 | 4/2022 | Agarwal et al. | |

FOREIGN PATENT DOCUMENTS

| | | | |
|---|---|---|---|
| EP | 3985939 | A1 | 4/2022 |
| WO | 2019213513 | A1 | 11/2019 |
| WO | 2019226428 | A1 | 11/2019 |
| WO | 2019236523 | A1 | 12/2019 |
| WO | 2021071627 | A1 | 4/2021 |
| WO | 2021092548 | A1 | 5/2021 |

* cited by examiner

FIG. 7

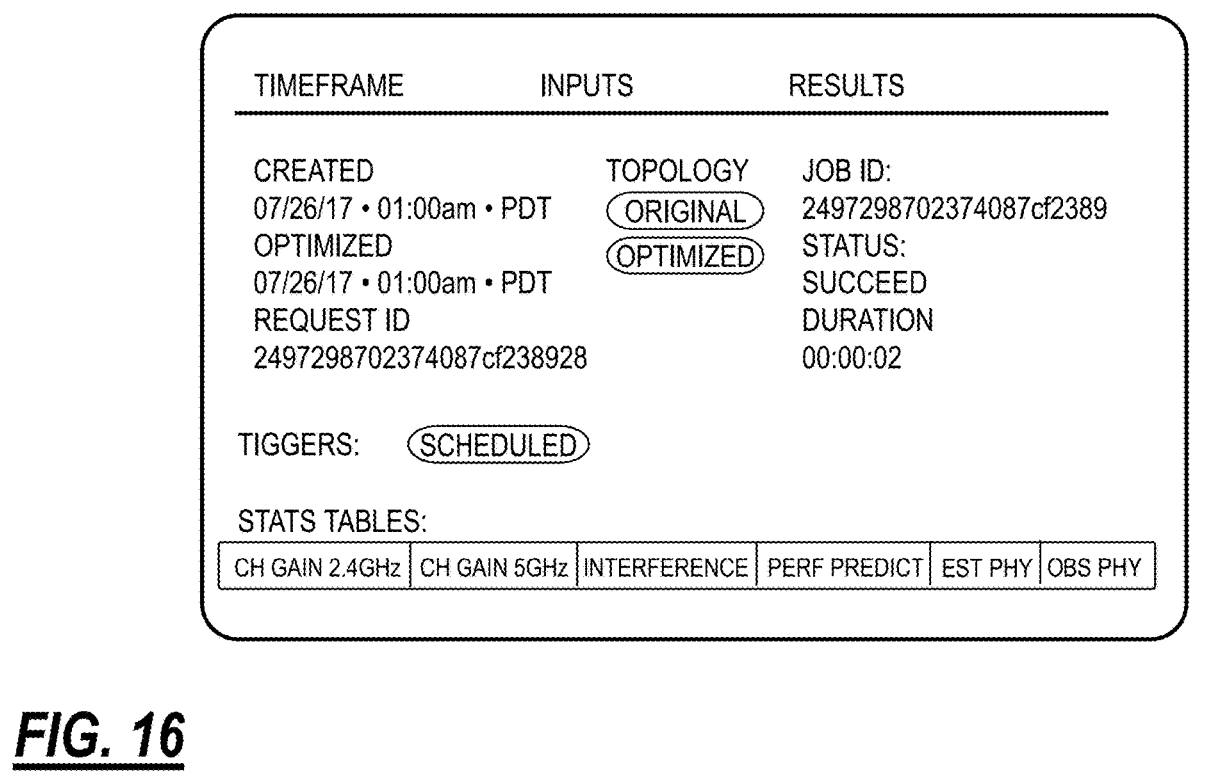

TIMEFRAME INPUTS RESULTS

CREATED
07/26/17 • 01:00am • PDT
OPTIMIZED
07/26/17 • 01:00am • PDT
REQUEST ID
2497298702374087cf238928

TOPOLOGY
ORIGINAL
OPTIMIZED

JOB ID:
2497298702374087cf2389
STATUS:
SUCCEED
DURATION
00:00:02

TIGGERS: SCHEDULED

STATS TABLES:

| CH GAIN 2.4GHz | CH GAIN 5GHz | INTERFERENCE | PERF PREDICT | EST PHY | OBS PHY |
| --- | --- | --- | --- | --- | --- |

FIG. 16

FIG. 18
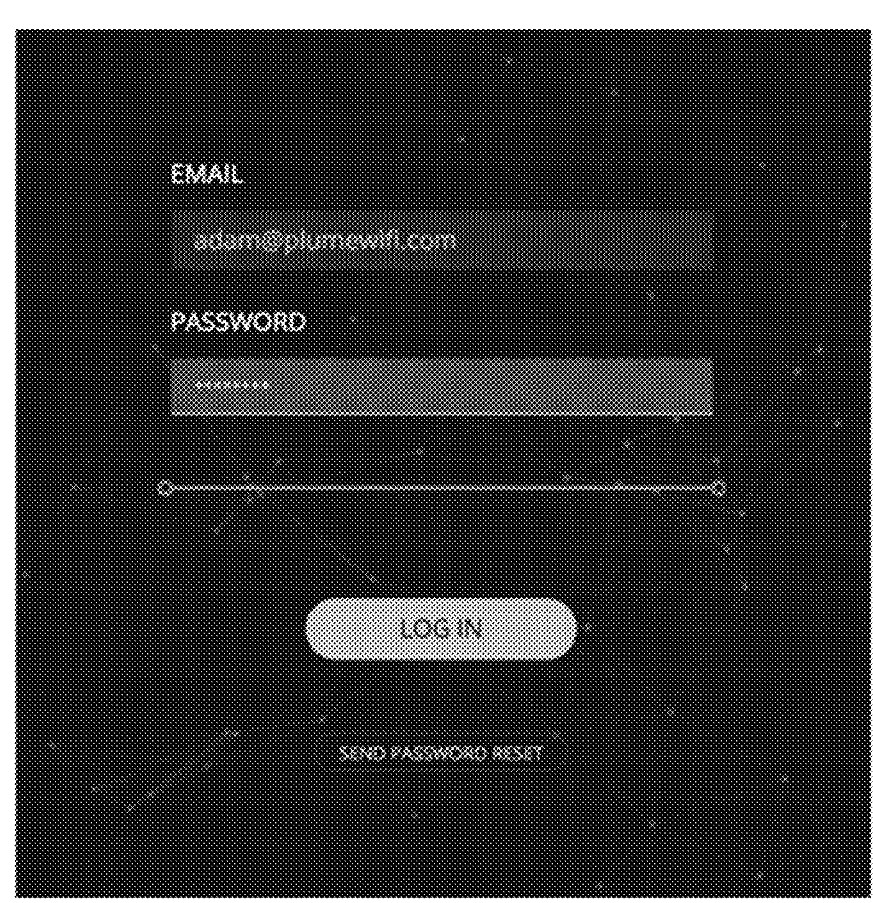
FIG. 19
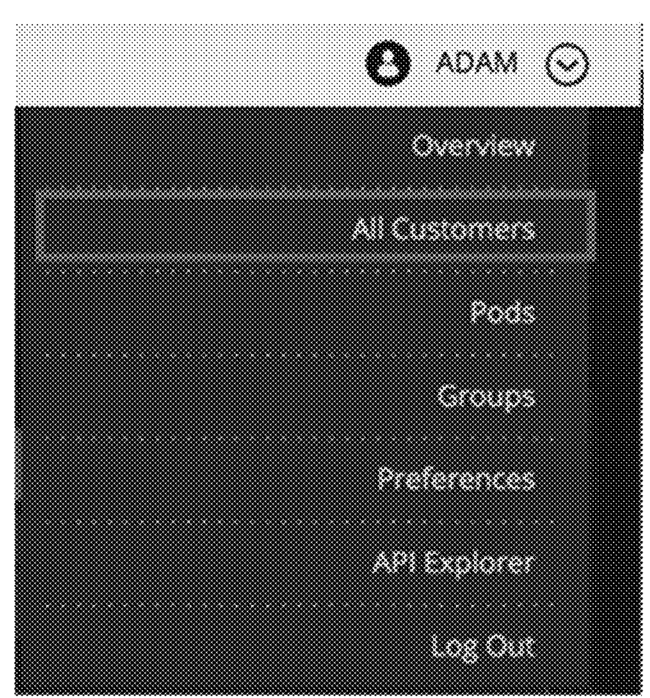

Overview › Account: › Network
PIRANHA NOC
PODS
DEVICES
NETWORK
OPTIMIZER
ACCOUNT
NETWORK CONTROLS
Enter SSID & Passphrase here:
WIFI CONFIG
SSID
PlumeWiFi
SAVE
CANCEL
PSK
EDIT PSK
UTILITIES
Network Mode
BRIDGE MODE
ROUTER MODE PODS
DEVICES
LINKS
NETWORK
ADVANCED SETTINGS
OPTIMIZER
ACCOUNT
WIFI CONFIG
SSID
philpeterson
PSK
EDIT PSK
UTILITIES
Claim Pod
Enter Pod S/N
SUBMIT
Onboarding Status
OnboardingComplete
Reboot Location
REBOOT
Unclaim all pods
Preserve Pack IDs when unclaiming?
UNCLAIM ALL Connected device and channel number Gateway Pod Backhaul link and channel number Pod and overall health status

FIG. 32

FIG. 37
Apple-TV
1
2
4
5
6
8
BAND STEERING
DATA CONSUMPTION
RSSI
COVERAGE ALARMS
BANDWIDTH USAGE

HALLWAY

DEVICE

P1K648140300 Pod ID

60:B4:F7:01:98:24 MAC 1.4-3148010-18-DEV-DEBUG Firmware

EXCELLENT

HEALTH

Score: 4.55

RSSI: -43.63 dBm

RSSI TCP: 470.00 Mbps

Interference: 1.67 %

LAN 10.0.1.28 LAN IP Address

3 Devices 11 2.4Ghz Ch.

WAN

04/21/17·07:44PM·PDT Connected Since

CHANNEL GAINS 2.4GHZ

| | LIVING ROOM | MASTER BEDROOM | KITCHEN | FAMILY ROOM | BASEMENT | STUDY |
|---|---|---|---|---|---|---|
| Living Room | | -80 dB | -71 dB | -83 dB | -79 dB | -72 dB |
| Master Bedroom | -83 dB | | -91 dB | -82 dB | -75 dB | -85 dB |
| Kitchen | -75 dB | -91 dB | | -68 dB | -78 dB | -58 dB |
| Family Room | -82 dB | -91 dB | -69 dB | | -77 dB | -80 dB |
| Basement | -83 dB | -71 dB | -78 dB | -77 dB | | -88 dB |
| Study | -76 dB | -78 dB | -55 dB | -80 dB | -88 dB | |

FIG. 44

INTERFERENCE

| Node ID | Ch. 1 | Ch. 6 | Ch. 11 | Ch. 44 | Ch. 157 |
|---|---|---|---|---|---|
| Living Room | 31.6% | 37.0% | 35.0% | 7.5% | 7.5% |
| Master Bedroom | 47.5% | 42.9% | 42.6% | 7.5% | 7.5% |
| Kitchen | 25.5% | 38.6% | 57.8% | 23.8% | 7.5% |
| Family Room | 27.6% | 40.0% | 58.2% | 7.5% | 7.5% |
| Basement | 22.8% | 32.6% | 53.8% | 7.5% | 7.5% |
| Study | 33.0% | 41.7% | 56.6% | 12.5% | 7.5% |

PERFORMANCE PREDICTIONS

| Node ID | Nickname | 2.4GHz | 5GHz |
|---|---|---|---|
| P1K702192600 | Basement | 74.38Mbps | 87.17Mbps |
| P1K702039300 | Living Room | 31.19Mbps | 54.11Mbps |
| P1K702096400 | Study | 64.28Mbps | 86.69Mbps |
| P1K702283700 | Kitchen | 46.57Mbps | 49.81Mbps |
| P1K702086200 | Master Bedroom | 57.93Mbps | 317.94Mbps |
| P1K702192800 | Family Room | 21.7Mbps | 55.19Mbps |

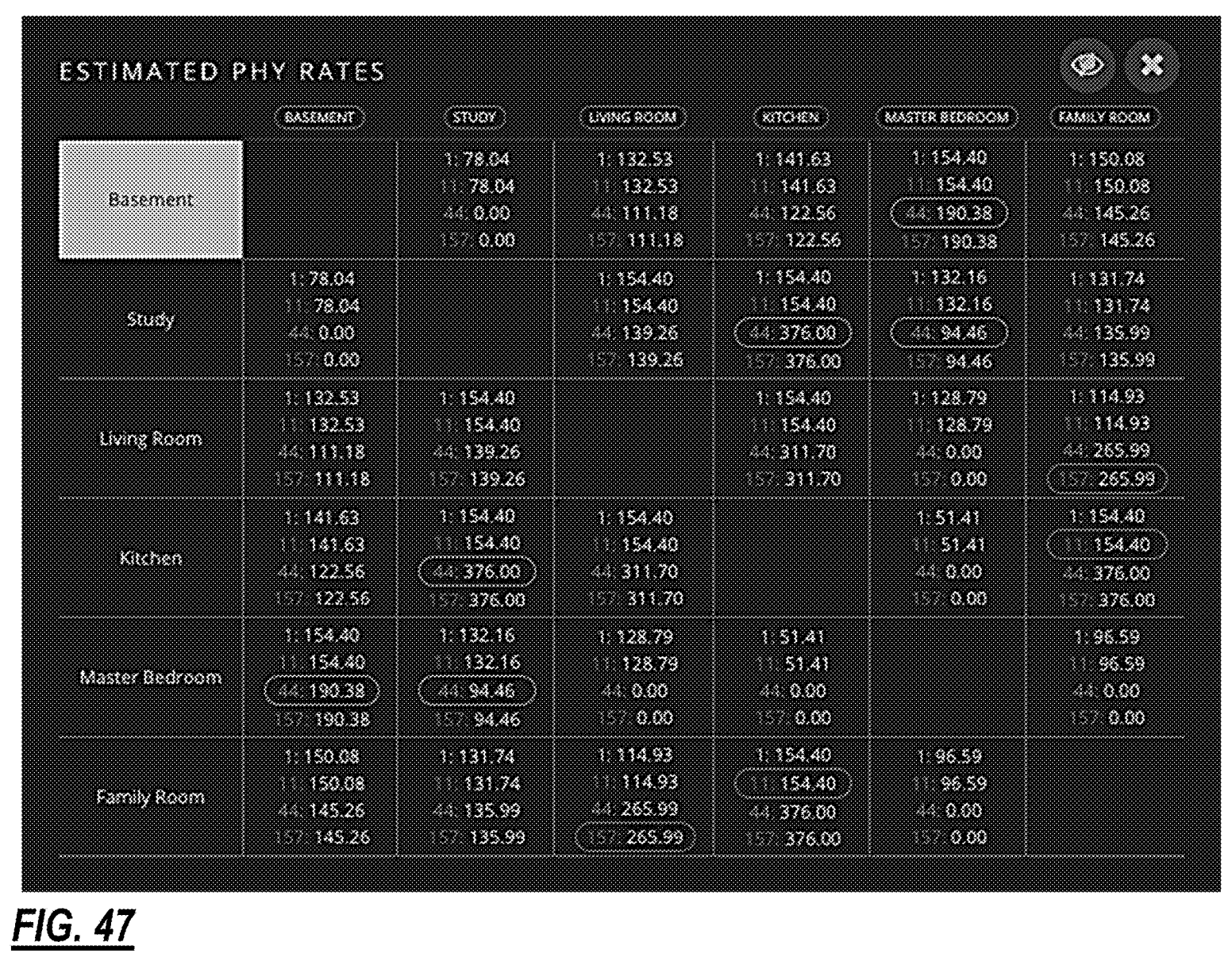

ESTIMATED PHY RATES

| | BASEMENT | STUDY | LIVING ROOM | KITCHEN | MASTER BEDROOM | FAMILY ROOM |
|---|---|---|---|---|---|---|
| Basement | | 1: 78.04<br>11: 78.04<br>44: 0.00<br>157: 0.00 | 1: 132.53<br>11: 132.53<br>44: 111.18<br>157: 111.18 | 1: 141.63<br>11: 141.63<br>44: 122.56<br>157: 122.56 | 1: 154.40<br>11: 154.40<br>44: 190.38<br>157: 190.38 | 1: 150.08<br>11: 150.08<br>44: 145.26<br>157: 145.26 |
| Study | 1: 78.04<br>11: 78.04<br>44: 0.00<br>157: 0.00 | | 1: 154.40<br>11: 154.40<br>44: 139.26<br>157: 139.26 | 1: 154.40<br>11: 154.40<br>44: 376.00<br>157: 376.00 | 1: 132.16<br>11: 132.16<br>44: 94.46<br>157: 94.46 | 1: 131.74<br>11: 131.74<br>44: 135.99<br>157: 135.99 |
| Living Room | 1: 132.53<br>11: 132.53<br>44: 111.18<br>157: 111.18 | 1: 154.40<br>11: 154.40<br>44: 139.26<br>157: 139.26 | | 1: 154.40<br>11: 154.40<br>44: 311.70<br>157: 311.70 | 1: 128.79<br>11: 128.79<br>44: 0.00<br>157: 0.00 | 1: 114.93<br>11: 114.93<br>44: 265.99<br>157: 265.99 |
| Kitchen | 1: 141.63<br>11: 141.63<br>44: 122.56<br>157: 122.56 | 1: 154.40<br>11: 154.40<br>44: 376.00<br>157: 376.00 | 1: 154.40<br>11: 154.40<br>44: 311.70<br>157: 311.70 | | 1: 51.41<br>11: 51.41<br>44: 0.00<br>157: 0.00 | 1: 154.40<br>11: 154.40<br>44: 376.00<br>157: 376.00 |
| Master Bedroom | 1: 154.40<br>11: 154.40<br>44: 190.38<br>157: 190.38 | 1: 132.16<br>11: 132.16<br>44: 94.46<br>157: 94.46 | 1: 128.79<br>11: 128.79<br>44: 0.00<br>157: 0.00 | 1: 51.41<br>11: 51.41<br>44: 0.00<br>157: 0.00 | | 1: 96.59<br>11: 96.59<br>44: 0.00<br>157: 0.00 |
| Family Room | 1: 150.08<br>11: 150.08<br>44: 145.26<br>157: 145.26 | 1: 131.74<br>11: 131.74<br>44: 135.99<br>157: 135.99 | 1: 114.93<br>11: 114.93<br>44: 265.99<br>157: 265.99 | 1: 154.40<br>11: 154.40<br>44: 376.00<br>157: 376.00 | 1: 96.59<br>11: 96.59<br>44: 0.00<br>157: 0.00 | |

FIG. 47

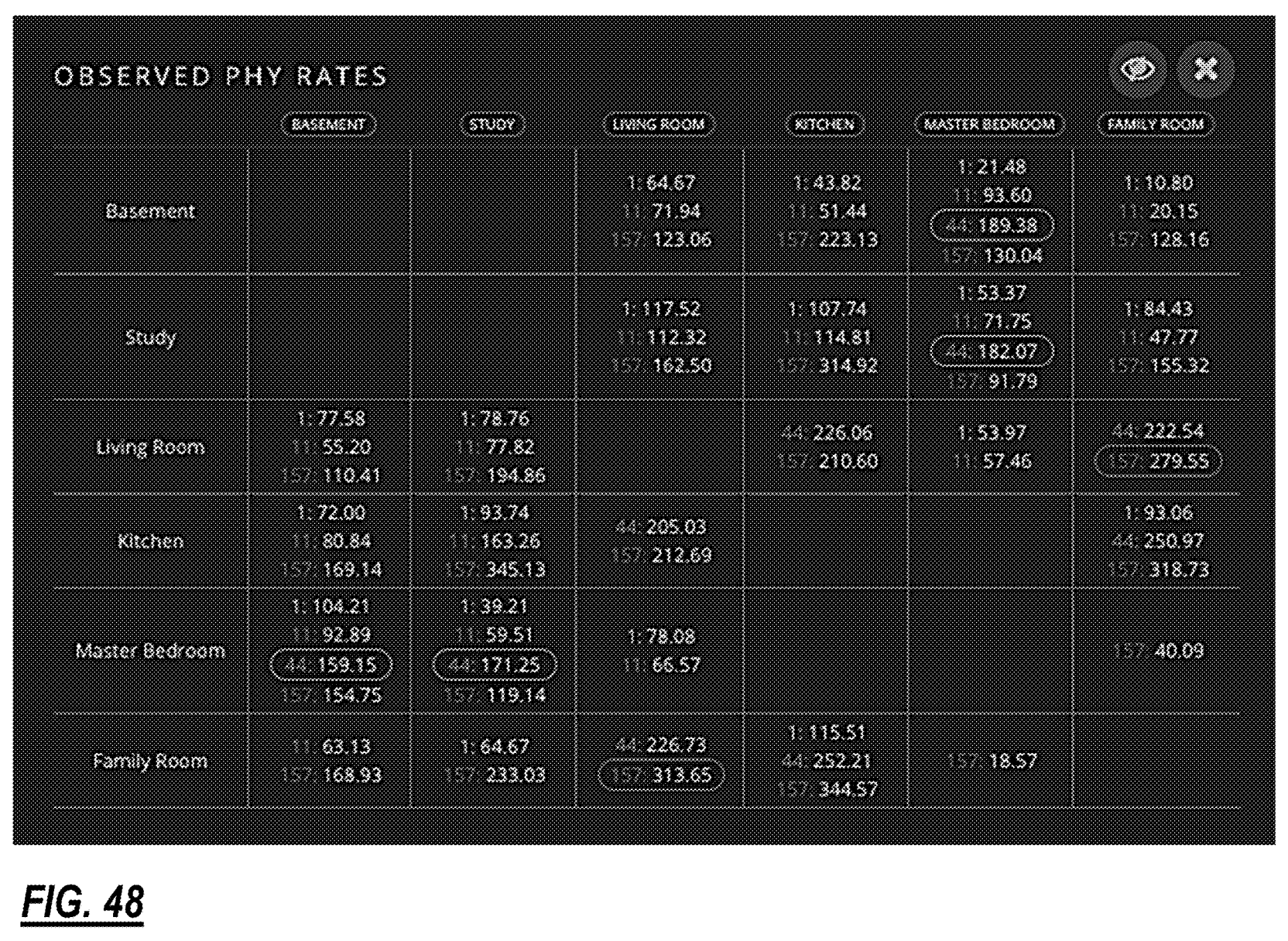

OBSERVED PHY RATES

| | BASEMENT | STUDY | LIVING ROOM | KITCHEN | MASTER BEDROOM | FAMILY ROOM |
|---|---|---|---|---|---|---|
| Basement | | | 1: 64.67<br>11: 71.94<br>157: 123.06 | 1: 43.82<br>11: 51.44<br>157: 223.13 | 1: 21.48<br>11: 93.60<br>44: 189.38<br>157: 130.04 | 1: 10.80<br>11: 20.15<br>157: 128.16 |
| Study | | | 1: 117.52<br>11: 112.32<br>157: 162.50 | 1: 107.74<br>11: 114.81<br>157: 314.92 | 1: 53.37<br>11: 71.75<br>44: 182.07<br>157: 91.79 | 1: 84.43<br>11: 47.77<br>157: 155.32 |
| Living Room | 1: 77.58<br>11: 55.20<br>157: 110.41 | 1: 78.76<br>11: 77.82<br>157: 194.86 | | 44: 226.06<br>157: 210.60 | 1: 53.97<br>11: 57.46 | 44: 222.54<br>157: 279.55 |
| Kitchen | 1: 72.00<br>11: 80.84<br>157: 169.14 | 1: 93.74<br>11: 163.26<br>157: 345.13 | 44: 205.03<br>157: 212.69 | | | 1: 93.06<br>44: 250.97<br>157: 318.73 |
| Master Bedroom | 1: 104.21<br>11: 92.89<br>44: 159.15<br>157: 154.75 | 1: 39.21<br>11: 59.51<br>44: 171.25<br>157: 119.14 | 1: 78.08<br>11: 66.57 | | | 157: 40.09 |
| Family Room | 11: 63.13<br>157: 168.93 | 1: 64.67<br>157: 233.03 | 44: 226.73<br>157: 313.65 | 1: 115.51<br>44: 252.21<br>157: 344.57 | 157: 18.57 | |

FIG. 48

NETWORK OPERATION CENTER DASHBOARD FOR CLOUD-BASED WI-FI AND CELLULAR SYSTEMS

CROSS-REFERENCE TO RELATED APPLICATION

The present disclosure is a continuation-in-part of U.S. patent application Ser. No. 16/897,371, filed Jun. 10, 2020, and entitled "NETWORK OPERATION CENTER DASHBOARD FOR CLOUD-BASED WI-FI SYSTEMS", which is a continuation of U.S. patent application Ser. No. 15/782,912, filed Oct. 13, 2017, and entitled "NETWORK OPERATION CENTER DASHBOARD FOR CLOUD-BASED WI-FI SYSTEMS," the contents of which are incorporated herein by reference.

FIELD OF THE DISCLOSURE

The present disclosure generally relates to networking systems and methods. More particularly, the present disclosure relates to Network Operation Center (NOC) dashboard systems and methods for cloud-based Wi-Fi systems.

BACKGROUND OF THE DISCLOSURE

Conventional Wi-Fi networks are deployed by users in their residences to provide network connectivity to various devices (e.g., mobile devices, tablets, televisions, Internet of Things (IoT) devices, laptops, media players, and the like). The users obtain network connectivity from their service provider, e.g., Multiple Systems Operators (MSOs), wireless providers, telecom providers, etc. From the service provider perspective, the network connectivity is conventionally seen to the gateway, i.e., cable modem, Digital Subscriber Loop (DSL) modem, wireless Access Point (AP), etc. Conventional Wi-Fi networks are added by the end user, and there is no visibility into the operation of such networks by the service provider. Service providers and their customers are no longer viewing their network connectivity as ending at the gateway, such as due to the deployment of service provider applications ("apps") on user devices. It is no longer acceptable for these service providers to troubleshoot network problems only to the gateway. Their customers expect a working network connection to the end user device. Thus, there is a need to provide service providers tools and techniques to view, monitor, and troubleshoot Wi-Fi networks.

BRIEF SUMMARY OF THE DISCLOSURE

The present disclosure is directed to systems and methods for managing a network of a plurality of Wi-Fi networks from a cloud-based Network Operations Control (NOC) dashboard. According to one implementations, a method includes the step of presenting a dashboard on a user interface for use by a support agent at a NOC, where the dashboard shows both Wi-Fi metrics and cellular metrics. The method includes the step of obtaining Wi-Fi metrics and cellular metrics from a network. The method also includes displaying a dashboard on a user interface for use by a support agent at a Network Operations Center (NOC). Also, the method includes the step of displaying both the Wi-Fi metrics and the cellular metrics on the dashboard. In some embodiments, the method may be embedded in any suitable combination of hardware, software, firmware, etc., and may include logic or programming code for enabling a processing device to perform certain functionality to present Wi-Fi metrics and cellular metrics in a dashboard of a user interface. For example, the method may be stored in any suitable non-transitory computer-readable media (e.g., memory) and executable by the processing device.

Furthermore, the method may include the step of displaying a customer view on the dashboard. For example, the customer view may illustrate local Wi-Fi metrics and local cellular metrics of a customer Wi-Fi system selected from a plurality of Wi-Fi systems on the network. The method may further include receiving the local Wi-Fi metrics and local cellular metrics from User Equipment (UE) associated with the customer Wi-Fi system. For example, the UE may include a gateway device configured to connect the customer Wi-Fi system with the network and/or Customer Premises Equipment (CPE) configured in the customer Wi-Fi system. The UE, for example, may further include one or more mobile devices configured to communicate via the customer Wi-Fi system. In response to the support agent receiving a customer request from a customer associated with the customer Wi-Fi system, the method may include enabling the support agent to debug the UE on the customer Wi-Fi system. The method may also include the step of displaying Quality of Experience (QoE) parameters on the dashboard. For example, the QoE parameters may be associated with Wi-Fi quality and/or cellular quality on the customer Wi-Fi system. The QoE parameters, for example, may include a) a Received Signal Strength Indictor (RSSI) value, b) a Reference Signal Received Power (RSRP) value, c) a Reference Signal Received Quality (RSRQ) value, d) a Signal-to-Interference-plus-Noise Ratio (SINR) value, and/or other monitored values, which may be presented on the dashboard in graphical form.

The method may further include the step of displaying a network-wide view of the network on the dashboard. For example, the network-wide view may show the Wi-Fi metrics and cellular metrics of a plurality of Wi-Fi systems of the network. In the network-wide view, the method may further be configured to display QoE parameters on the dashboard, based on network-wide Wi-Fi quality and cellular quality. The method may also include the step of determining correlations in performance issues among the plurality of Wi-Fi systems and then displaying parameters of these correlations. The correlations, for example, may be based on a) predetermined geographical areas, b) associated base stations or towers, c) frequency bands in use (e.g., Global System for Mobile communications (GSM) cellular frequency bands, such as 850 MHz, 900 MHz, 1900 MHz, 2100 MHz, etc.), d) service providers, e) LTE or 5G operational modes, f) aggregation mode or level (e.g., whether multiple channels are aggregated together and how), g) mmWave vs. sub-6 GHz frequency operation, h) gateway type, i) Wi-Fi or cellular channels used, and/or other variables.

The method may further include the step of displaying both the Wi-Fi metrics and the cellular metrics according to a "troubleshooting mode" in which Wi-Fi and cellular parameters are monitored at a granularity of about one set of parameters per second. For example, a regular mode may show the data at a granularity of one set of parameters every minute or so. Also, the method may include displaying both the Wi-Fi metrics and the cellular metrics during a failover event from Wi-Fi operation to cellular operation. The support agent (e.g., stationed at the NOC) may be allowed to perform one or more actions in response to the Wi-Fi metrics and cellular metrics. For example, the support agent may be able to a) configure an Access Point Name (APN) to operate in either a Wi-Fi mode or a cellular mode, b) configure Subscriber Identifier Module (SIM) profiles, c) set a throttle on the amount of traffic allowed over a wired portion of the Wi-Fi network, d) set a throttle on the amount of traffic allowed over a cellular portion of the Wi-Fi network, e) move from 5G operation to LTE operation, f) move from LTE operation to Ethernet operation, g) force a reset of a cellular connection, and/or other actions.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used for the user device in the distributed Wi-Fi system of FIG. 1 or the like.

FIGS. 6 and 7 are screenshots of two portions of the dashboard illustrating network-level metrics.

FIG. 16 is a screenshot of a tile for a performed optimization.

FIG. 18 is a screenshot of a login screen for the NOC dashboard.

FIG. 19 is a screenshot of a pulldown menu in the NOC dashboard.

FIG. 32 is a screenshot of a network topology view.

FIG. 44 is a screenshot of a table of a matrix illustrating the channel gains (signal strengths) between all access points in a network (home).

FIG. 47 is a screenshot of a table illustrating the estimated PHY rate for all potential connections between access points on all possible frequency channels.

FIG. 48 is a screenshot of a table illustrating the actual measured PHY rates for all potential connections between access points on all possible frequency channels.

DETAILED DESCRIPTION OF THE DISCLOSURE

Figure 1:
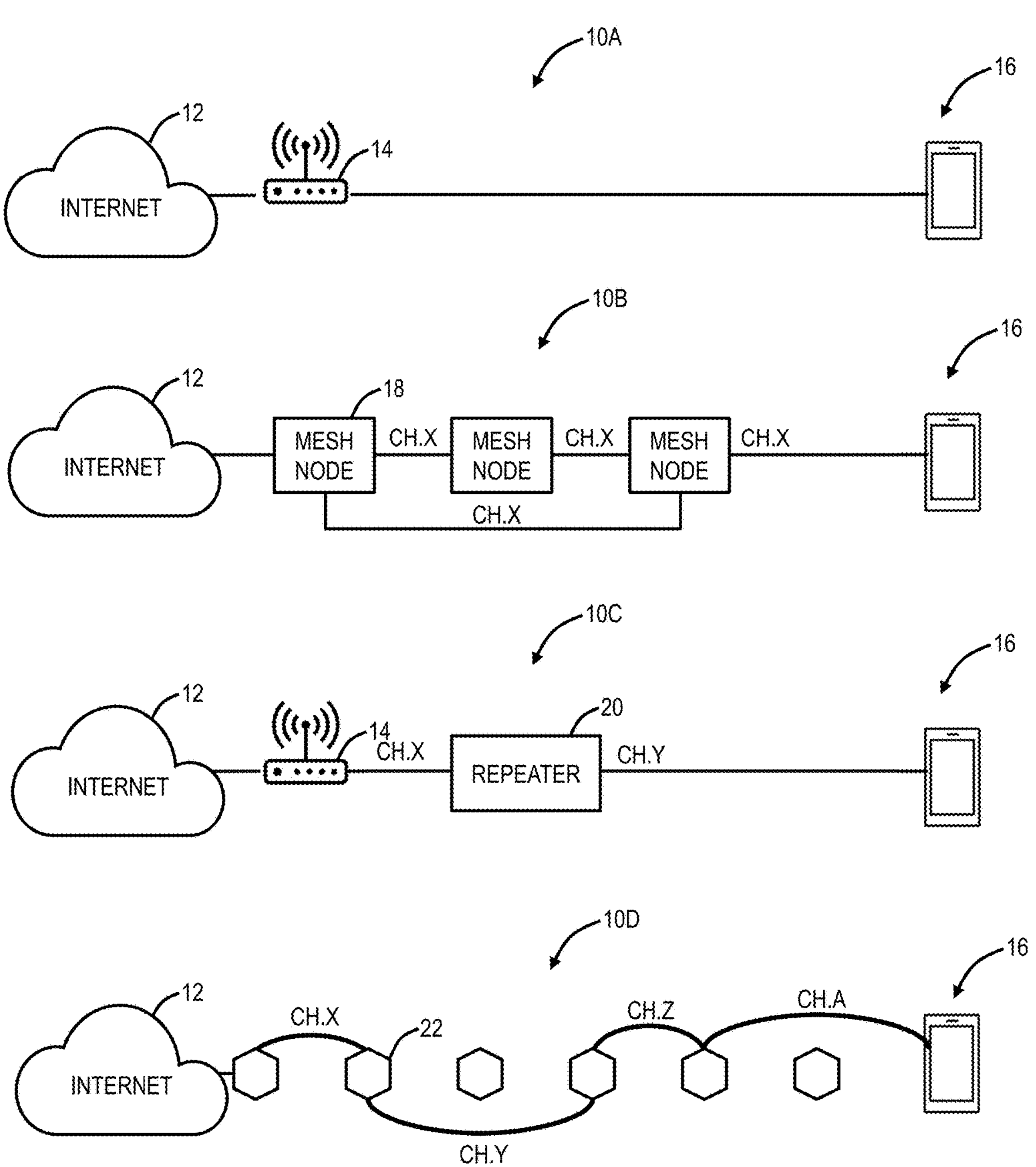
FIG. 1 is a network diagram of various Wi-Fi network topologies for connectivity to the Internet.

In various embodiments, the present disclosure relates to Network Operation Center (NOC) dashboard systems and methods for cloud-based Wi-Fi systems. The systems and methods provide network visualizations in a dashboard for a service provider to view Wi-Fi networks in a plurality of locations (e.g., millions of homes). The dashboard includes various metrics and displays thereof as well as settings and controls for cloud-based Wi-Fi network control.

The NOC dashboard is a user interface, e.g., web-based, application-based, etc. connected to multiple Wi-Fi networks via the cloud. The NOC dashboard can be used by network operations, technical support personnel, etc. An objective of the NOC dashboard is to provide service providers visibility from their NOC to end user's client devices. That is, make Wi-Fi visible to service providers. Thus, the NOC dashboard can monitor and manage various Wi-Fi devices (access points, mesh devices, repeaters, etc.) providing Key Performance Indicators (KPIs) and visibility to each connected device.

The systems and methods enable a service provider to view Wi-Fi networks as a whole, assessing bulk properties such as average Wi-Fi data rates, % of homes with a given Wi-Fi data rate, % of homes with coverage problems, % of homes with interference issues, etc. Accordingly, the systems and methods allow the service provider to assess how well Wi-Fi is working in their network. For example, the systems and methods can guide the service providers to determine generally whether the Wi-Fi capability is adequate or whether there is a need to invest more into Wi-Fi systems.

The systems and methods enable a service provider to create groups of Wi-Fi networks, such as customers with different types of service, customers with different or the same types of gear in their home, customers who have been in contact with customer support, etc. These groups can then be analyzed for commonalities in terms of their Wi-Fi behavior. The dashboard can be used as an "upsell" or "churn prevention" tool, identifying those customers with poor Wi-Fi experience, and identifying the most likely cause or remedy for the situation. The service provider can then attempt to upsell the customer to that solution or can upgrade the solution for free in order to prevent the customer from changing (churning) to a new provider due to a poor experience.

The dashboard can be used for customer support. If a customer calls, emails, texts, etc., a service representative can call up the customer's account live or off-line to help diagnose any problem. The extensive data provided in the dashboard allows support personnel to identify fixes such as a) moving where the APs are located, b) changing networking settings such as router vs. bridge mode, c) adding additional APs to the network, d) making adjustments to the clients in the home (settings, location, etc.), e) manually adjusting frequency channels or topologies (connections between APs), f) running diagnostic speed tests, g) checking the history of speed tests, interference levels, data rates, packet errors, etc., and the like.

Wi-Fi Network Topologies

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to Wi-Fi client devices 16 which can be referred to as client devices, user equipment, user devices, clients, Wi-Fi clients, Wi-Fi devices, etc. Note, those skilled in the art will recognize the Wi-Fi client devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all Wi-Fi client devices 16 in a location. Of course, a typical location can have several walls, floors, etc. between the single access point 14 and the Wi-Fi client devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the Wi-Fi client device 16. That is, the Wi-Fi network 10B is a fully interconnected grid, sharing the same channel, and allowing multiple different paths between the mesh nodes 18 and the Wi-Fi client device 16. However, since the Wi-Fi network 10B uses the same backhaul channel, every hop between source points divides the network capacity by the number of hops taken to deliver the data. For example, if it takes three hops to stream a video to a Wi-Fi client device 16, the Wi-Fi network 10B is left with only ⅓ the capacity.

The Wi-Fi network 100 includes the access point 14 coupled wirelessly to a Wi-Fi repeater 20. The Wi-Fi network 10C with the repeaters 20 is a star topology where there is at most one Wi-Fi repeater 20 between the access point 14 and the Wi-Fi client device 16. From a channel perspective, the access point 14 can communicate to the Wi-Fi repeater 20 on a first channel, Ch. X, and the Wi-Fi repeater 20 can communicate to the Wi-Fi client device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wi-Fi client devices 16.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high-definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems, as illustrated in the Wi-Fi networks 1A, 10B, 10C. The first approach (the Wi-Fi network 10A) is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of the link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location, as illustrated in the Wi-Fi networks 10B, 100. This approach is a fundamentally better approach to achieving better coverage. By placing even a single repeater 20 in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters 20. A fully interconnected mesh adds the ability for all the mesh nodes 18 to be able to communicate with each other, opening the possibility of packets being delivered via multiple hops following an arbitrary pathway through the network.

The Wi-Fi network 10D includes various Wi-Fi devices 22 that can be interconnected to one another wirelessly (Wi-Fi wireless backhaul links) or wired, in a tree topology where there is one path between the Wi-Fi client device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the Wi-Fi client device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the Wi-Fi client device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

Cloud-Based Control

Figure 2A:
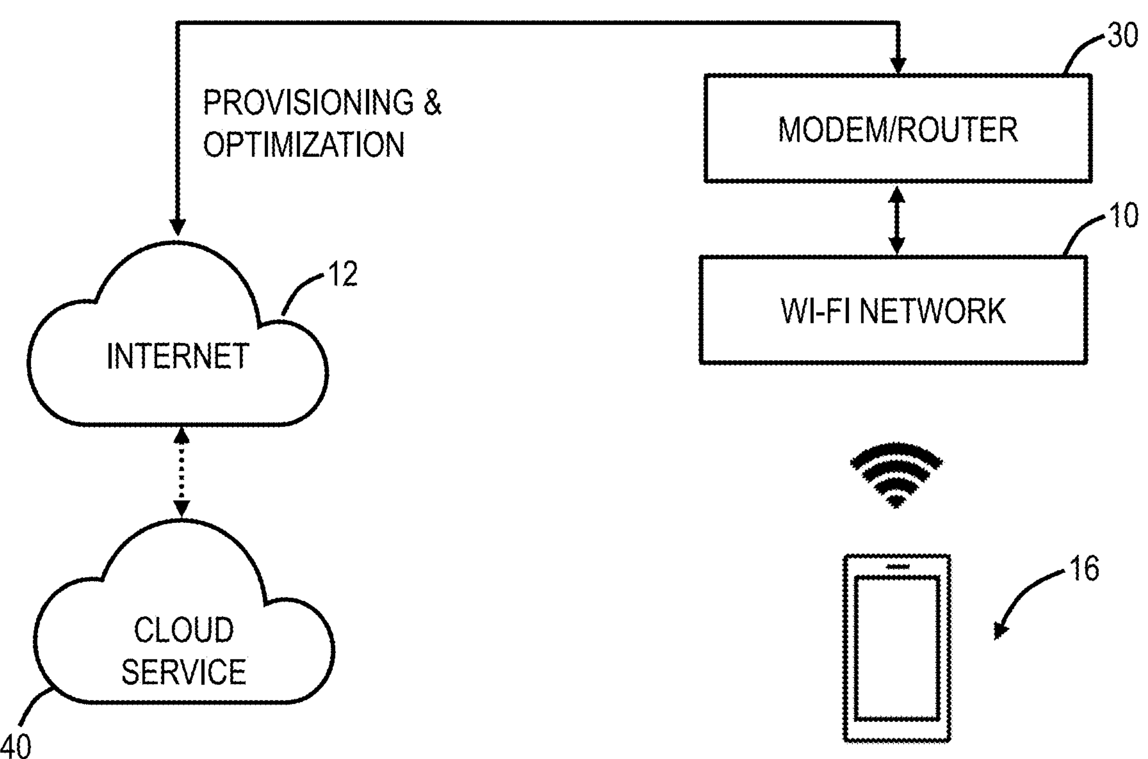
FIG. 2A is a network diagram of the Wi-Fi network with cloud-based control.

FIG. 2A is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 30 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Of note, cloud-based control can be implemented with any of the Wi-Fi networks 10, with monitoring through the cloud service 40. For example, different vendors can make access points 14, mesh nodes 18, repeaters 20, Wi-Fi devices 22, etc. However, it is possible for unified control via the cloud using standardized techniques for communication with the cloud service 40. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40. This is used to collect measurements and statistics from the connected Wi-Fi client devices 16 and network management elements, and to enable customized connectivity services.

As described herein, cloud-based management includes reporting of Wi-Fi related performance metrics to the cloud service 40 as well as receiving Wi-Fi-related configuration parameters from the cloud service 40. The systems and methods contemplate use with any Wi-Fi network 10. The cloud service 40 utilizes cloud computing systems and methods to abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

Distributed Wi-Fi Network

Figure 2B:
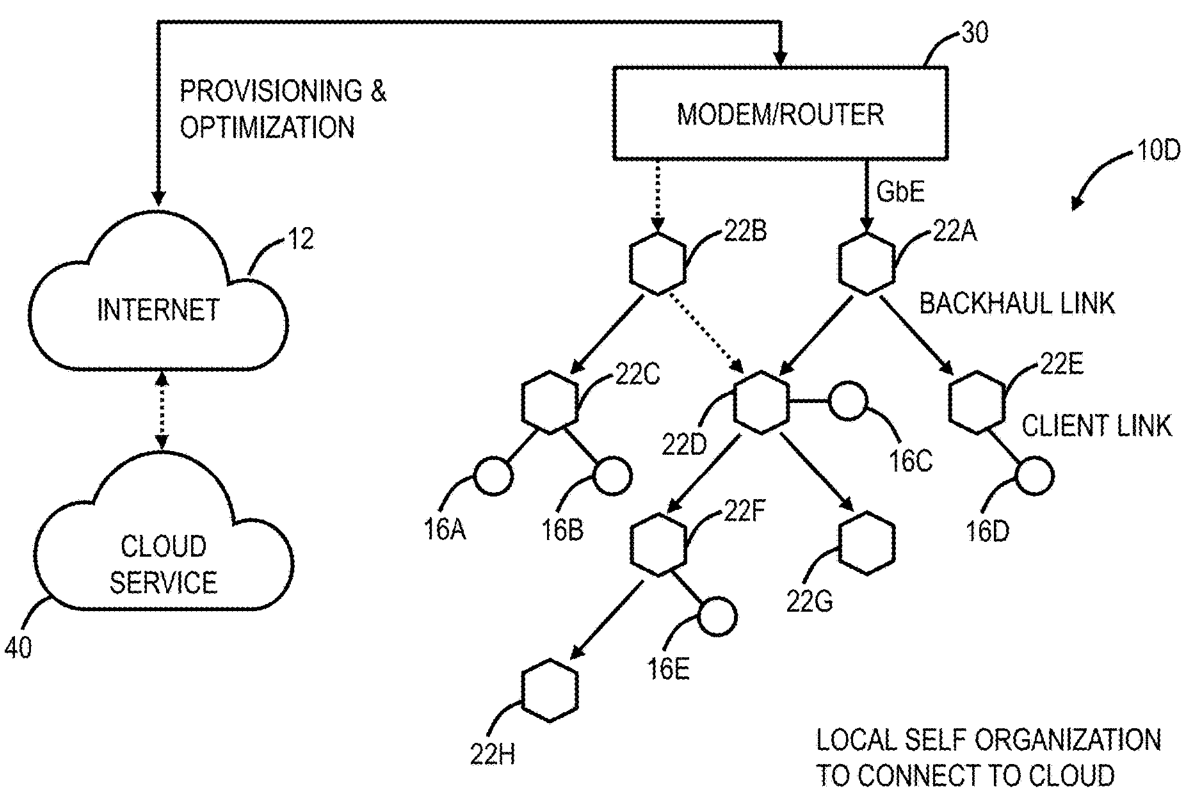
FIG. 2B is a network diagram of an example implementation the Wi-Fi network, as a distributed Wi-Fi network in a tree topology.

FIG. 2B is a network diagram of an example implementation the Wi-Fi network 10D, as a distributed Wi-Fi network in a tree topology. The distributed Wi-Fi network 10D includes a plurality of access points 22 (labeled as access points 22A-22H) which can be distributed throughout a location, such as a residence, office, or the like. That is, the distributed Wi-Fi 10D contemplates operation in any physical location where it is inefficient or impractical to service with a single access point, repeaters, or a mesh system. In a typical deployment, the distributed Wi-Fi network 10D can include between 1 to 12 access points or more in a home. A large number of access points 22 (which can also be referred to as nodes in the distributed Wi-Fi system 10) ensures that the distance between any access point 22 is always small, as is the distance to any Wi-Fi client device 16 needing Wi-Fi service. That is, an objective of the distributed Wi-Fi network 10D is for distances between the access points 22 to be of similar size as distances between the Wi-Fi client devices 16 and the associated access point 22. Such small distances ensure that every corner of a consumer's home is well covered by Wi-Fi signals. It also ensures that any given hop in the distributed Wi-Fi network 10D is short and goes through few walls. This results in very strong signal strengths for each hop in the distributed Wi-Fi network 10D, allowing the use of high data rates, and providing robust operation.

For external network connectivity, one or more of the access points 14 can be connected to a modem/router 30 which can be a cable modem, Digital Subscriber Loop (DSL) modem, or any device providing external network connectivity to the physical location associated with the distributed Wi-Fi network 10D.

While providing excellent coverage, a large number of access points 22 (nodes) presents a coordination problem. Getting all the access points 22 configured correctly and communicating efficiently requires centralized control. This control is preferably done via the cloud service 40 that can be reached across the Internet 12 and accessed remotely such as through an application ("app") running on a client device 16. That is, in an aspect, the distributed Wi-Fi network 10D includes cloud-based control (with a cloud-based controller or cloud service) to optimize, configure, and monitor the operation of the access points 22 and the Wi-Fi client devices 16. This cloud-based control is contrasted with a conventional operation which relies on a local configuration such as by logging in locally to an access point. In the distributed Wi-Fi network 10D, the control and optimization does not require local login to the access point 22, but rather the Wi-Fi client device 16 communicating with the cloud service 4, such as via a disparate network (a different network than the distributed Wi-Fi network 10D) (e.g., LTE, another Wi-Fi network, etc.).

The access points 22 can include both wireless links and wired links for connectivity. In the example of FIG. 2B, the access point 22A has an example gigabit Ethernet (GbE) wired connection to the modem/router 40. Optionally, the access point 22B also has a wired connection to the modem/router 40, such as for redundancy or load balancing. Also, the access points 22A, 22B can have a wireless connection to the modem/router 40. Additionally, the access points 22A, 22B can have a wireless gateway such as to a cellular provider as is described in detail herein. The access points 22 can have wireless links for client connectivity (referred to as a client link) and for backhaul (referred to as a backhaul link). The distributed Wi-Fi network 10F differs from a conventional Wi-Fi mesh network in that the client links and the backhaul links do not necessarily share the same Wi-Fi channel, thereby reducing interference. That is, the access points 22 can support at least two Wi-Fi wireless channels-which can be used flexibly to serve either the client link or the backhaul link and may have at least one wired port for connectivity to the modem/router 40, or for connection to other devices. In the distributed Wi-Fi network 10D, only a small subset of the access points 22 require direct connectivity to the modem/router 40 with the non-connected access points 22 communicating with the modem/router 40 through the backhaul links back to the connected access points 22A, 22B. Of course, the backhaul links may also be wired Ethernet connections, such as in a location have a wired infrastructure.

Wi-Fi Network With Wired and Wireless Connectivity

Again, the wireless access points 14, 18, 22 include both the Wi-Fi radios 104A, the cellular radios 104B, and the network interface 110. The network interface 110 can include an Ethernet connection to the modem/router 30. In an embodiment, the cellular radios 104B can provide a backup connection to the Ethernet connection, for connectivity to the Internet. Of note, the access point 14, 18, 22 with the cellular radios 104B can be referred to as a gateway 30A node. That is, the term gateway 30A is meant to cover any access point 14, 18, 22, modem/router, etc. or combination thereof that enables connectivity to the Internet 12 for the Wi-Fi network 10. Note, in some embodiments, a modem is separate from the access point 14, 18, 22. In other embodiments, the access point 14, 18, 22, include a router. In still other embodiments, the access point 14, 18, 22 can include a modem/router. Those skilled in the art will recognize various approaches are contemplated and all such equivalents are considered herewith.

Figure 2C:
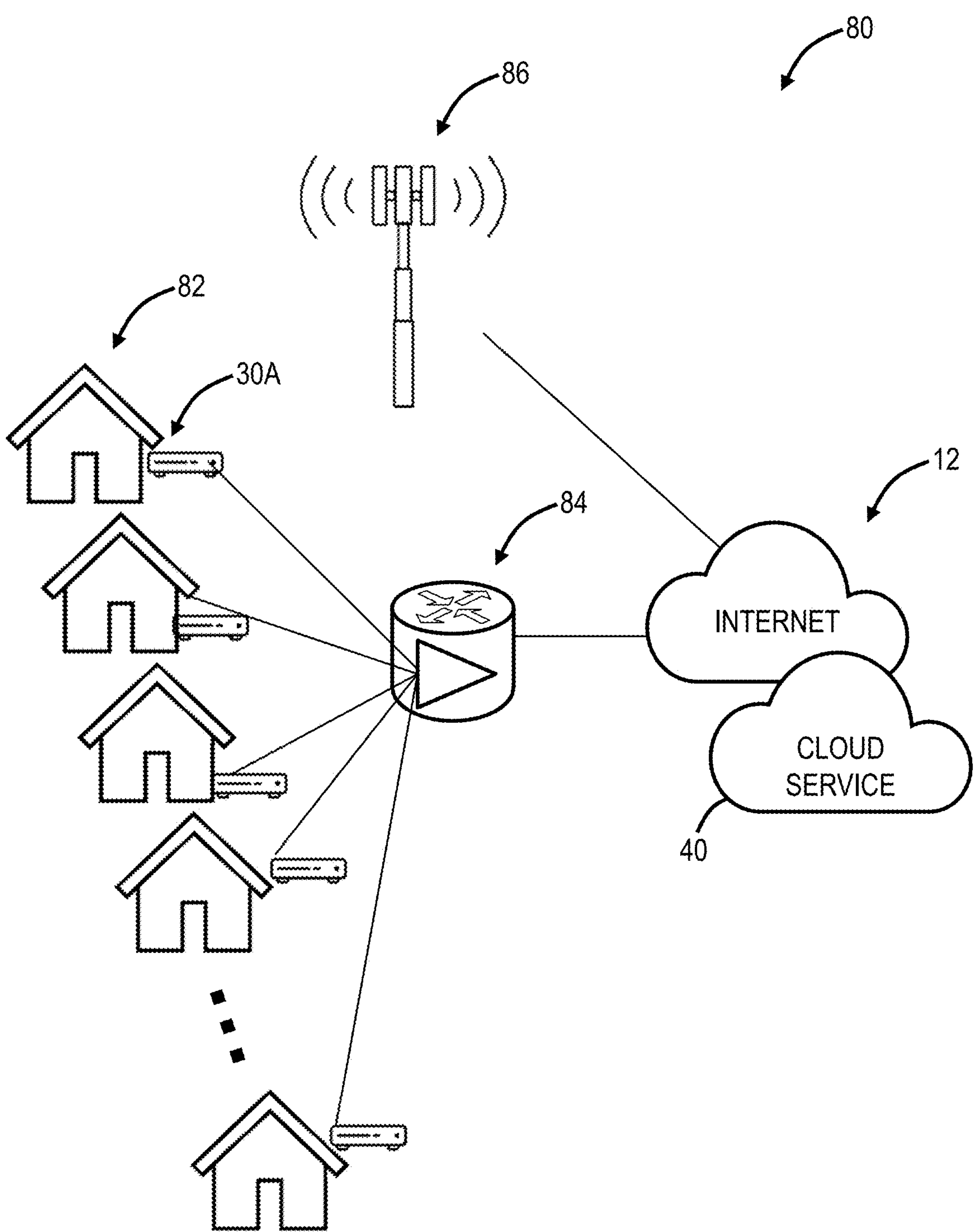
FIG. 2C is a network diagram of a portion of a network associated with a network operator.

FIG. 2C is a network diagram of a portion of a network 80 associated with a network operator. In this example, the network operator includes both wired and wireless broadband in the same geographical area, represented by homes 82. For example, the wired broadband can be via modems/routers 30 that can connect ultimately to a cable modem termination system (CMTS) 84 (or some other type of wired infrastructure, e.g., DSL, Passive Optical Network (PON), Hybrid Fiber Coax (HFC), etc.), and the wireless broadband can be via fixed wireless access via the cellular radios 104B in the access points 14, 18, 22 that connect to a base station 86 (e.g., eNodeB, gNodeB, etc.). It would be advantageous to support failover to the wireless broadband in the case of a wired broadband failure, providing reliability, uptime, and high service level agreement (SLA) support. In the case of a single outage, this is not an issue on the wireless network. However, often wired failures are geographically localized. For example, failure of the CMTS 84 causes a burden on the base station 86 because the wired broadband failure is geographically localized to the homes 82. This could dramatically put a burden on the base station 86 or other cellular cells in the area, leading to degradation of services for all mobile users in the area. That is, wired broadband outages tend to be localized and using wireless broadband for failover could inundate the cellular network.

Fixed Wireless Access System

Figure 2D:
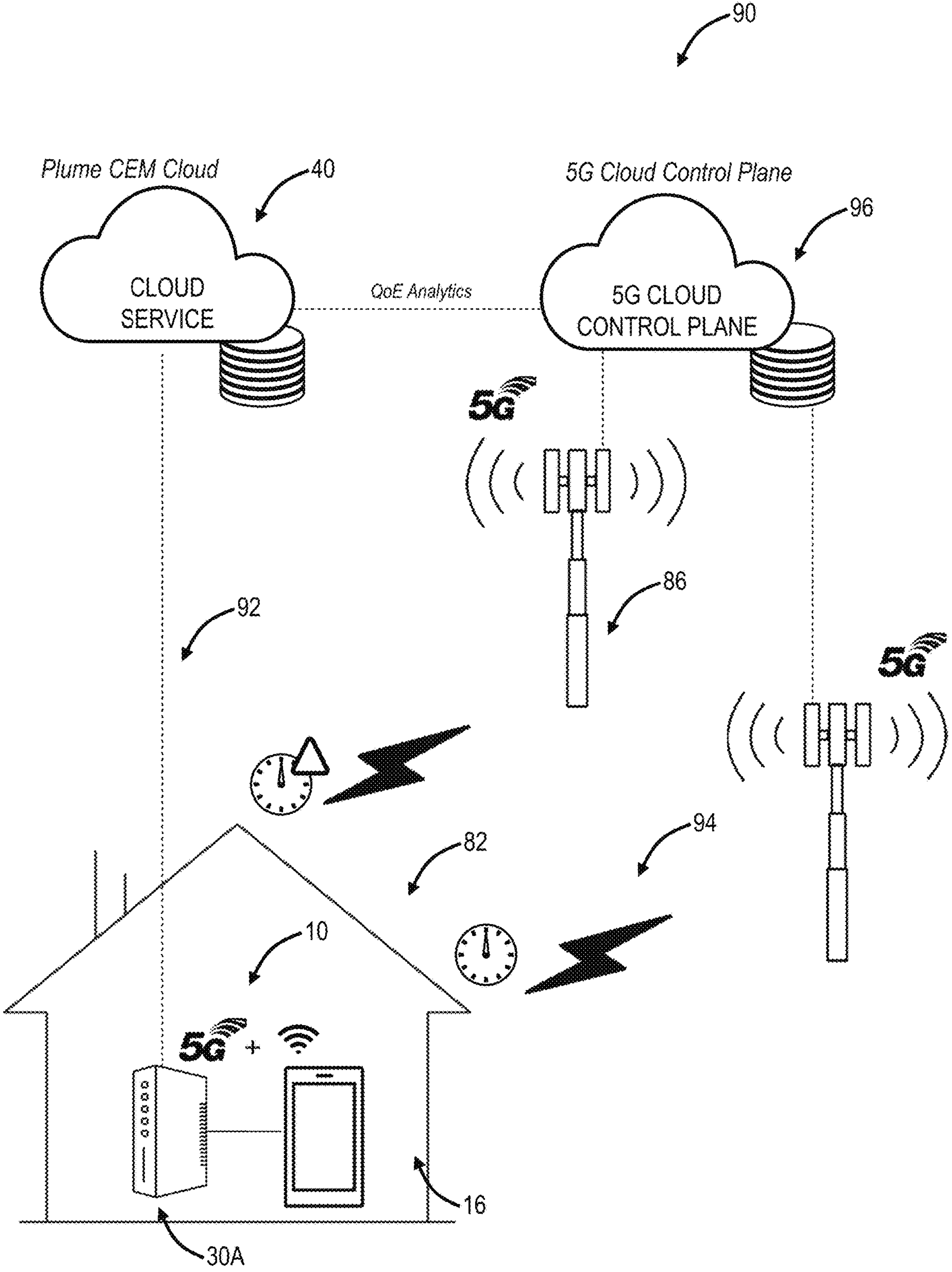
FIG. 2D is a diagram of a fixed wireless access system for wired and/or wireless connectivity.

FIG. 2D is a diagram of a fixed wireless access system 90 for wired and/or wireless connectivity. For illustration purposes, the fixed wireless access system 400 is illustrated with a single home 82 having a modem/router 30 and a Wi-Fi client device 16. Those skilled in the art will recognize the fixed wireless access system 90 contemplates multiple locations, including homes, businesses, store, library, mall, sporting area, or any location where a Wi-Fi network 10 is deployed. Further, the fixed wireless access system 90 contemplates use with various different Wi-Fi networks 10, with various different network operators, etc. Also, the fixed wireless access system 90 contemplates use with any of the various wired and/or wireless connectivity schemes described herein.

The cloud service 40 is configured to connect to the Wi-Fi network 10, either via a wired connection 92 and/or a wireless connection 94. In an embodiment, the cloud service 40 can be utilized for configuration, monitoring, and reporting of the Wi-Fi networks 10 in the homes 82 or other locations. The cloud service 40 can be configured to detect outages such as for the wired connections 92. For example, this functionality is described in commonly-assigned U.S. patent application Ser. No. 17/700,782, filed Mar. 22, 2022, and entitled "Intelligent monitoring systems and methods for Wi-Fi Metric-Based ISP Outage Detection for Cloud Based Wi-Fi Networks," the contents of which are incorporated by reference in their entirety.

Also, the cloud service 40 can connect to a 5G cloud control plane 96 and can determine 5G to Wi-Fi quality of experience (QoE) monitoring and application prioritization controls for increased service consistency. QoE analytics can be shared with 5G cloud control plane 96 for network optimization feedback.

In an embodiment, the access points 14, 18, 20, 22 and/or gateway 30A can include OpenSync support for communicating with the cloud service 40.

Access Point

Figure 2E:
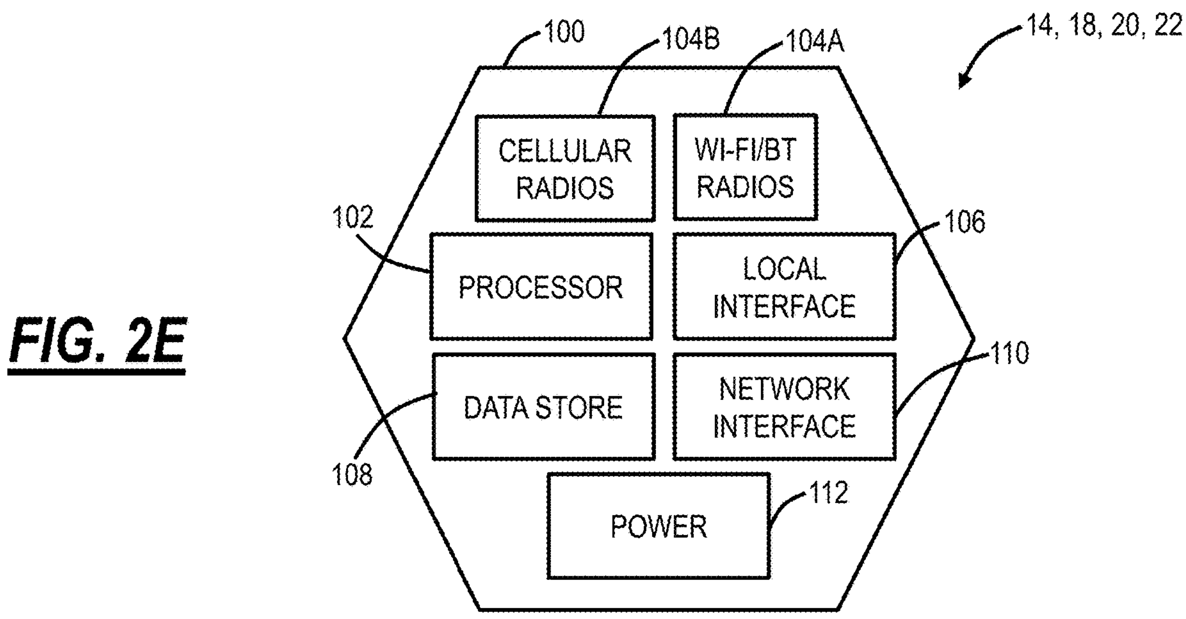
FIG. 2E is a block diagram of functional components of the access points, mesh nodes, repeaters, etc. ("node") in the Wi-Fi networks.

FIG. 2E is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 2E depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104S can operate according to the IEEE 802.11 standard. The radios 104B support cellular connectivity such as Long Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104S such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6 GHz, as well as cellular connections. The radios 104B can include cellular chipsets and the like to support fixed wireless access.

Also, the radios 104A, 104B include antennas designed to fit in the form factor 100. An example is described in commonly-assigned U.S. Pat. No. 17/857,377, entitled "Highly isolated and barely separated antennas integrated with noise free RF-transparent Printed Circuit Board (PCB) for enhanced radiated sensitivity," filed Jul. 5, 2022, the contents of which are incorporated by reference in their entirety.

The local interface 106 is configured for local communication to the node and can be either a wired connection or wireless connection such as Bluetooth or the like. Since the node can be configured via the cloud service 40, an onboarding process is required to first establish connectivity for a newly turned on node. In an embodiment, the node can also include the local interface 106 allowing connectivity to a Wi-Fi client device 16 for onboarding to the Wi-Fi network 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 40. Also, the network interface 110 can be used to provide local connectivity to a Wi-Fi client device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Also, those skilled in the art will appreciate there can be various physical implementations which are contemplated herein. For example, in some embodiments, the modem/router 30 can be integrated with the access point 14, 18, 22. In other embodiments, just a router can be integrated with the access point 14, 18, 22 with separate connectivity to a modem.

Example Server Architecture

Figure 3:
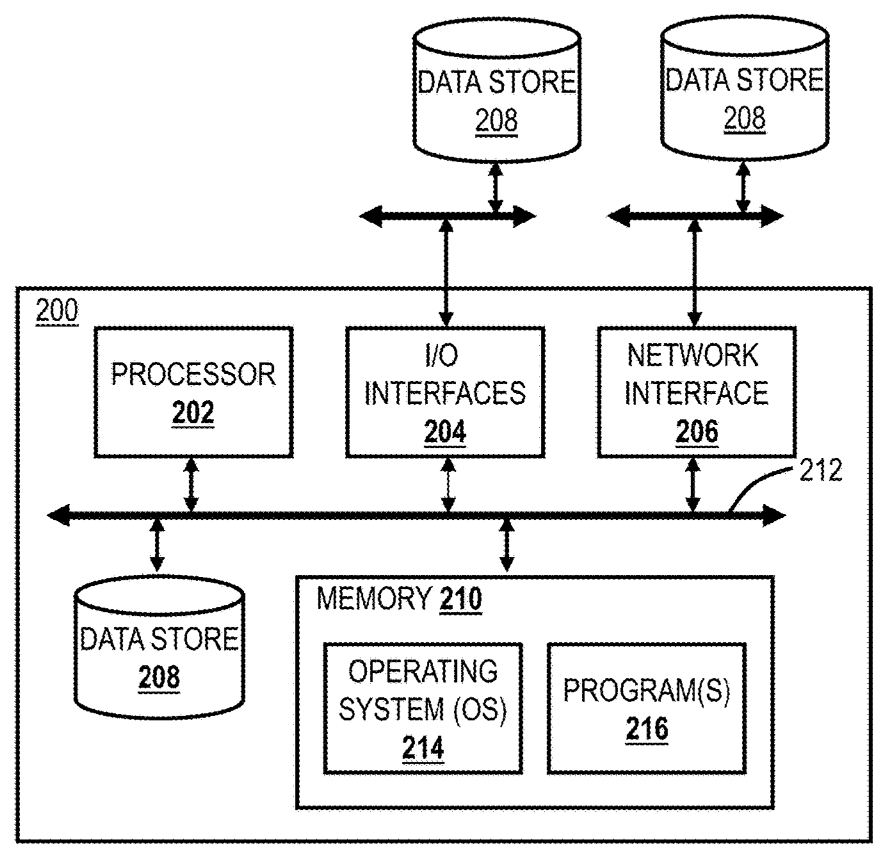
FIG. 3 is a block diagram of a server which may be used in the cloud, in other systems, or standalone.

Referring to FIG. 3, in an embodiment, a block diagram illustrates a server 200 which may be used in the cloud 12, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example Mobile Device Architecture

Figure 4:
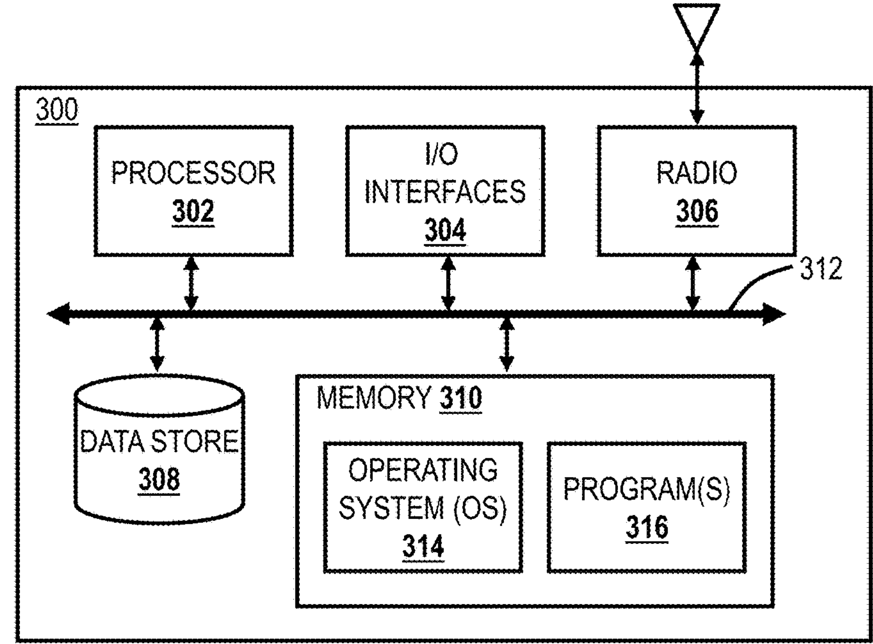

Referring to FIG. 4, in an embodiment, a block diagram illustrates a mobile device 300, which may be used for the user device 22 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 4 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the mobile device 300. For example, programs 316 may include, but not limited to, a web browser, social networking applications, streaming media applications, games, mapping and location applications, electronic mail applications, financial applications, and the like. In a typical example, the end user typically uses one or more of the programs 316 along with a network.

Cloud-Based NOC Process

Figure 5:
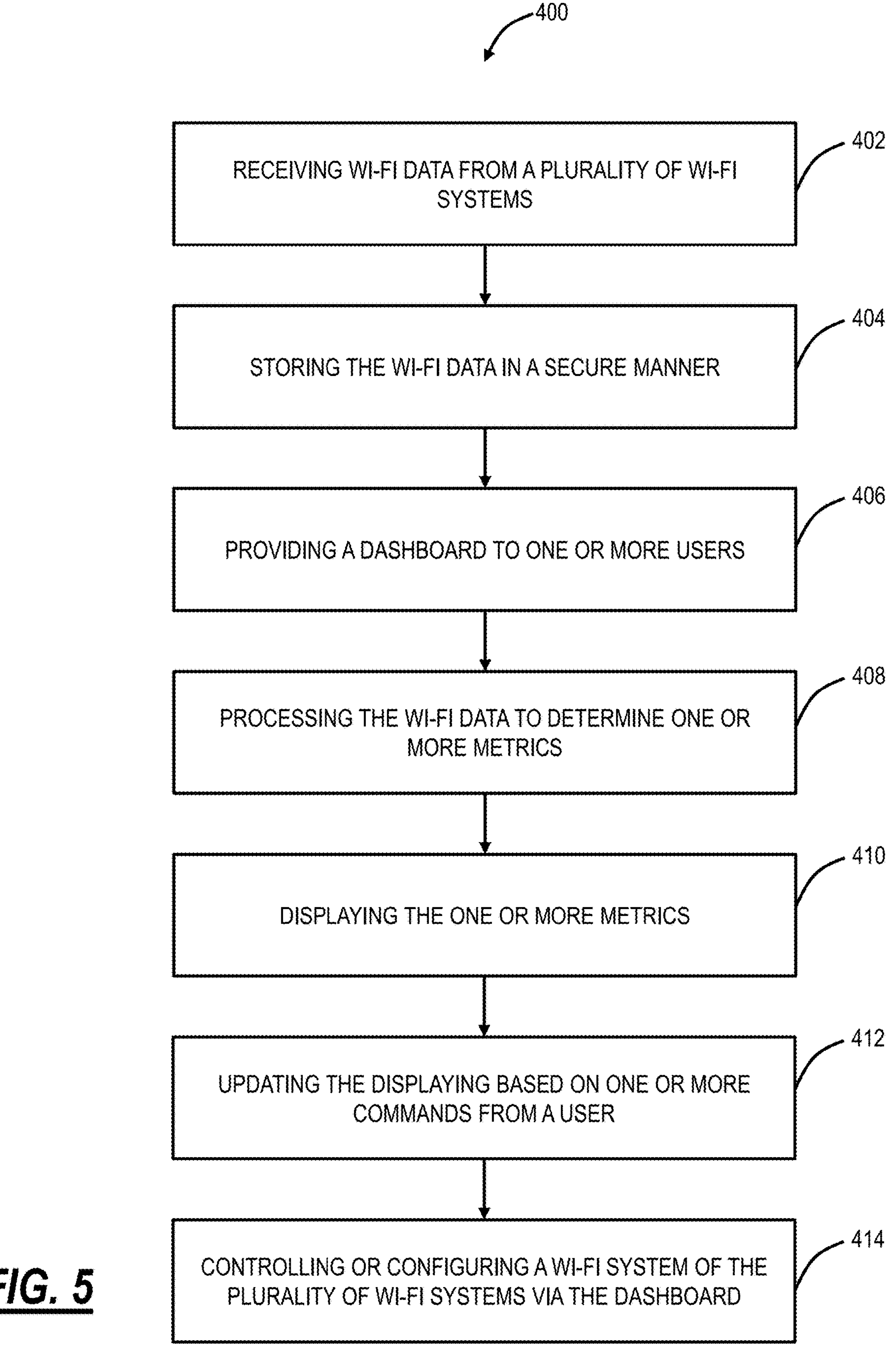
FIG. 5 is a flowchart of a cloud-based Network Operation Center (NOC) process.

Referring to FIG. 5, in an embodiment, a flowchart illustrates a cloud-based NOC process 400. The cloud-based NOC process 400 is implemented in the cloud 12, such as at one of the servers 20, based on communication with a plurality of Wi-Fi systems such as the distributed Wi-Fi system 10, the single access point system 30, the Wi-Fi mesh network 32, the Wi-Fi repeater network 33, and the like. The cloud-based NOC process 400 includes receiving Wi-Fi data from a plurality of Wi-Fi system (step 402). The Wi-Fi data can be referred to as measurement data and can include any relevant data associated with Wi-Fi operation such as Received Signal Strength Indicator (RSSI), achievable data rates, capacity, load, error rates, delays, interference, fractions of time spent transmitting and receiving, clients related information, and the like. For example, a description of data gathering in a Wi-Fi system is described in commonly assigned U.S. patent application Ser. No. 15/462,071, filed on Mar. 17, 2017, and entitled "DATA GATHERING TO ENABLE THE OPTIMIZATION OF DISTRIBUTED WI-FI NETWORKS," the contents of which is incorporated by reference.

The cloud-based NOC process 400 includes storing the Wi-Fi data in a secure manner (step 404). The Wi-Fi data can be stored in the data store 208. The secure manner includes encryption such that only the NOC can view the data. Further, the secure manner can include some or all of the Wi-Fi data being anonymized to remove user identifiable information, such as clients, etc. Further, a user in the cloud-based NOC process 400 can require authentication to be able to display metrics to ensure security.

The cloud-based NOC process 400 includes providing a dashboard to one or more users (step 408). For example, the server 20 can display the dashboard as a Graphical User Interface (GUI) to the user device 22 or the like. The dashboard can be displayed in an NOC or remotely to an authorized user. In an embodiment, the dashboard is presented as part of an application which implements the systems and methods. In another embodiment, the dashboard is presented in a browser, such as via HTTP/HTTPS.

The cloud-based NOC process 400 includes processing the Wi-Fi data to determine one or more metrics (step 408), displaying the one or more metrics in the dashboard (step 410), and updating the displaying based on one or more commands from a user (step 412). Specifically, the dashboard is interactive allowing the user to see network-wide metrics down to individual networks or APs. Steps 408-412 include updates to the GUI based on user input and associated processing. The Wi-Fi data can include aggregated network-wide statistics used to derive network-wide metrics, and the user can drill down to groups or individual accounts.

The cloud-based NOC process 400 can be used to manage devices, networks, groups of devices, groups of networks, accounts, groups of accounts, etc. That is, the cloud-based NOC process 400 contemplates various groupings for management purposes. In practical applications, the cloud-based NOC process 400 can manage thousands to millions of devices, each in a corresponding network and associated with accounts. As described herein, a Wi-Fi network is made up of one or more devices (e.g., access points 14, 34, 36, 38). An account represents a user identification which is the owner of a Wi-Fi network. Those skilled in the art will recognize various combinations are contemplated.

Wi-Fi Metrics in the Dashboard

Referring to FIGS. 6-16, in various embodiments, screenshots illustrate various GUIs in the dashboard and in the cloud-based NOC process 400. The dashboard can include various information to display the metrics including graphs, tables, numbers, etc. The graphs can be selected to show the 2.4 GHz and/or 5 GHz bands as well as include default and selectable timescales (e.g., one day, one week, etc.). Also, different lines on each graph can separate Transmit (Tx) versus Receive (Rx) (upload versus download) statistics.

The dashboard can be used to indicate the current state and history of the Wi-Fi network providing information such as how long each device has been connected, per node Graph, channel utilization, bandwidth usage, speed test history, alarms, channel utilization, a listing of disconnected devices, and the like.

Figure 6:
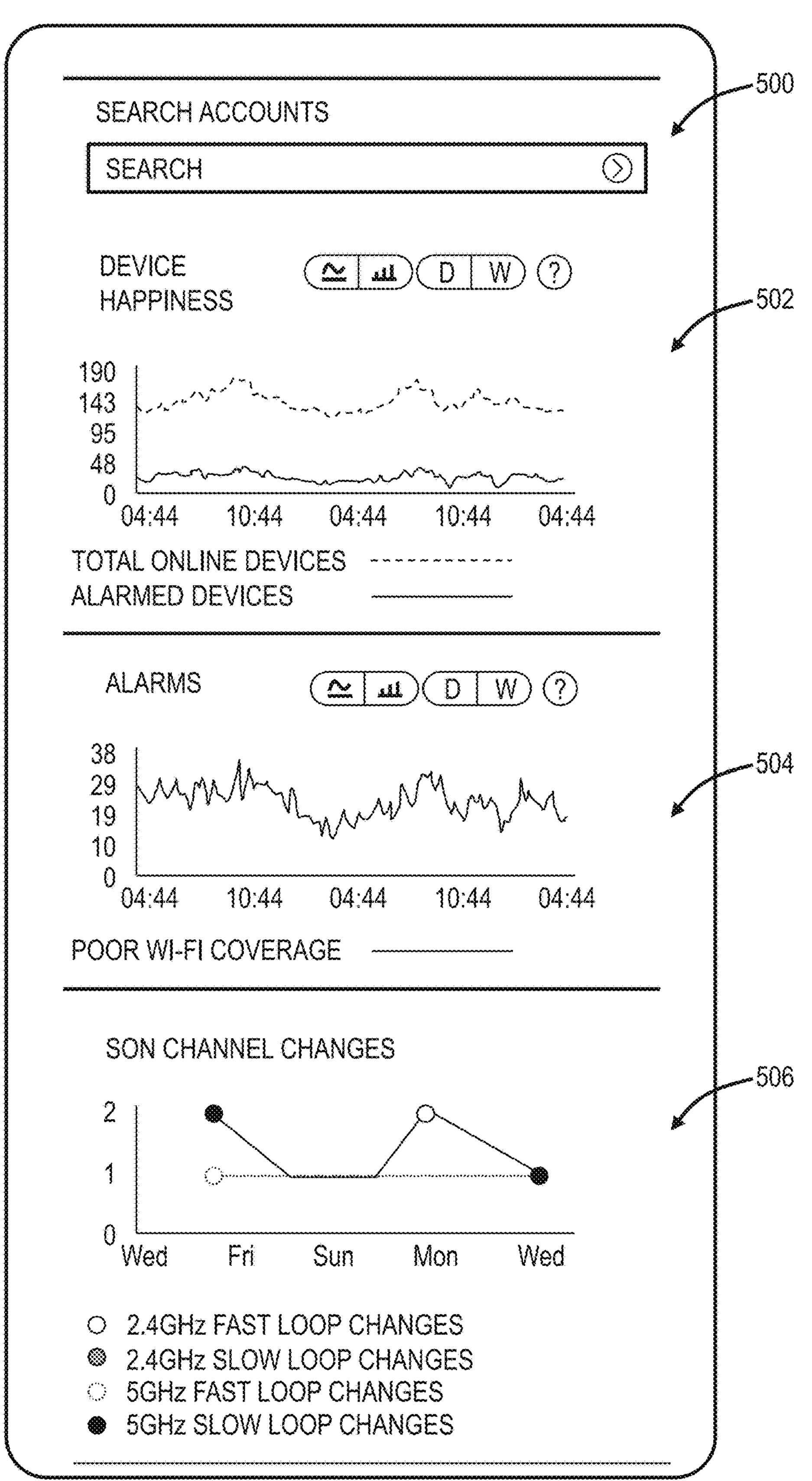
Figure 7:
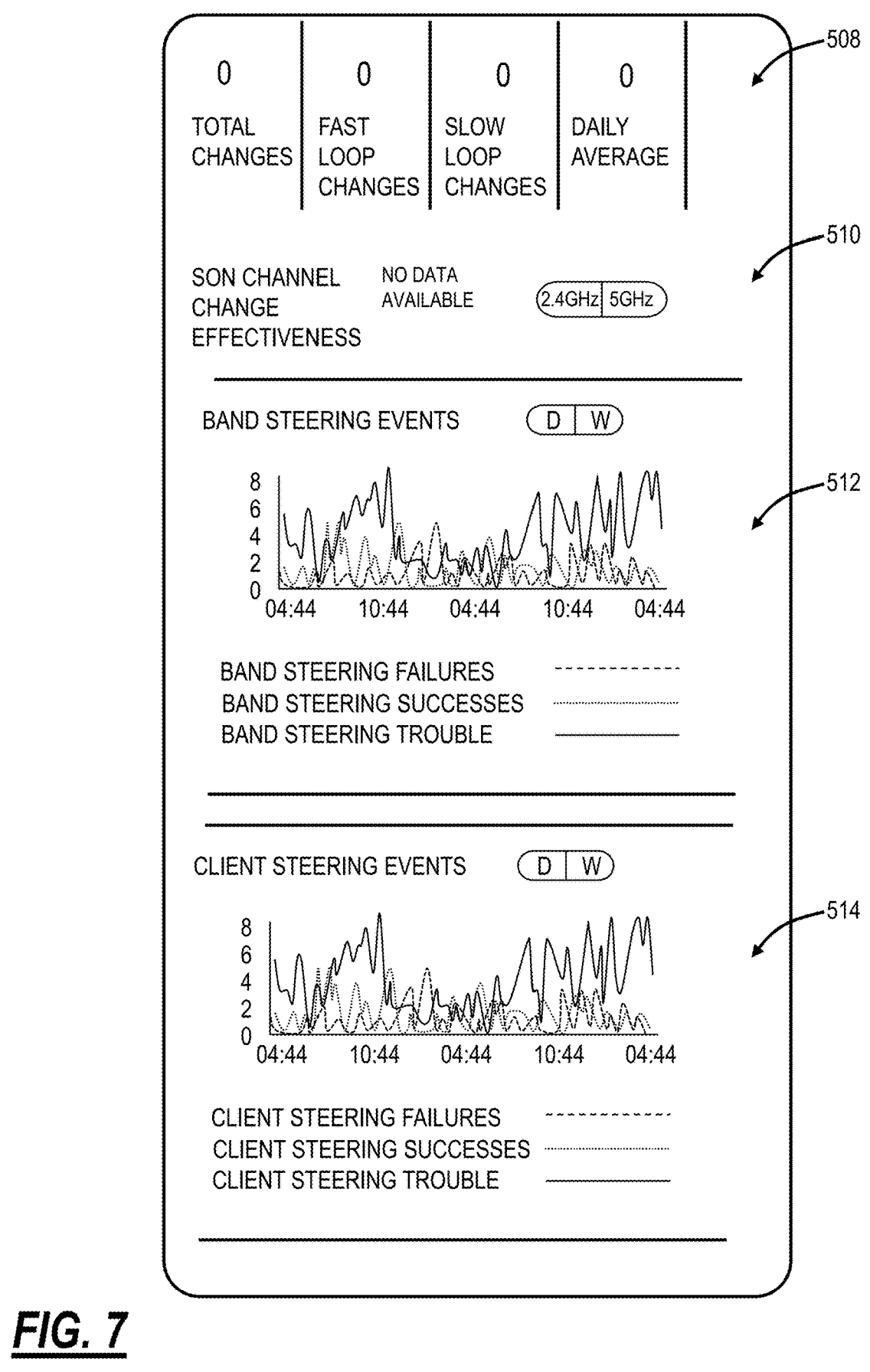

FIGS. 6 and 7 illustrate two portions of the dashboard illustrating network-level metrics. The dashboard can track all devices in various Wi-Fi systems including devices in an alarm state, online devices, offline devices, etc. FIG. 6 includes a search bar 500 where a user can look for a specific account, Wi-Fi system, etc. FIG. 6 further includes a graph 502 of "device happiness" which provides a network-wide view of all Wi-Fi systems being managed by the cloud-based NOC process 400. By device happiness, the graph 502 lists total online devices and alarmed devices over time (which can be adjusted by day, week, etc.). Also, by the device, the cloud-based NOC process 400 is monitoring Wi-Fi system devices, i.e., access points 14, 34, mesh nodes 36, repeaters 38, etc.

FIG. 6 also includes a graph 504 of alarms of all Wi-Fi devices being managed by the cloud-based NOC process 400. For example, the graph 504 shows alarms for poor Wi-Fi coverage. The graph 504 can also show multiple different alarm types (e.g., with different colored lines, etc.) on the same graph.

FIG. 6 also includes a graph 506 of Self-Organizing Network (SON) changes. For example, the distributed Wi-Fi system 10 can be controlled by the cloud 12 including the periodic performance of optimization. An example of cloud-based optimization is described in commonly-assigned U.S. patent application Ser. No. 15/463,321, filed Mar. 20, 2017, and entitled "CLOUD-BASED CONTROL OF A WI-FI NETWORK," the contents of which are incorporated by reference. Other types of control or optimization in the cloud 12 are also contemplated. Here, the graph 506 illustrates 2.4 GHz and 5 GHz fast and slow loop changes.

FIG. 7 can be displayed in conjunction with FIG. 6, such as different tiles in the dashboard. FIG. 7 can include a listing 508 of numbers of network-wide events, such as total changes, fast loop changes, slow loop changes, daily average, etc. FIG. 7 can also include a graph illustrating the SON channel change effectiveness 510. This display can show metrics showing the effectiveness of the cloud-based optimization.

FIG. 7 also includes a graph 512 of band steering events network-wide as an aggregate statistic. The band steering events are a movement of clients between bands (2.4 GHz and 5 GHz). The graph 512 illustrates network-wide statistics for band steering failures, successes, and trouble. Similarly, FIG. 7 also includes a graph 514 of client steering events which are a movement of clients between Wi-Fi devices.

The dashboard can also include a map display showing metrics related to the Wi-Fi systems being managed by the cloud-based NOC process 400. The map can be a geographic map which shows each Wi-Fi system (or groups) and location. A user can navigate the map, select an area, drill-down and select a single Wi-Fi system, or the like to update the other displays in the dashboard.

In an embodiment, the metrics for the cloud-based NOC process 400 can include Wi-Fi capacity, alarms, channel changes, band steering, channel change effectiveness, health statistics with bins, other parameters in bins, etc. The dashboard can by default display the metrics network-wide with the user being able to search/filter through various commands. Also, the user can define groups of Wi-Fi systems.

Figure 8:
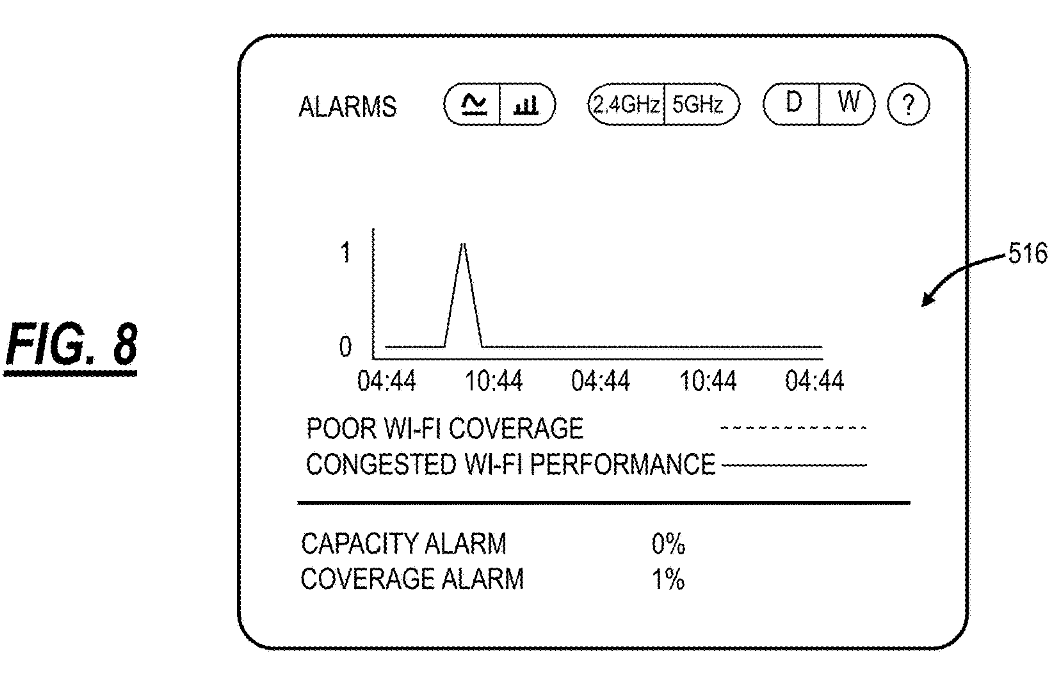
FIG. 8 is a tile in the dashboard illustrating a graph of alarms.

FIG. 8 is a tile in the dashboard illustrating a graph 516 of alarms. The graph 504 illustrates the alarms across all Wi-Fi systems being managed by the cloud-based NOC process 400. The graph 516 illustrates alarms for an individual (or group) of Wi-Fi systems as well as the alarms for a single Wi-Fi device. The graph 516 can be adjusted over time as well as having different lines for individual alarms as well as a line for all alarms in total. This provides a health display in the NOC with counts and percentages listed on the summary page across all of the networks.

The dashboard and/or cloud-based NOC process 400 can raise alarms against devices, networks, groups of devices, groups of networks, accounts, groups of accounts, etc. The alarms can be based on the monitored data and raised when the monitored data exceeds thresholds (which may be configurable). The alarm can have a time constant—how long is it in the bad state, some amount of hysteresis and the alarm may include more different factors simultaneously.

Figure 9:
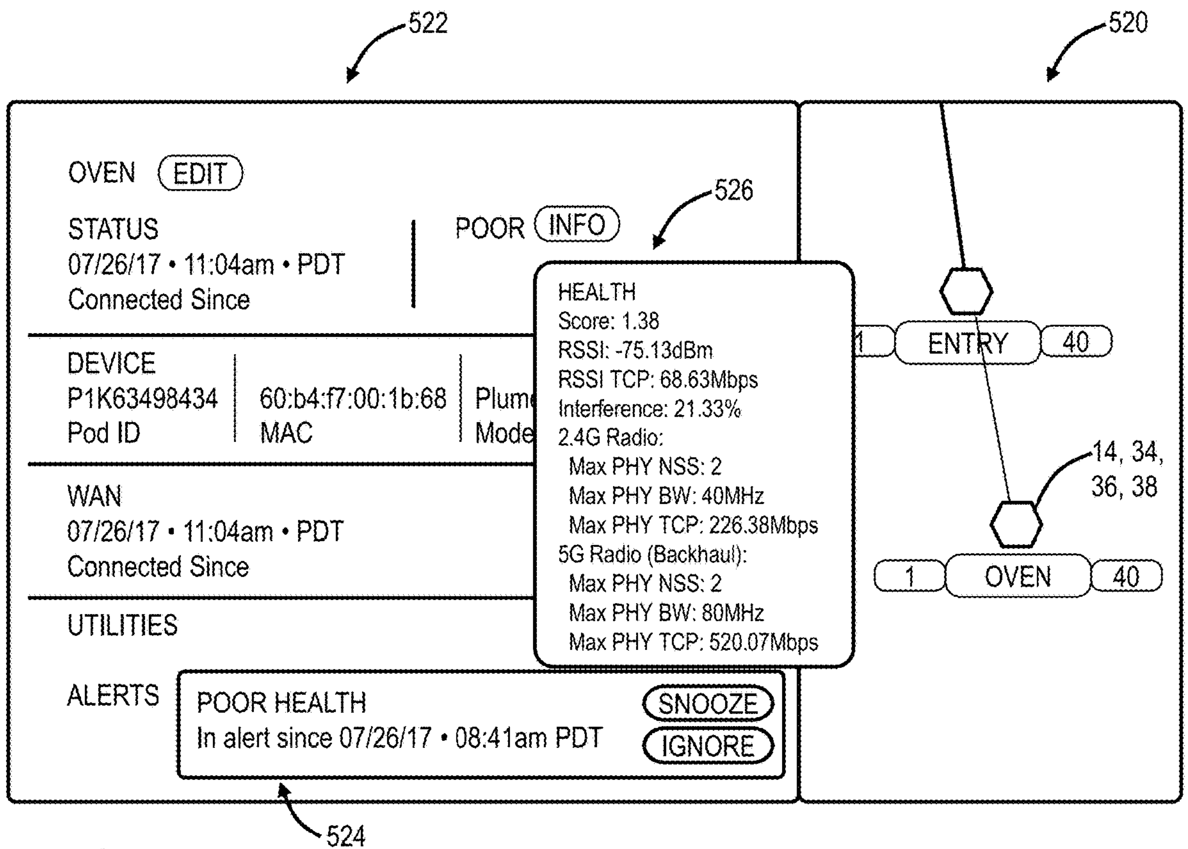
FIG. 9 is a screenshot of an individual device associated with a Wi-Fi network and/or account managed by the cloud-based NOC process.

FIG. 9 is a screenshot of an individual device associated with a Wi-Fi network and/or account managed by the cloud-based NOC process 400. Specifically, FIG. 9 includes a network diagram 520 and a device tile 522. The dashboard can include a GUI for the network diagram 520 which illustrates access points 14, 34, 36, 38 showing connectivity. For example, in the distributed Wi-Fi system 10, lines in the network diagram 520 can illustrate backhaul links (to other access points 14, 34, 36, 38) and client links (to user devices). The network diagram 520 can support zoom, scroll, etc. and click through, select, etc. to bring up details of a device, network, and/or group of networks and/or accounts. Further, the network diagram 520 can include color differentiation on the access points 14, 34, 36, 38, links, etc. For example, in FIG. 9, the access point "OVEN" can be red to indicate poor health and a user can click on the access point "OVEN" to bring up the device tile 522.

The device tile 522 provides status information such as the device name (OVEN, which can be edited), network health (POOR in this example), connection statistics (Jul. 26, 2017, etc.), device statistics (e.g., ID number, Media Access Control (MAC) address, manufacturer/model, etc. Finally, the device tile 522 can include an alert section 524 which shows an alarm/alert for the poor health and the user can select snooze or ignore.

For the network health, the user can click on an INFO button to bring up a health tile 526 which lists relevant health-related statistics and a score. The network health is a mechanism for a user/administrator to determine the operational status of the access points 14, 34, 36, 38. The score for the network health can be a weighted combination of different factors, such as RSSI, RSSI Transmission Control Protocol (TCP), interference, Number of Spatial Streams (NSS), bandwidth, TCP, etc. The score is meant to provide a meaningful comparison and encompass network operational parameters as well as outside effects such as interference. In this example, the device ("OVEN") uses a 5G channel for backhaul, e.g., on channel 40, to device "ENTRY" and a 2.4G channel for clients. The score here is 1.38 which is indicative of poor health.

Figure 10:
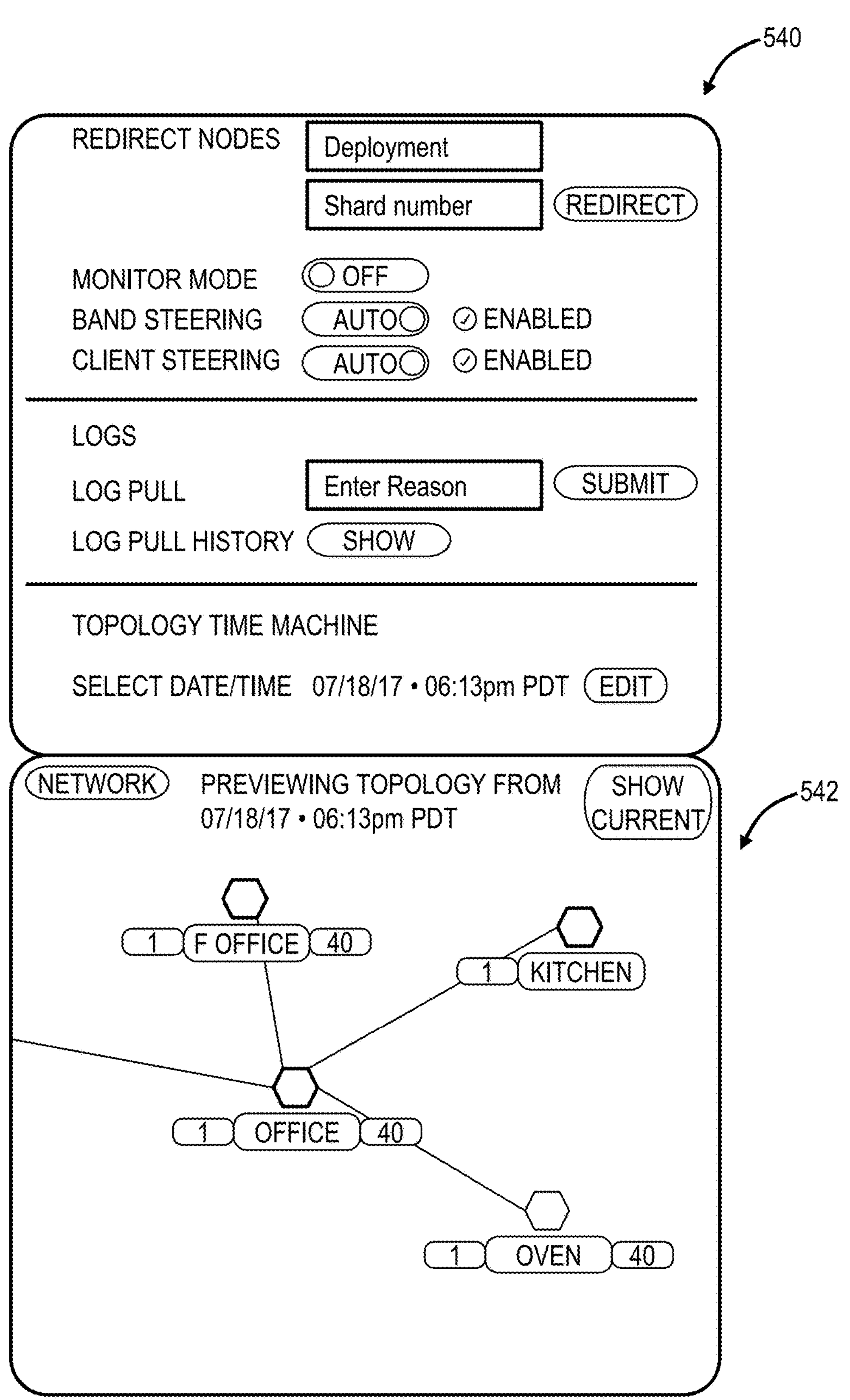
FIG. 10 is a screenshot of a network control tile and a topology time machine time for examining how a Wi-Fi network's topology evolves over time.

FIG. 10 is a screenshot of a network topology tile 540 and a topology time machine tile 542 for examining how a Wi-Fi network's topology evolves over time. As described herein, the distributed Wi-Fi network 10 can change its topology (interconnection of backhaul links, channels, etc.) over time based on periodic optimization. The intent of the topology time machine tile 542 is to configured optimizations, view logs and initiate a visualization of the topology. The optimizations can include forced redirection of nodes, a monitor mode, and configurations for band steering and client steering. Band steering statistics can include kick, failures, success, connects, disconnects, probes that the client device has sent, sticky, reject, etc. The visualization of the topology is presented in the network topology tile 540 which can show the evolution of the network topology over specified times in the topology time machine tile 542. This feature called "Topology time machine" which allows the user to go back to any particular time in the past and see the topology of the network including the connection of client devices to the network.

The topology time machine can also give reasons for the topology changes. Each optimization event which is triggered lists the reason that it is triggered which can include: onboarding of new access points, the manual trigger of optimization, statistics being reported by the access points changed enough to justify an optimization, an access point randomly disconnected or re-connected, etc. The topology time machine can also track channel changes, including ones being done to avoid interference, and track effectiveness of the channel changes both as an overall network aggregated report, and on an individual account basis. For example, the effectiveness of the channel changes can be defined as when a channel change successfully resulted in reduced interference, higher bandwidth, etc.

An operator can use the topology time machine to develop an understanding of best practices in Wi-Fi network deployment, Wi-Fi hardware configuration, etc. This expertise can be used to troubleshoot and optimize networks, build better hardware, etc.

Figure 11:
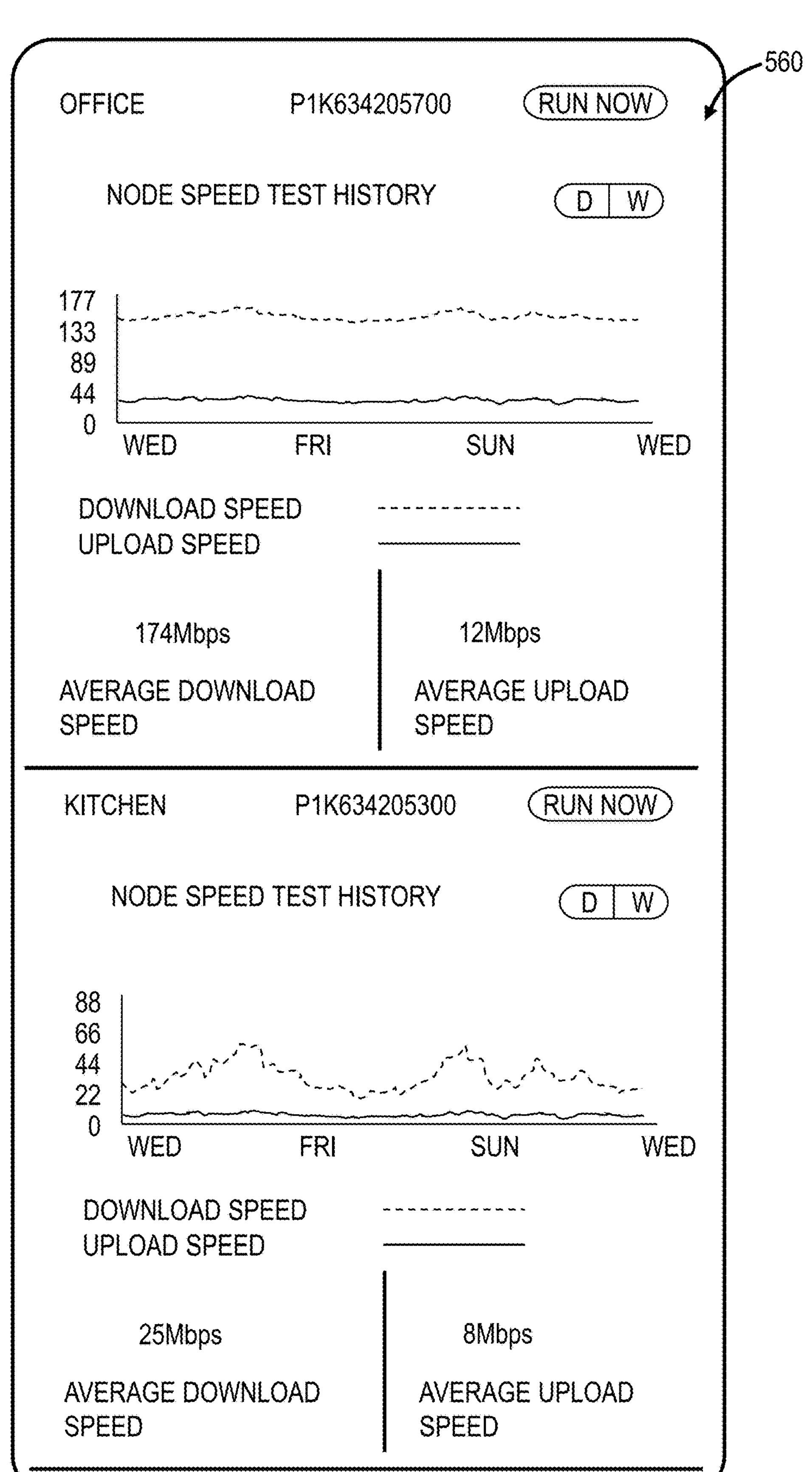
FIG. 11 is a screenshot of network speed test tiles for two nodes.

FIG. 11 is a screenshot of network speed test tiles 560 for two nodes. The cloud-based NOC process 400 can utilize periodically or on-demand speed tests to indicate the performance of a Wi-Fi network. The speed test can be performed as a gateway, at any node in a distributed Wi-Fi network 10, etc. In an embodiment, the speed test can be controlled from the NOC on demand, such as responsive to trigger conditions, periodic, etc. The speed test shows both download speed and upload speed over time.

In an embodiment, the NOC/dashboard can correlate the speed test to the topology time machine to alerts/alarms to develop an understanding of speed related to conditions and topology. All of this data can be incorporated into machine learning algorithms to determine correlations to improve network performance and optimization.

Figure 12:
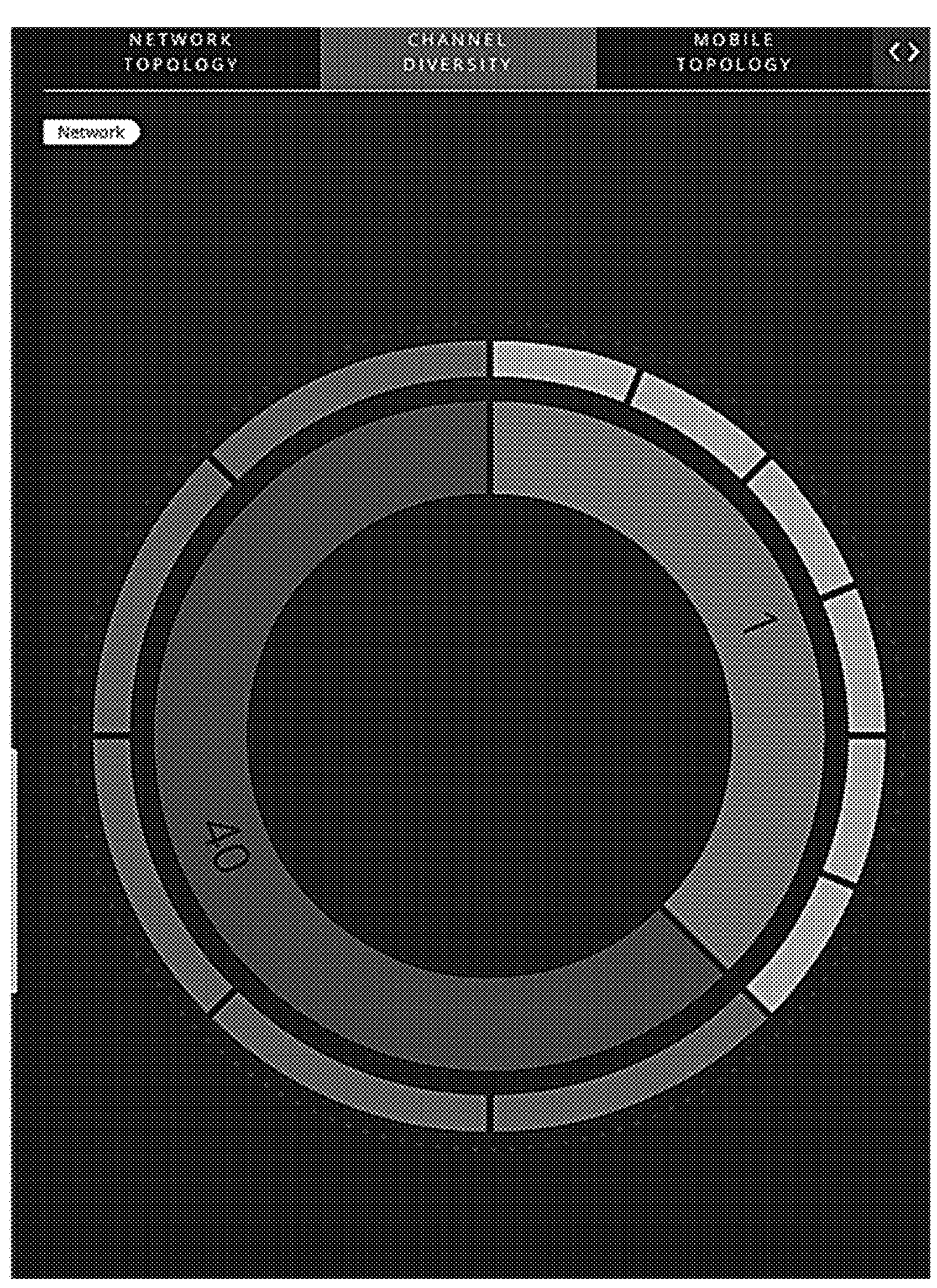
FIG. 12 is a screenshot of a circular graph tile indicating the state of the channel utilization in the Wi-Fi network.

FIG. 12 is a screenshot of a circular graph tile 560 indicating the state of the Wi-Fi network. Specifically, the circular graph tile 560 of channel diversity in an example Wi-Fi network. For example, in this network, two channels are used—channel 40 in 5G and channel 1 in 2.4G. The circular graph illustrates a distribution of channel usage. Other tiles can provide other visualizations related to the state of the Wi-Fi network (as well as groups or all Wi-Fi networks) including health scores (and the definition thereof), channel usage, frequency diversity plot, and the like.

Figure 13:
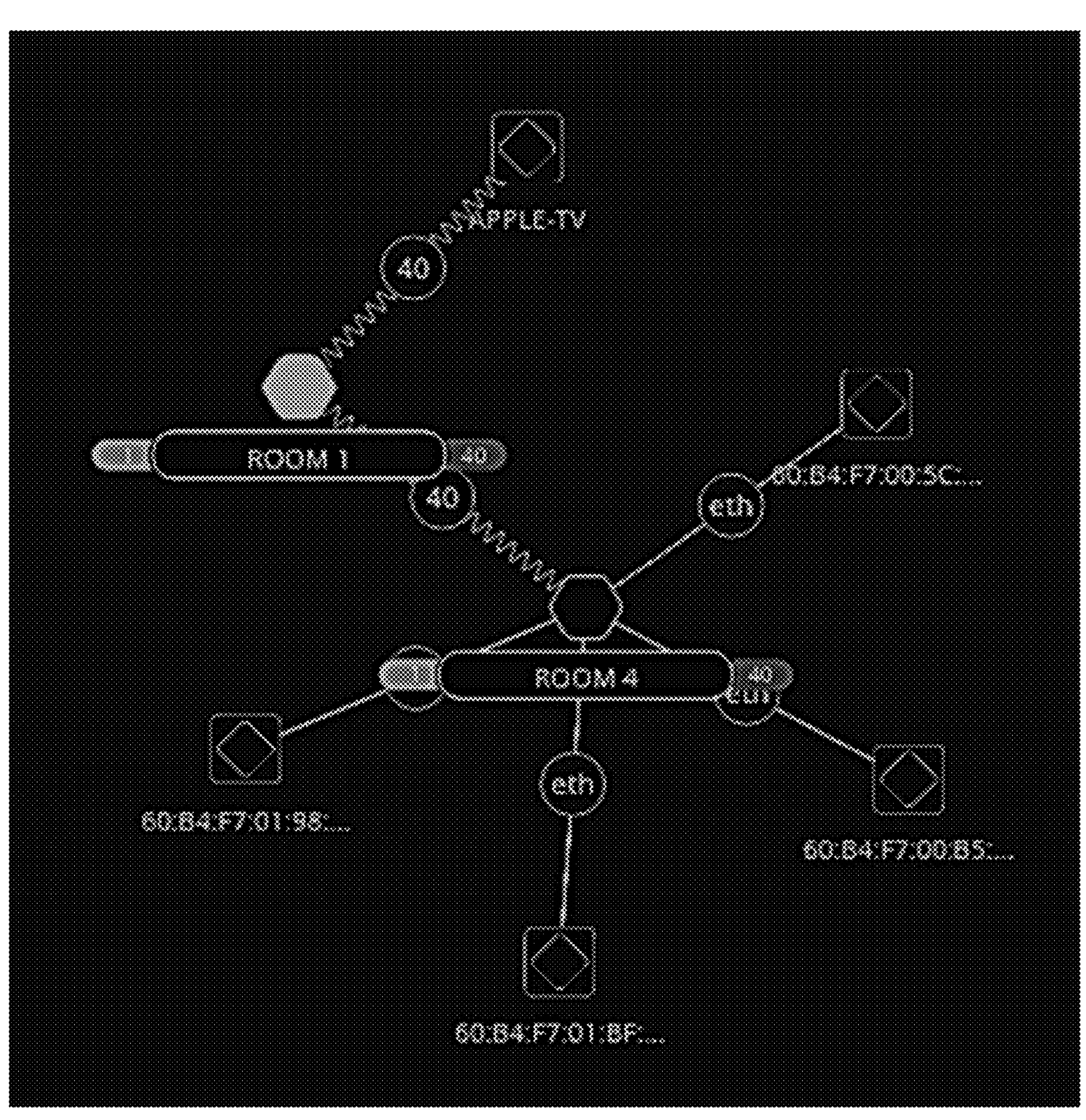
FIGS. 13, 14, and 15 are various screenshots of topology of a Wi-Fi network.
Figure 14:
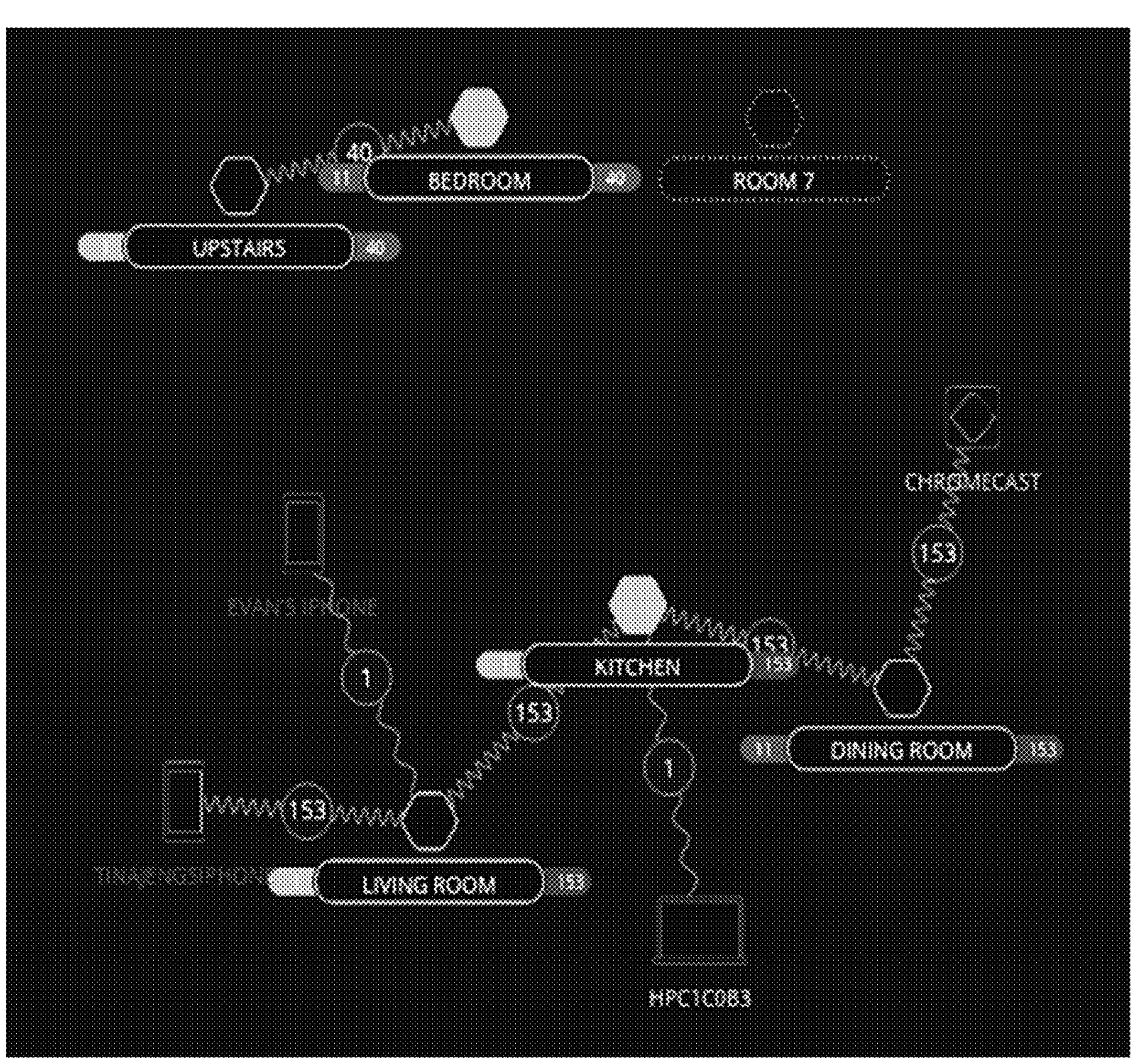
Figure 15:
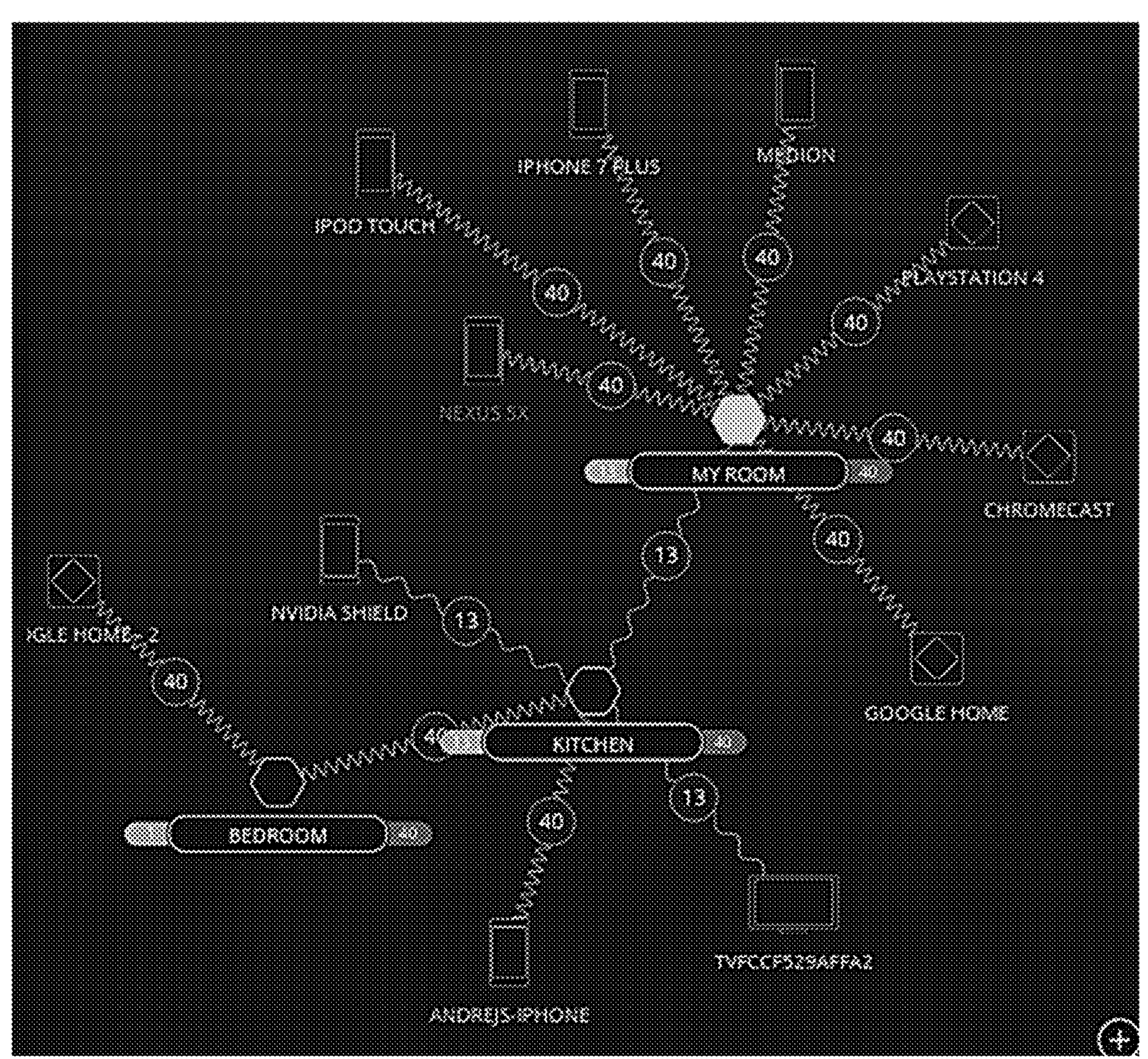

FIGS. 13, 14, and 15 are various screenshots of the topology of a Wi-Fi network. With the topology screenshot and the dashboard, a user can view the Internet Protocol (IP) addresses of any device, MAC address, software version and history of software upgrades, connected clients and their associated information (name, device type, IP address, MAC address, etc.), graphs of data consumed (by access point or node), physical layer data rates and speeds on individual links, etc. Further, this information is available anywhere in any network through navigation (click, scroll, etc.).

Of note, wireless links and access points are not quite one to one, as a given access point may have multiple wireless links, for example to the parent access point, the child access point, or to a client. The tabs have items related to both the access points and wireless links separately in general, and each could be characterized by a health score in general).

Figure 49:
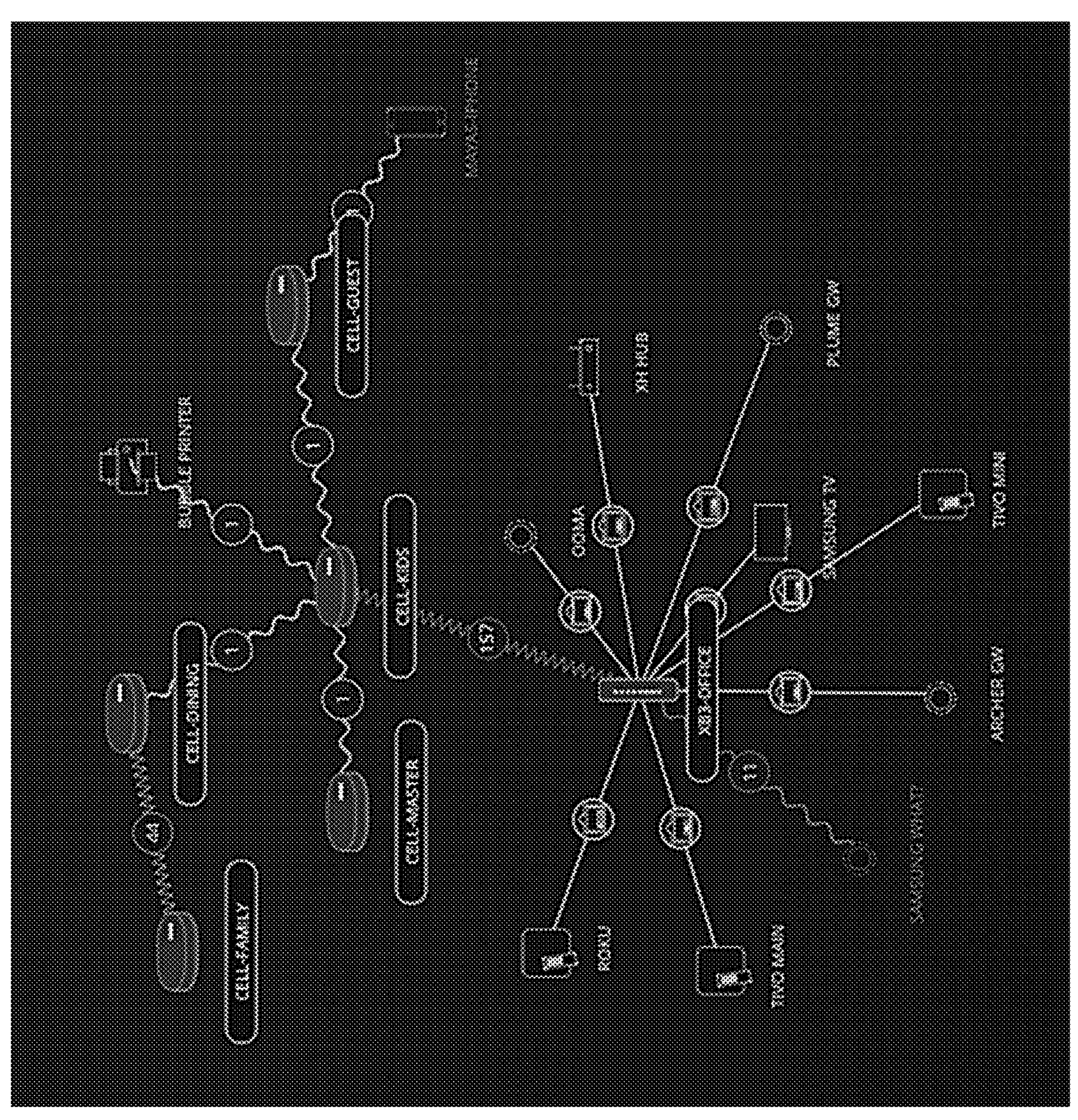
FIG. 49 is a screenshot of a topology display in which the icons used are representative of the actual physical devices in the network.

FIG. 49 is a screenshot of a topology display in which the icons used for various devices are representative of the physical devices in the network. The following examples can be seen in this figure: Roku media streaming device, Apple TV media streaming device, Samsung TV, Samsung Cell AP device, Apple iPhone device, Comcast XB3 gateway device, HP Inkjet printer, and a Xfinity Home Hub IoT home automation gateway. Many other devices are treated similarly and also contemplated. This is accomplished by typing the device which is connected to the network and matching that type to an icon. Device typing can be done using any combination of techniques known in the art, including MAC address Organizationally Unique Identifier (OUI), DHCP fingerprinting, web browser user agent identification, and other methods.

In an embodiment, the dashboard can include a master map showing all Wi-Fi networks under control of the cloud-based NOC process 400. The user can click on an individual network or enter a network identifier to bring up that network. For example, the network identifier can be tied to an account name. For example, each user's Wi-Fi network can be associated with an account (user ID, password, etc.) in the cloud-based NOC process 400.

The topology views provide a combined view of wired Ethernet and wireless links in Wi-Fi networks, connected clients, and the like. In particular, the topology views graphically illustrate connections between devices and whether they are on 2.4G or 5G, and what frequency channel they are on. Also, channels that are available for clients to connect can be shown.

The topology views can include different icons to convey different device types, e.g., access points, repeaters, laptops, desktops, tablets, mobile phones, media players, Internet of Things (IOT) devices, etc. Offline devices such as access points can be grayed, dimmed, and/or shown with dotted lines. The access point serving as the gateway can be shown differently, such as shaded as in FIGS. 13, 14, and 15. Also, multiple gateways can be shown wired to the Internet.

The access points' icons can also be color-coded to indicate health as described herein, e.g., green, yellow, red, etc. The color coding can be used to indicate throughput capability, interference, a calculated overall health metric, etc. Various items in the topology views can be clickable to bring up additional information related to the device, link, client, etc. The topology views can also present indicators related to the topology including channels, band, RSSI, local access channel, health status, alarm, off-line access points, bandwidth, channel capacity, channel gains, channel width, type of connection (e.g., Wi-Fi vs. Bluetooth vs. Zigbee).

The topology views can also automatically update in real-time based on optimizations, topology changes, etc. Further, the user has the ability to change the topology views with various options/preferences on what/how much information is shown).

FIG. 16 is a screenshot of a tile for a performed optimization. With the topology time machine, logs, etc., a history of optimizations can be maintained including inputs and outputs of each optimization, the reason that the optimization occurred, the amount the optimization was able to improve performance from what came before, time/date of optimization, how long the optimization took to complete, whether the optimization was deployed successfully or not. Also, the dashboard can provide the ability to see the topology graphically at the beginning of each optimization and the topology that was the output of each optimization.

The inputs and outputs to each optimization can be accessed in the NOC by clicking on the rectangular tabs shown across the bottom of the screenshot in FIG. 16. The first two rectangles link to tables that show the channel gain, or signal strength, between each of the access points. FIG. 44 illustrates a screenshot of such a chart. It is arranged as a matrix. Both the uplink and downlink (Tx and Rx) direction for each link is indicated in the table, making for a full matrix. Along with indicating the signal strength or channel gain as an absolute number, the chart can be color coded using thresholds to indicate which links have strong signal, and which are weak. In this example red, yellow, and green coloring is used to indicate strong, medium, and weak signal strengths for each of the links, any of which might be used to form a topology for the network. Finally, it is possible to highlight on the chart, through circling, or shading, which of the links were actually selected for use by the optimizer in the final topology. A table similar to this can be created for all possible links in the 5 GHz band, or any other additional bands or potential means of connecting the pods, including wired Ethernet, powerline, or cable connections.

Figures 45, 46:
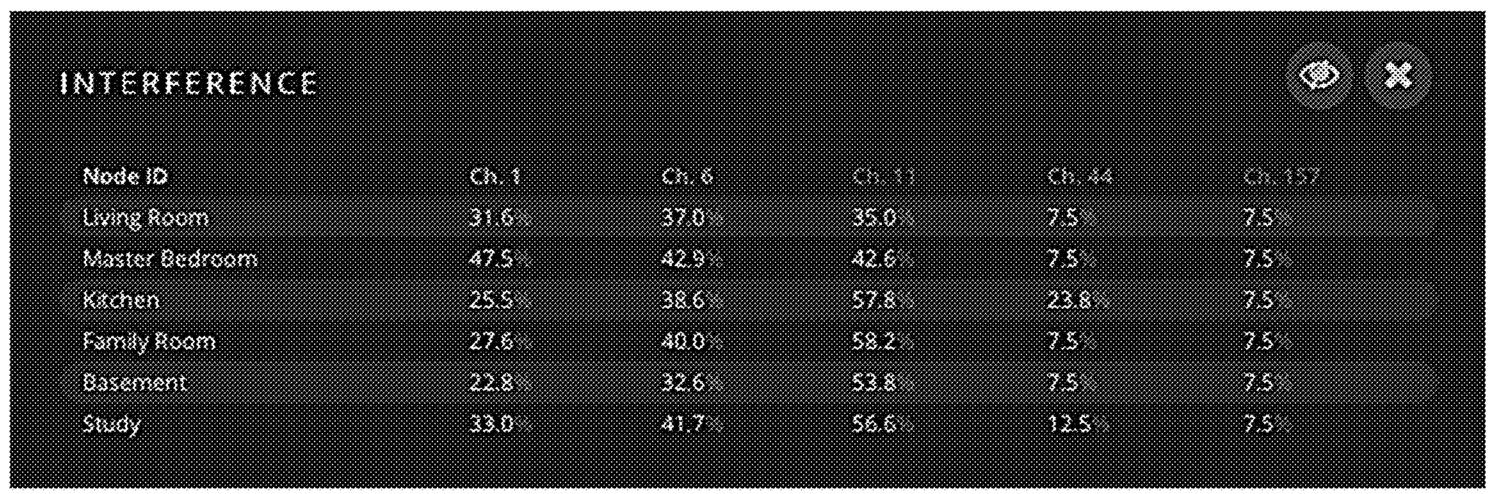
FIG. 45 is a screenshot of a table illustrating the percentage of air time consumed by interference at each access point on each frequency channel.
FIG. 46 is a screenshot of a table illustrating the predicted performance (throughput) that clients could achieve if they were connected to the given access point in the table on the frequency band indicated.

FIG. 45 illustrates the screenshot of a table that summarizes the interference levels at each of the access points on each frequency channel that were used as input to the optimization. Similar coloring and shading schemes can be used to highlight acceptable/unacceptable levels of interference. This table can be called up using the INTERFERENCE rectangle at the bottom of the optimizer screen (FIG. 16).

FIG. 46 illustrates a screenshot of a table that represents an output of the optimization. Once the optimizer has chosen a topology, it is possible to estimate the throughput performance that a client would achieve were it to connect to the given AP on the given frequency band or channel. This provides the user of the NOC with an immediate indication of the expected level of performance at each location in the home which can be accessed through the PERF PREDICT button.

FIG. 47 illustrates a screenshot of a table similar to the gain table, but in this case indicating the estimated PHY data rate that could be achieved between any two access points. In this table, these rates are specific to the frequency channel used to connect the two access points. Coloring schemes can be used to highlight links with good or bad performance. Links that are actually chosen for use by the optimizer can be circled. All tables regarding throughputs, whether estimated, measured, or predicted, can be PHY layer data rates, MAC layer throughputs, or IP (TCP or UDP) throughputs.

FIG. 48 illustrates a screenshot of a table similar to the estimated PHY data rate table, but in this case based on actual measurements of the performance of the link in real life. Again, coloring and circling can indicate performance levels and links actually selected by the optimizer. Note that any of the tables described may be incomplete if data is missing. Data may be missing because a link has never been used, or because off-channel scanning is not enabled for that channel.

NOC Dashboard

In an embodiment, information displayed in an NOC dashboard can include the following tabs account, network, advanced settings, optimizer, speed test, links, access point devices, client devices, etc. The Account tab displays basic profiling information relevant to a user. As described herein, a user is an owner of a Wi-Fi network under management by the NOC dashboard and the cloud-based NOC process 400. In the account tab, the username, email, application Operating System (OS) and version, location, creation date, etc. can be available. Following e-mail validation and onboarding, the access point devices seen by an onboarding process are visible. As described herein, onboarding is the process of bringing a Wi-Fi network under control of the NOC dashboard and the cloud-based NOC process 400. The onboarding can use a mobile device, application, and wireless protocol such as Bluetooth. The account tab enables the administrator to delete an account, assign a group to the account, modify the username and/or SSID, resend e-mail verification, etc.

The network tab displays details of current and historical structural Wi-Fi configurations. The current network state can be mapped in the network topology, channel diversity, and mobile topology. In order to view historical network states, the topology time machine can be used. The network tab can assist administrators in troubleshooting. In order to troubleshoot with system logs, a log pull can be submitted and accessed through the created link. In addition, the administrator can re-configure the network. This involves rebooting a location, claiming/unclaiming an access point device, modifying the SSID, PSK (Password), and the band steering state.

The advanced settings tab displays current systemic Wi-Fi configurations. The advanced settings tab can also assist the administrator in troubleshooting. The administrator can use the tab to modify the network mode, Universal Plug and Play (UPnP), Domain Name System (DNS) Servers, Dynamic Host Configuration Protocol (DHCP) reservations, bridge versus router mode, and port forwarding settings.

The optimizer tab displays logs of optimization jobs performed for the location. Tapping on the different headers can provide insight on the KPI triggers and purpose of the job. The optimizer tab can enable the administrator to push manual optimization triggers and toggle the auto-optimization on/off. The speed test can trigger remote speed tests at individual access point devices and automated Internet Service Provider (ISP) speed tests on the system. In addition, it will allow the administrator to toggle Automated ISP Speed Test on/off, along with providing a dashboard to view results.

The links tab provides a focus on the client links and the backhaul links. The tab can provide sorted information on the medium, band, and channel attributes of the links. The access point devices tab provides an overview of the location from the perspective of the access point devices. Sorted information on the number of devices connected, firmware versions, MAC, IP, and connection date details can all be visible upon clicking show details. The access point devices tab assists the administrator in troubleshooting as well. Clicking on any access point will bring up controls that enable setting a Light Emitting Diode (LED) Mode to locate, rebooting an access point, or running speed tests on the access points. After results are updated to the cloud, the speed tests on the access points will move to the Speed Test tab mentioned above. The client devices tab provides an overview of the location from the perspective of devices. Clicking on any device will provide in-depth information such as connection type, IP, and MAC addresses, RSSI values, bandwidth usage values over different periods of time.

Onboarding Using the NOC Dashboard

Figure 17:
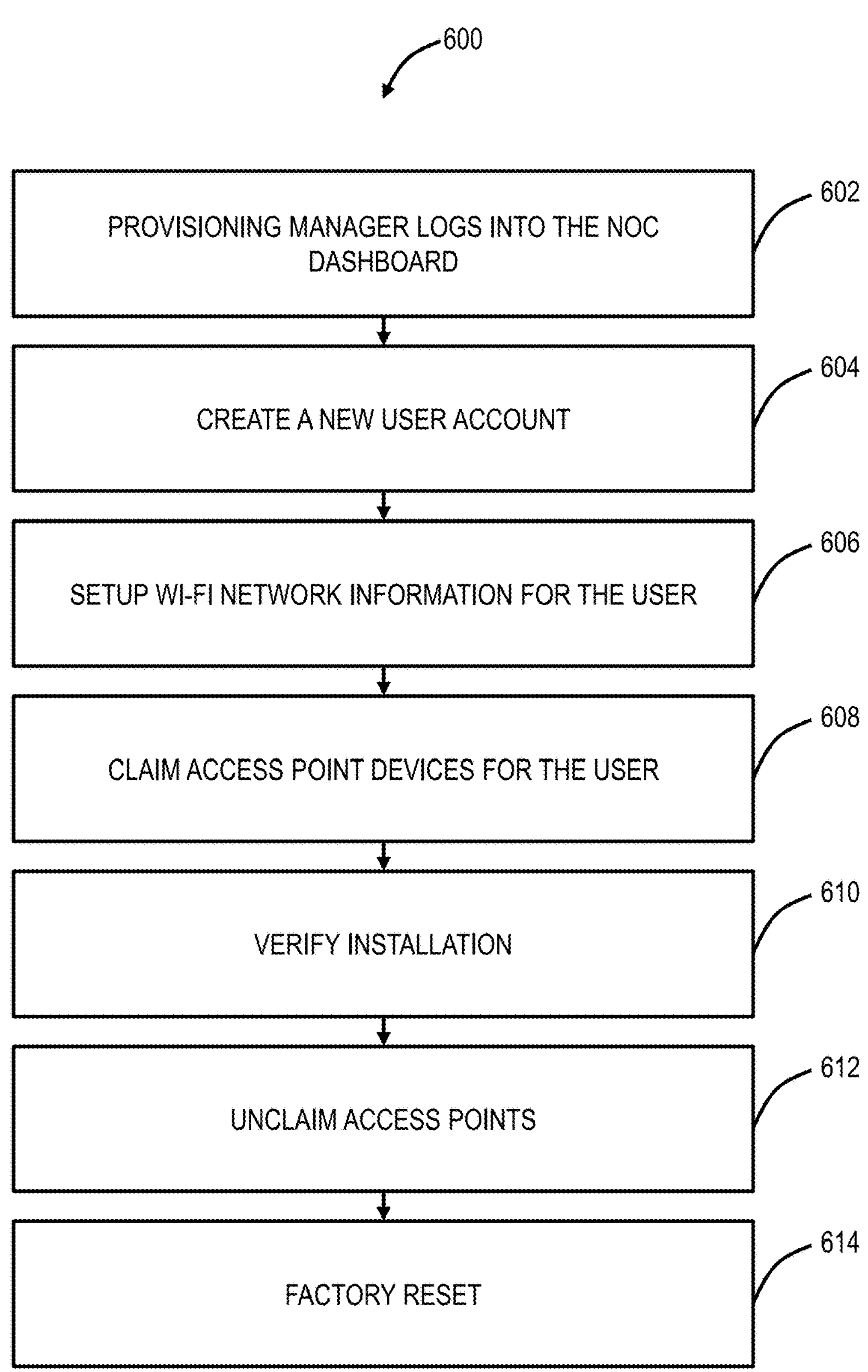
FIG. 17 is a flowchart illustrates an onboarding method using the NOC dashboard.
Figure 20:
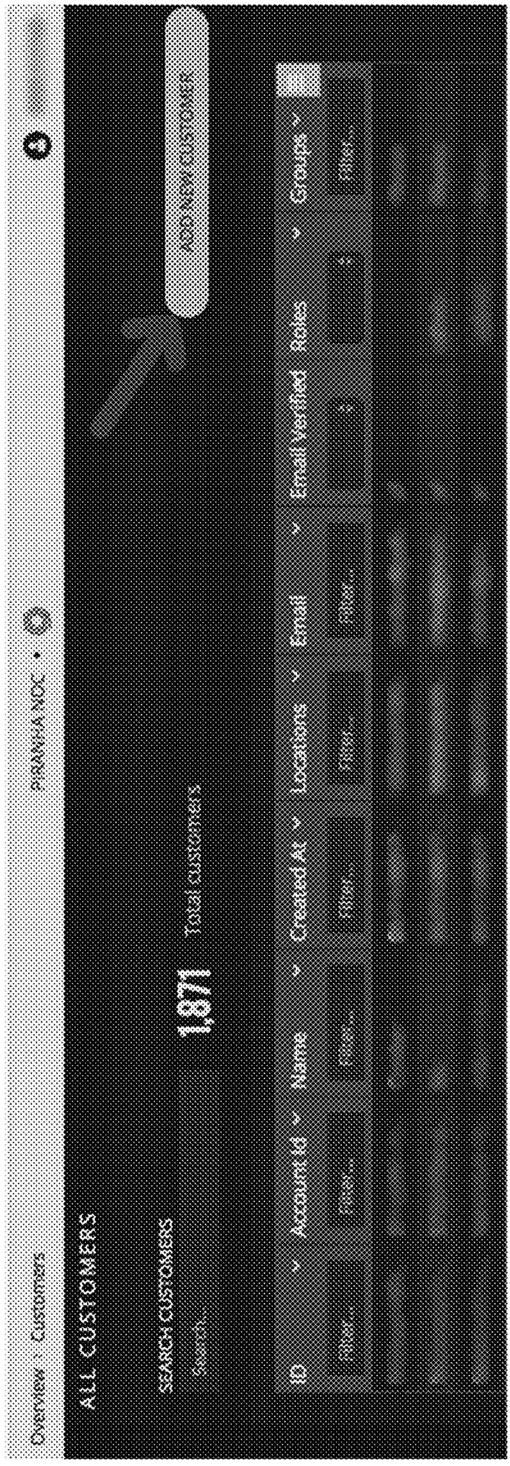
FIG. 20 is a screenshot of a listing of all customers in the NOC dashboard.

Referring to FIG. 17, in an embodiment, a flowchart illustrates an onboarding method 600 using the NOC dashboard. The NOC dashboard can be used by an administrator to assist end users in deploying their Wi-Fi network. The onboarding method 600 includes a provisioning manager logging into the NOC dashboard (step 602). FIG. 18 is a screenshot of a login screen for the NOC dashboard. Next, a new user account is created (step 604). For a new user, a new account may need to be created through the NOC dashboard without using an app, i.e., without the user themselves creating the account. From any screen click the pulldown menu next to the login name at the top right corner of the screen, as shown in FIG. 19. Subsequent to selecting All Customers in FIG. 19, the window in FIG. 20 appears which is a listing of all customers. To add a new customer, click on the Add New Customer button in FIG. 20 to bring up the fields shown in FIG. 21.

Figure 21:
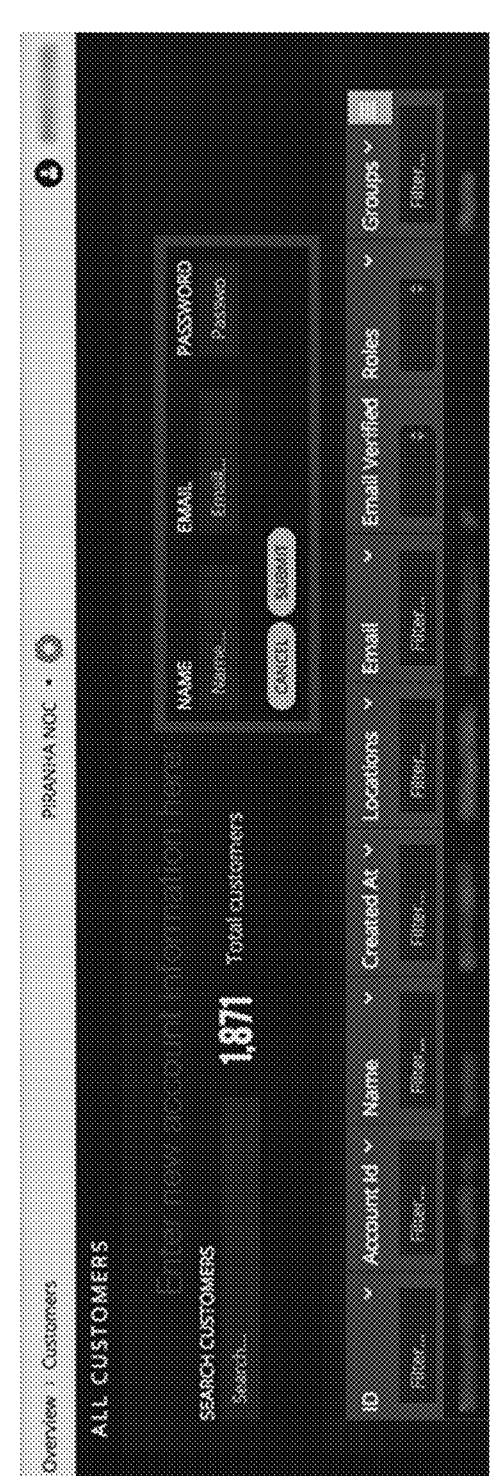
FIG. 21 is a screenshot of fields for adding a new customer in the NOC dashboard.
Figures 22, 23:
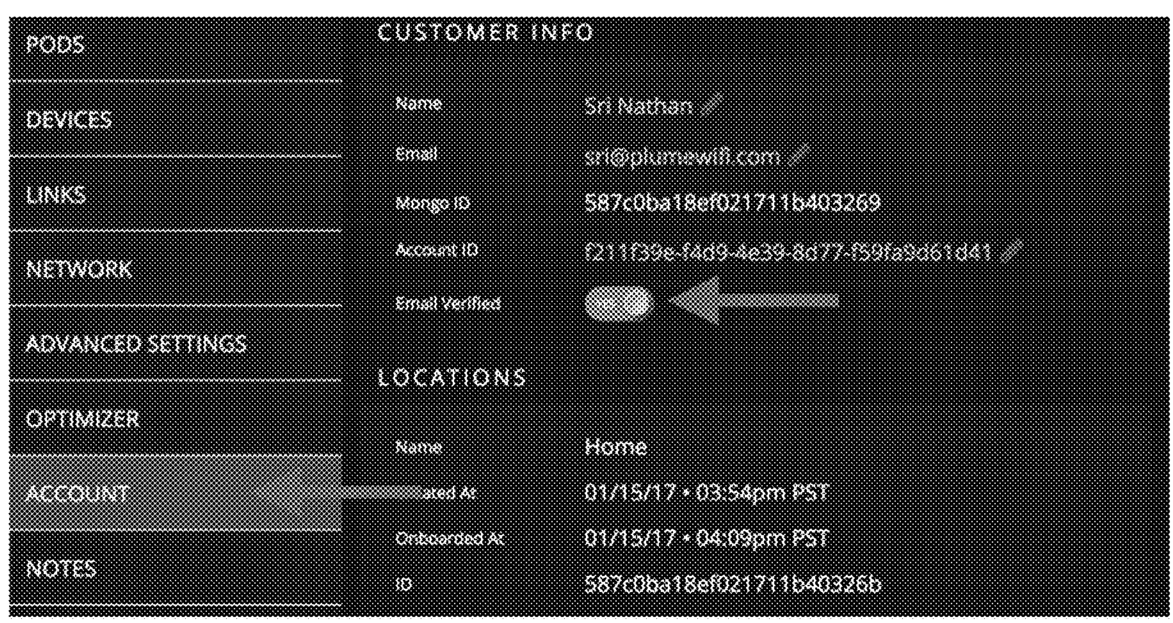
FIG. 22 is a screenshot of an account tab after email verification of a new customer account.
FIG. 23 is a screenshot of the network controls to add/edit the SSID and passphrase.

In the space provided in FIG. 21, an email address and a password can be added. Now, this account can be searched for by typing either the name or the email address in the Search Customers field in FIG. 21. FIG. 22 is a screenshot of an account tab after email verification of a new customer account.

Next, the Wi-Fi network information (SSID and passphrase) can be set for the user (step 606). FIG. 23 is a screenshot of the network controls to add/edit the SSID and passphrase. The SSID and passphrase will be automatically synchronized across all access point devices joining the network. Next, the access point devices are claimed for the user (step 608). Again, as described herein, the access point devices can include any of the access points 14, 34, 36, 38. The process of claiming associates the access points to the user.

The claiming process can include entering access point serial numbers, receiving data from a mobile application which locally claims the access point devices, associating the serial numbers to a user in the factory or at the point of sale, through the installation of software on the access points, through software pre-installed on the access points, etc. That is, the cloud-based NOC process 400 contemplates any technique to identify the access points to the NOC dashboard uniquely.

Figure 24:
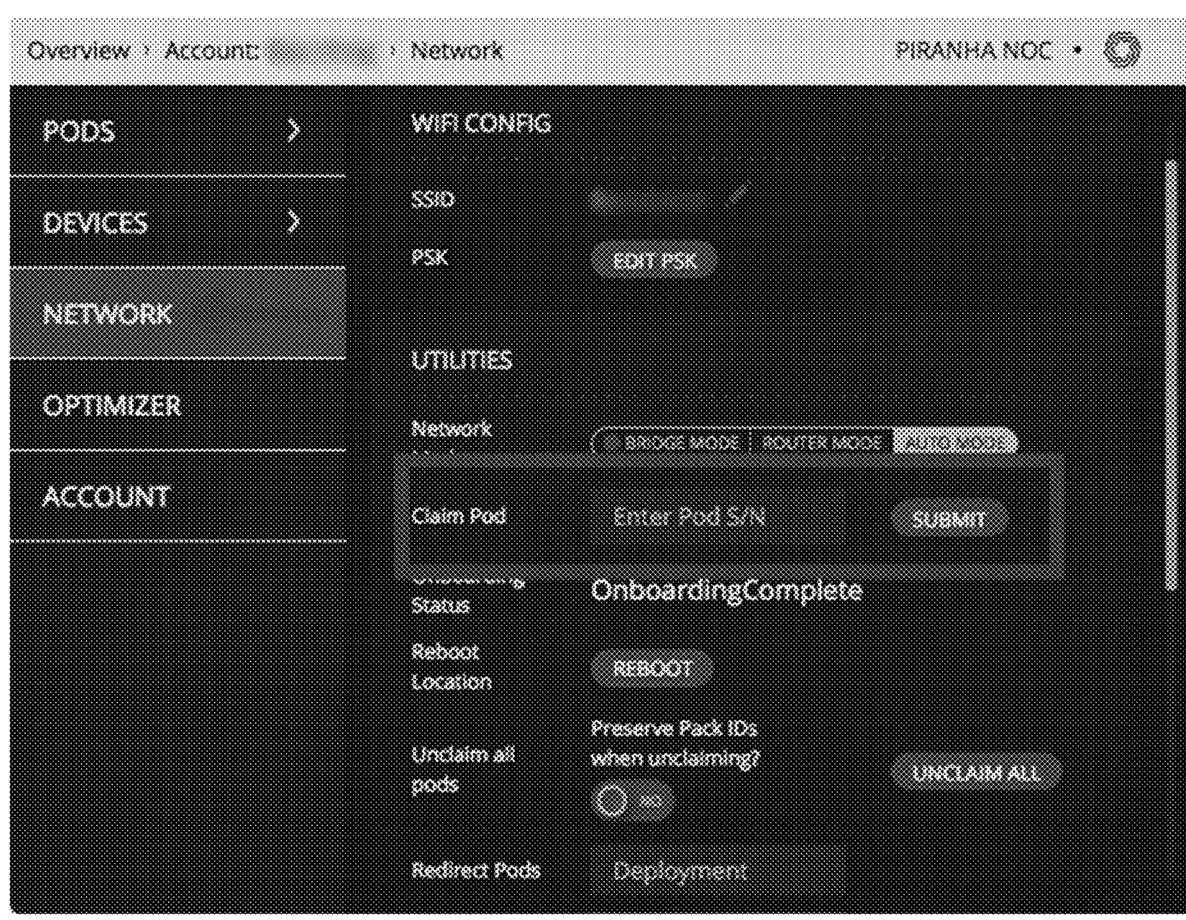
FIG. 24 is a screenshot of claiming access points by entering serial numbers in the NOC dashboard.

In an embodiment, the claiming is performed by providing the serial numbers of each access point in the NOC dashboard. FIG. 24 is a screenshot of claiming access points by entering serial numbers in the NOC dashboard. The process can be completed to claim multiple access points for a user. Since multiple access points are typically deployed for each distributed Wi-Fi system 10, with proper logistics support, it is also possible to pre-bundle multiple access points into "packs" such that entering the serial number of one access point from a pack allows the entire pack of access points to be claimed automatically. For example, if a pre-bundled pack of six access points was to be installed for a user, the technician need only enter one serial number, and the entire pack of six access points will be automatically claimed for the user. Soon after the serial number is entered, an icon representing the access points will appear on the network window on the right (Number of icons should match the number of access points claimed one at a time or as a pack). Note an "OnBoardingComplete" button is recommended to select after the access points are claimed for this account. This is the way to inform the NOC dashboard that there are already access points claimed to this account, and at login, the app for the user will see the home screen instead of onboarding screen.

Figure 25:
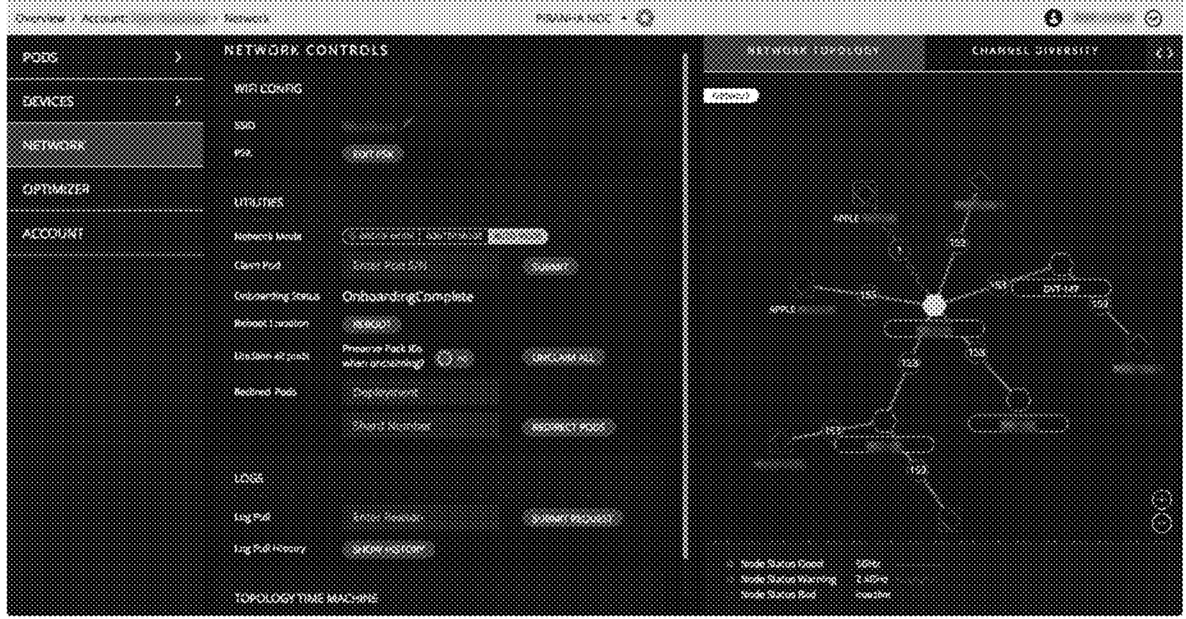
FIG. 25 is a screenshot of a network topology subsequent to claiming access points.

Next, the installation is verified (step 610). Within minutes of plugging in the access points, the NOC dashboard shows that the access points are online (the icon can change from Red to Green). Note that under "Network Topology" in FIG. 25, one solid hexagon and three empty green hexagons are shown. Each hexagon represents an access point. The color green can signify that the access point is online and functioning correctly. The solid green hexagon represents the gateway access point, i.e., the one that is connected using Ethernet backhaul (note multiple access points can be connected to the gateway). Should there be access points that have been claimed for the user but are not online, such access points will be represented as red hexagons in the NOC's topology view.

Figures 26, 27:
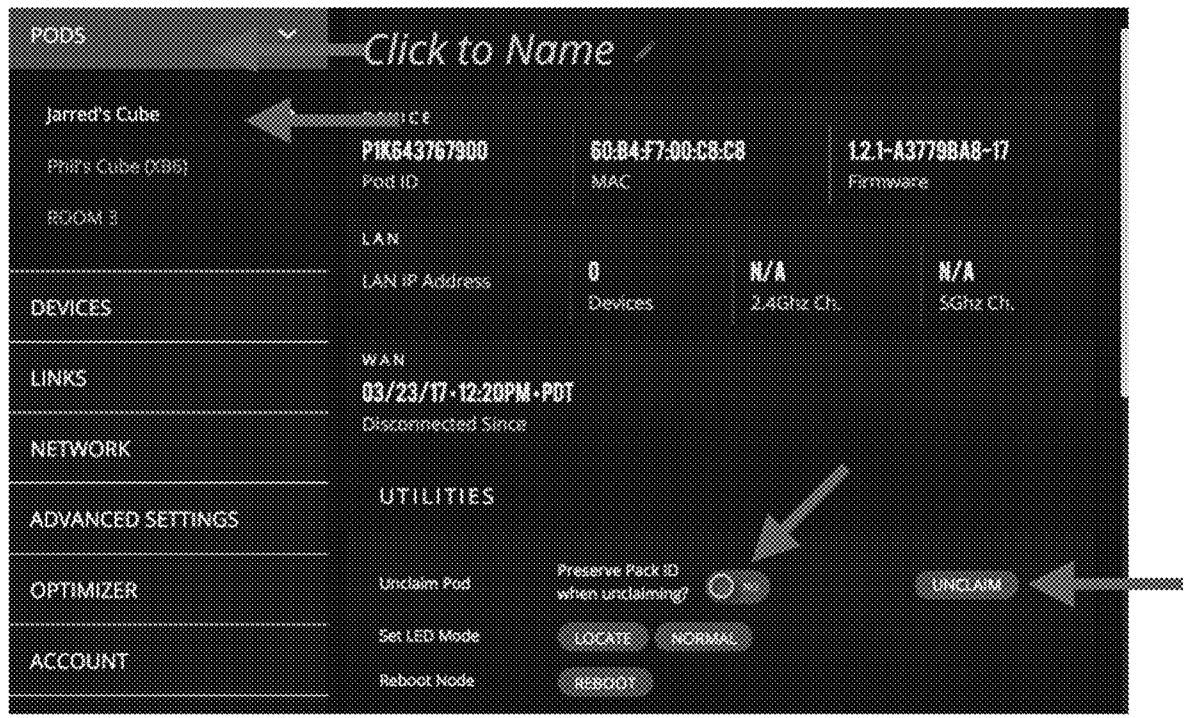
FIGS. 26 and 27 are screenshots of an access point tab for unclaiming.

Optionally, access points can be unclaimed (step 612). It is possible also to remove access points from a given account as shown in FIG. 26—select PODS Tab; a list of all the access points in that account will appear; select the access points to remove from the account, and click unclaim. As described earlier, often, the access points are shipped in a group). If the preserve pack ID when the unclaiming button is not selected then that access point is disassociated from the group permanently. The sole purpose of Pack ID is to provide a shortcut to the user by allowing to enter one single serial number in the Pack and claiming the rest of the access points in that Pack automatically. Similarly, it can provide a shortcut for unclaiming groups of access points. Once the access point is unclaimed without preserving the Pack ID, that access point will be considered to belong to a pack of one. Finally, a factory reset can be performed (step 614), such as to remove all access points from a given account as shown in FIG. 27.

NOC Dashboard Operations—Finding an Account

Figure 28:
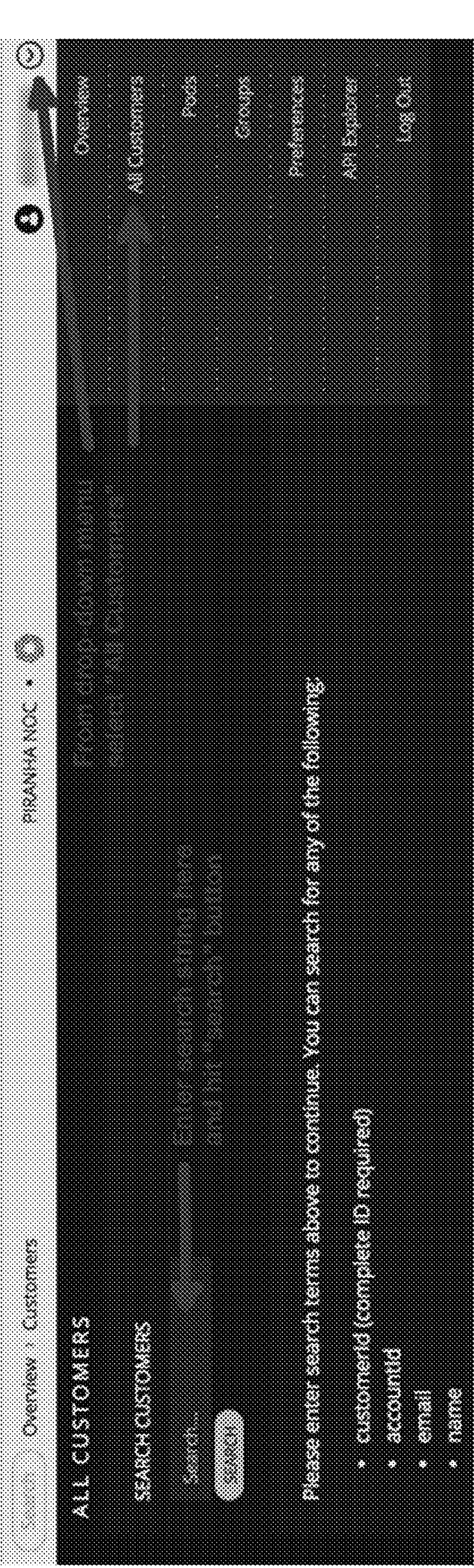
FIG. 28 is a screenshot of finding accounts.

FIG. 28 is a screenshot for finding accounts. To find an existing account—1) hover over the username at the top-right corner of the NOC screen to activate a drop-down menu, 2) from the drop-down menu, select "All Customers," 3) in the Overview>Customers screen, type in the search string and then hit the "search" button, the search string may be the account's partial name, partial email address, partial Account_ID, or complete customerId, and 4) select the account from the search results. Additionally, at any time, the "Search" field on the top left corner of the screen may be used to find any account by name.

NOC Dashboard Operations—Groups—Concept and Management

Figure 29:
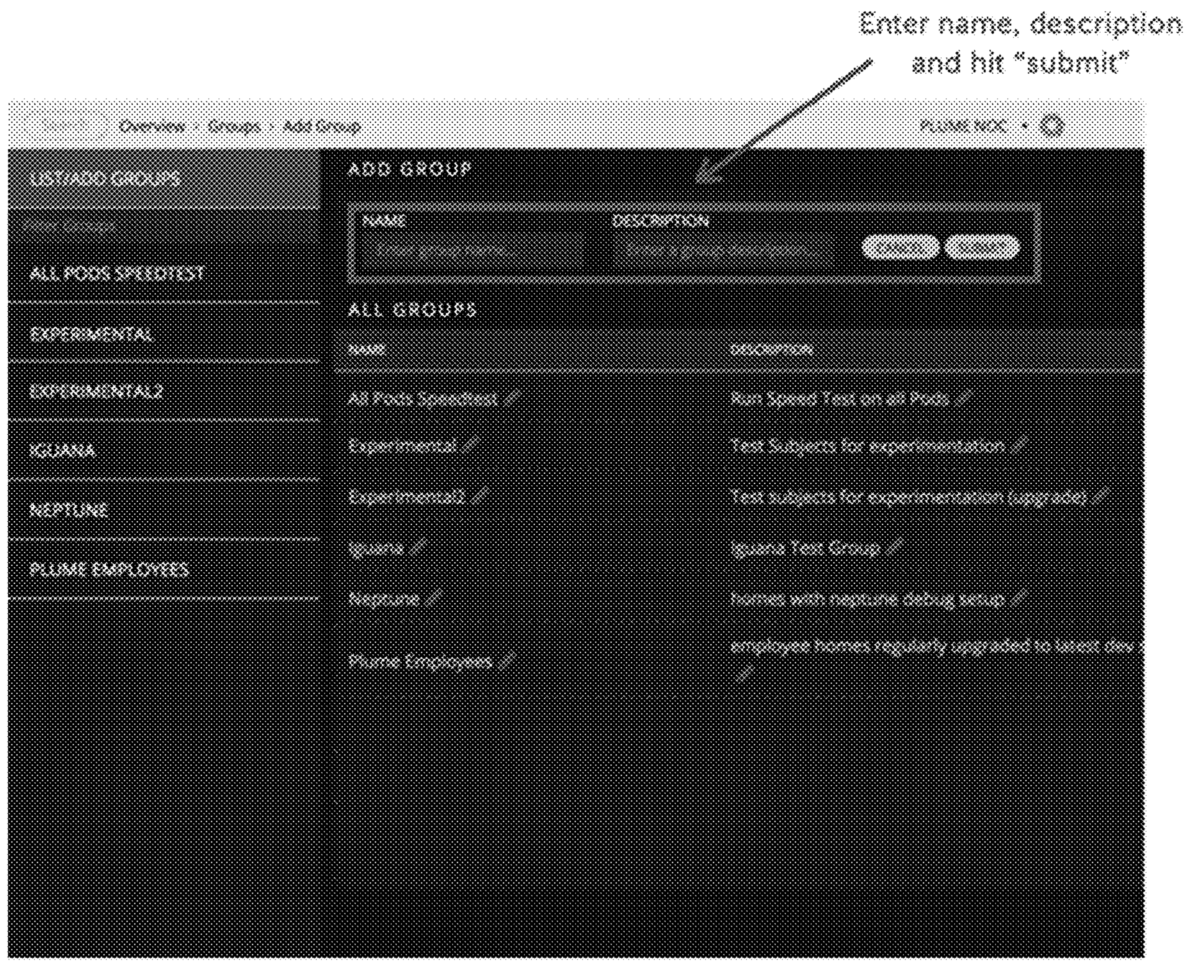
FIG. 29 is a screenshot of a groups tab for adding a new group.

A "Group" is a construct designed to help separate accounts into groups that can separately protected from visibility and actions of "Group Administrators." The rules for Groups are simple: an account that has been given "Group Admin" privilege can only see and administer other accounts belonging to the same Group. FIG. 29 is a screenshot of a groups tab for adding a new group. To create a new group—1) hover over the username at the top-right corner of the NOC screen to activate the drop-down menu, 2) from the drop-down menu, select "Groups," and 3) near the bottom of the Overview>Groups screen, enter the new group's name and description, then hit the "submit" button.

Figure 30:
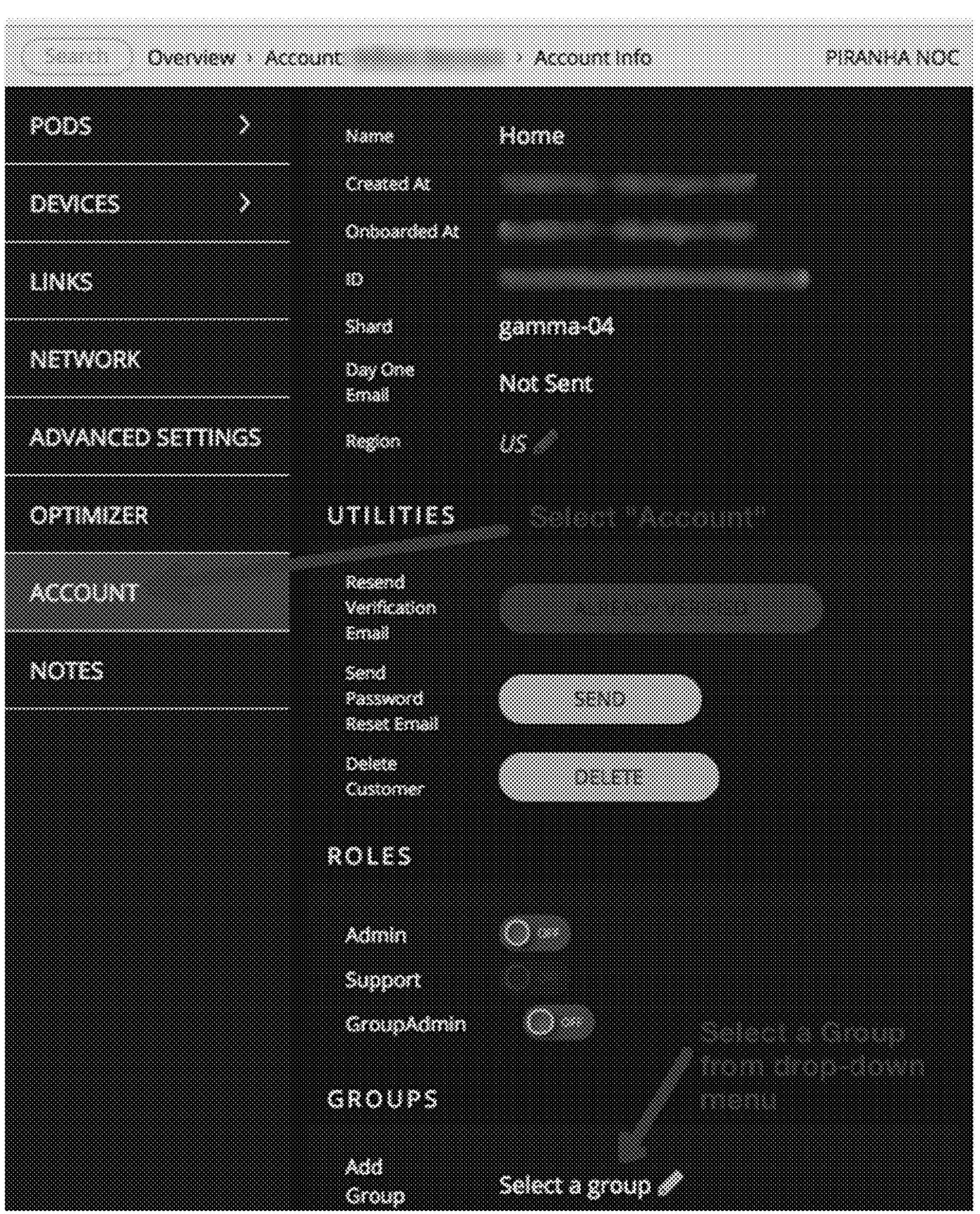
FIG. 30 is a screenshot of account administrative actions and reports.

FIG. 30 is a screenshot of adding accounts to a group. To add an account to a Group—1) select and go to an Account (see the "Finding an Account" section above), 2) in the Overview>Account: [name] screen, select the "Account" tab from the left panel, 3) scroll down the middle pane, near the bottom, click "Select a group" to activate a Group selection drop-down menu, and 4) select a Group from the drop-down menu and hit the "submit" button. Note, an account can be added to multiple Groups.

NOC Dashboard Operations—Network View

Figure 31:
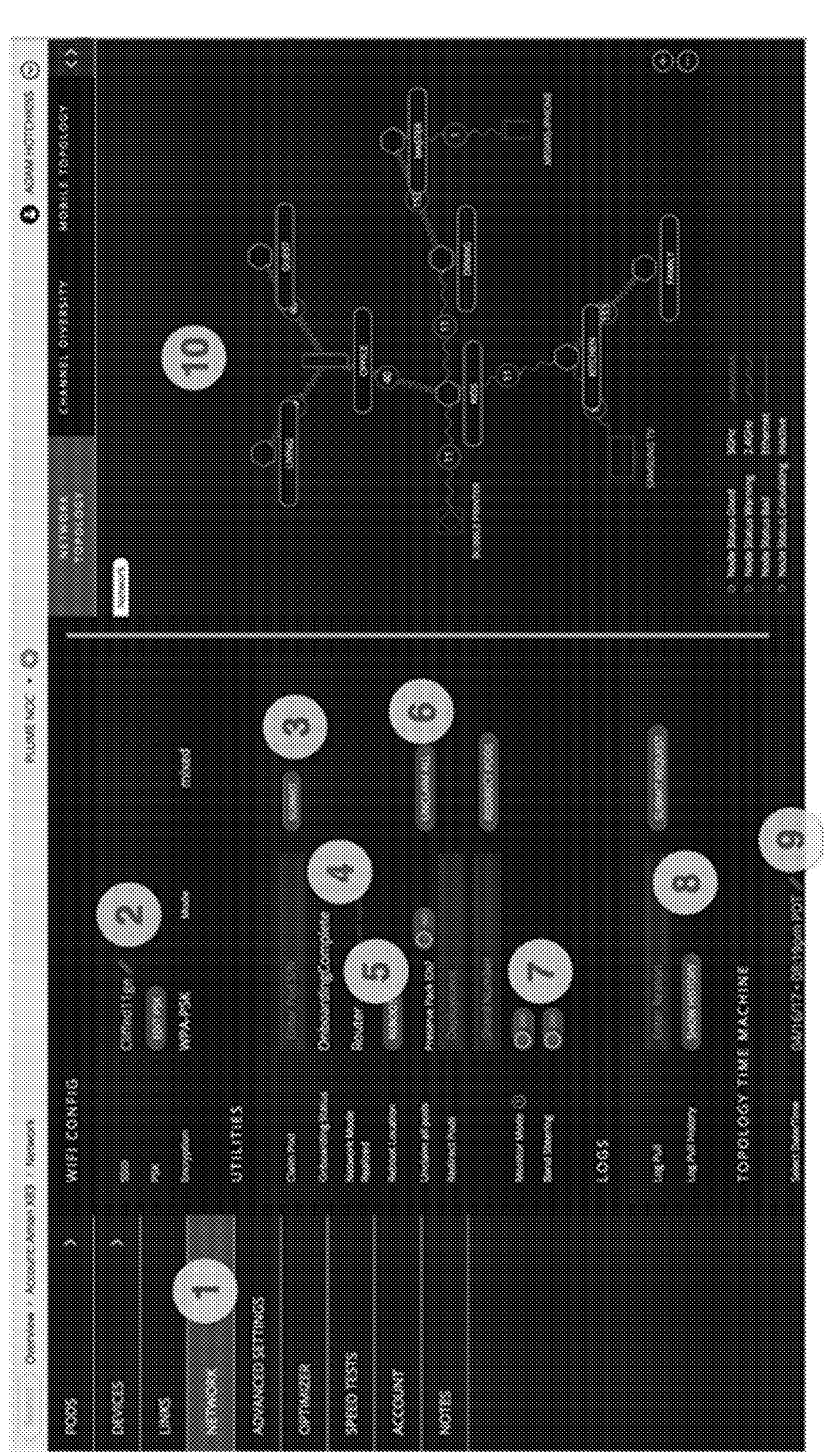
FIG. 31 is a screenshot of the NOC dashboard illustrating a navigation tree, actions and statistics, and a network topology map.

FIG. 31 is a screenshot of the NOC dashboard illustrating a navigation tree, actions and statistics, and a network topology map. The items in the NOC dashboard are as follows:

| No. | Function | Description |
|---|---|---|
| 1 | Navigation Tree | Select these tabs to navigate between the different functions. |
| 2 | SSID and PSK | Read or change the SSID/PSK for all APs on the network |
| 3 | Claim APs | Enter the AP ID to claim new APs or gateways to the customer network |
| 4 | Helpful Network Status for Support | These fields provide status if:<br>1) The customer has finished with App Onboarding<br>2) If the Network is in Router or Bridge mode |
| 5 | Reboot network | Reboots ALL APs in the network location |
| 6 | Unclaim all APs | Selecting this button removes ALL the APs from the location. When selecting "Preserve Pack IDs" toggle, then the APs will retain their original Pack grouping. If it is not selected, then each AP will be isolated without any grouping. |
| 7 | Network Settings | Monitor Mode:<br>When selected, the GW can ONLY be monitored for statistics. No provisioning or channel changes are permitted in this mode.<br>Band Steering:<br>Enable or disable band steering for the location. |
| 8 | Log Pull | Use this function to generate and upload Logs from each AP to the cloud. This function should only be performed with proper training. A reason for the log pull should be descriptive and present for all log pulls. A history of the previous log pulls, their descriptive reason and the Uniform Resource Locator (URL) where they are located is provided. |
| 9 | Topology Time Machine | Set the time to view the network connections at that time in the network topology frame. It may take a few seconds to pull up the result depending on the number of historical topologies saved in the database. |
| 10 | Network Topology View | This frame holds details of the AP-to-AP and AP-to-Device connection details. Connections are updated in real time through events (e.g., a device connecting to an AP) |

Figure 32:
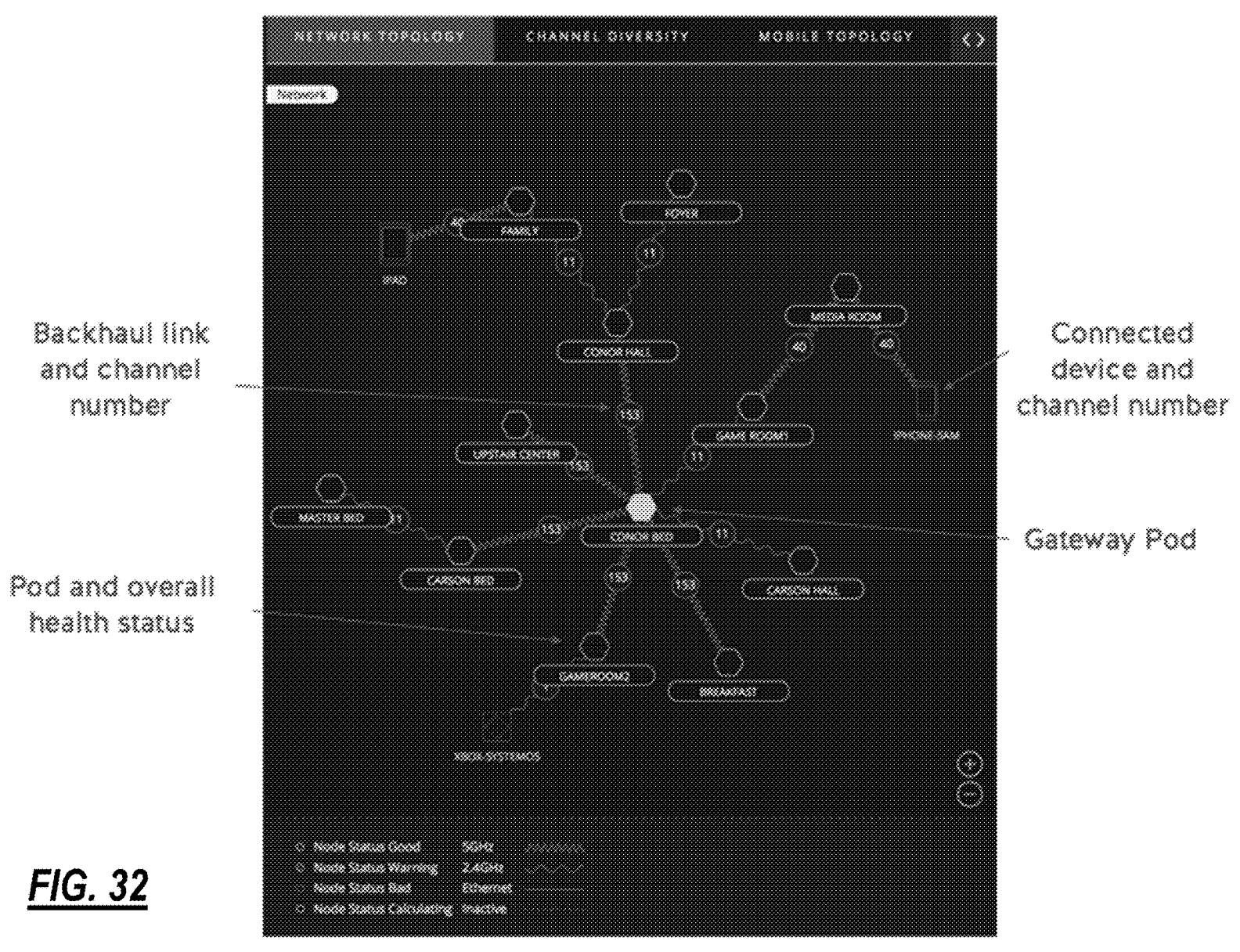

FIG. 32 is a screenshot of a network topology view. Once a user account has been selected, the network topology view is displayed on the right side of the screen. The network topology view comprehensively shows the state of the network, including all Pods (access points) that are parts of the network and all end-user devices connected to the network. The user can click on an access point, an end-user device, or a link channel number to see more information specific to the access point, end-user device, or link.

NOC Dashboard Operations—Account Details

Figure 33:
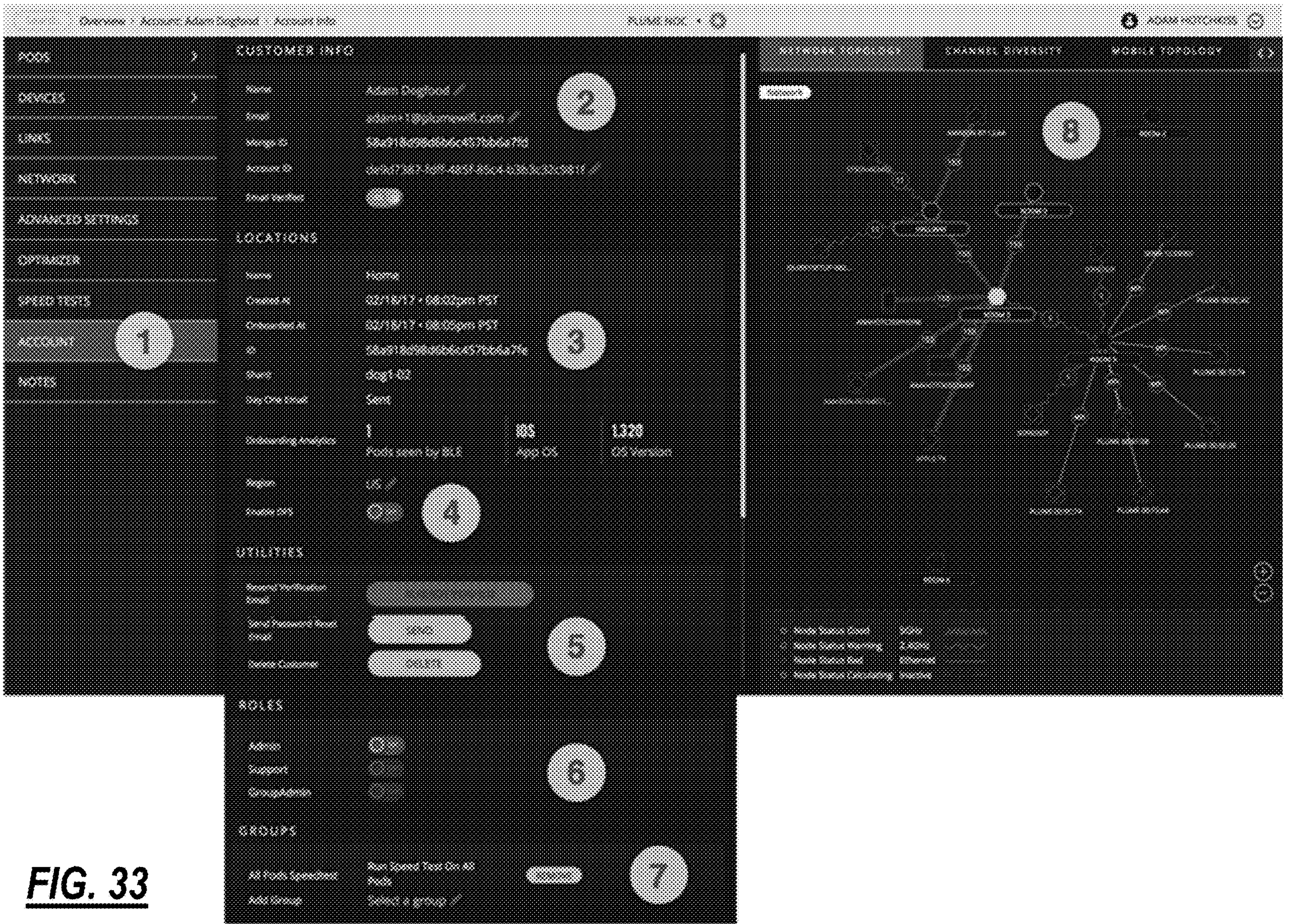
FIG. 33 is a screenshot of an account view providing details about the account owner and permissions.

FIG. 33 is a screenshot of an account view providing details about the account owner and permissions. The items in the NOC dashboard in FIG. 33 are as follows:

| No. | Function | Description |
|---|---|---|
| 1 | Navigation Tree | Select these tabs to navigate between the different functions. |
| 2 | Account Details | The Account Details contains the following:<br>1) Name (editable)<br>2) Email (editable)<br>3) Mongo ID (database reference key)<br>4) Account ID (editable)<br>5) Email verified toggle (email verification is required for NOC login) |
| 3 | Location Details | The Location Details section contains the following information about the network location:<br>1) Location name (defaults to "Home")<br>2) Date and time the account was created<br>3) Date and time the APs were onboarded<br>4) Location ID (database key)<br>5) Number of APs seen during onboarding, phone type used and version of app used for onboarding |
| 4 | Geographic Location | These settings select the Region (e.g., US, EU, CA) for channel selection as well as the permitted use of DFS channels for that location. |
| 5 | Location Utilities | The following actions are allowed for the account:<br>1) Resend verification email if the user has never verified the email<br>2) Send an email to ask the user to reset the email password<br>3) Unclaim all the APs and delete the account. This is NOT recommended. |
| 6 | Roles | Set the user login to have Admin or Group Admin privileges for remote monitoring. |
| 7 | Groups | Add the location ID to any Groups to control the visibility to only accounts within that Group. |
| 8 | Network Topology View | This frame holds details of the AP-to-AP and AP-to-Device connection details. Connections are updated in real time through events (e.g., a device connecting to an AP) |

NOC Dashboard Operations—Access Point View for an Account

Figure 34:
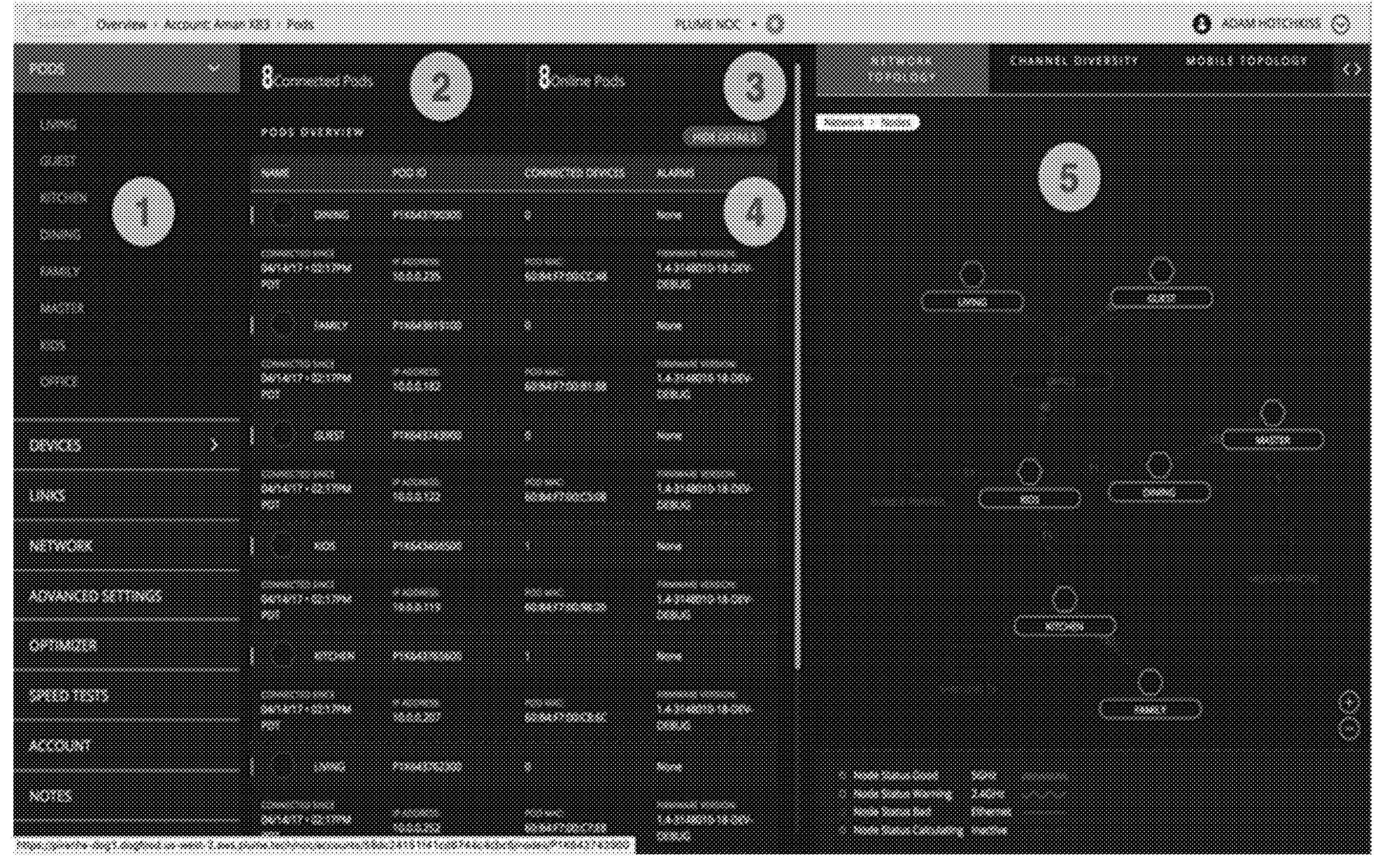
FIG. 34 is a screenshot of an access point view illustrating all access points associated to an account.

FIG. 34 is a screenshot of an access point view illustrating all access points associated to an account. To show more details about the access points, click on the "SHOW DETAILS" button in the middle pane. The button toggles between "SHOW DETAILS" and "HIDE DETAILS." To get all the details for a particular Pod, click on the Pod's name. The items in the NOC dashboard in FIG. 34 are as follows:

| No. | Function | Description |
|---|---|---|
| 1 | Navigation Tabs | Select these tabs to navigate between the different functions. |
| 2 | Pod Status | Lists the total number of APs claimed to the account location and the number of APs currently online. |
| 3 | AP Detail Enable | Select this button to see AP Details. |
| 4 | AP Details | The following AP details are provided:<br>1) AP Nickname/Location<br>2) Serial number<br>3) No. connected devices<br>4) Alarm State<br>5) Connected since or connected last<br>6) IP Address<br>7) MAC Address<br>8) Firmware version |
| 5 | Network Topology View | This frame holds details of the AP-to-AP and AP-to-Device connection details. Connections are updated in real time. Only the APs are highlighted in this view. |

NOC Dashboard Operations—Client Devices View

Figure 35:
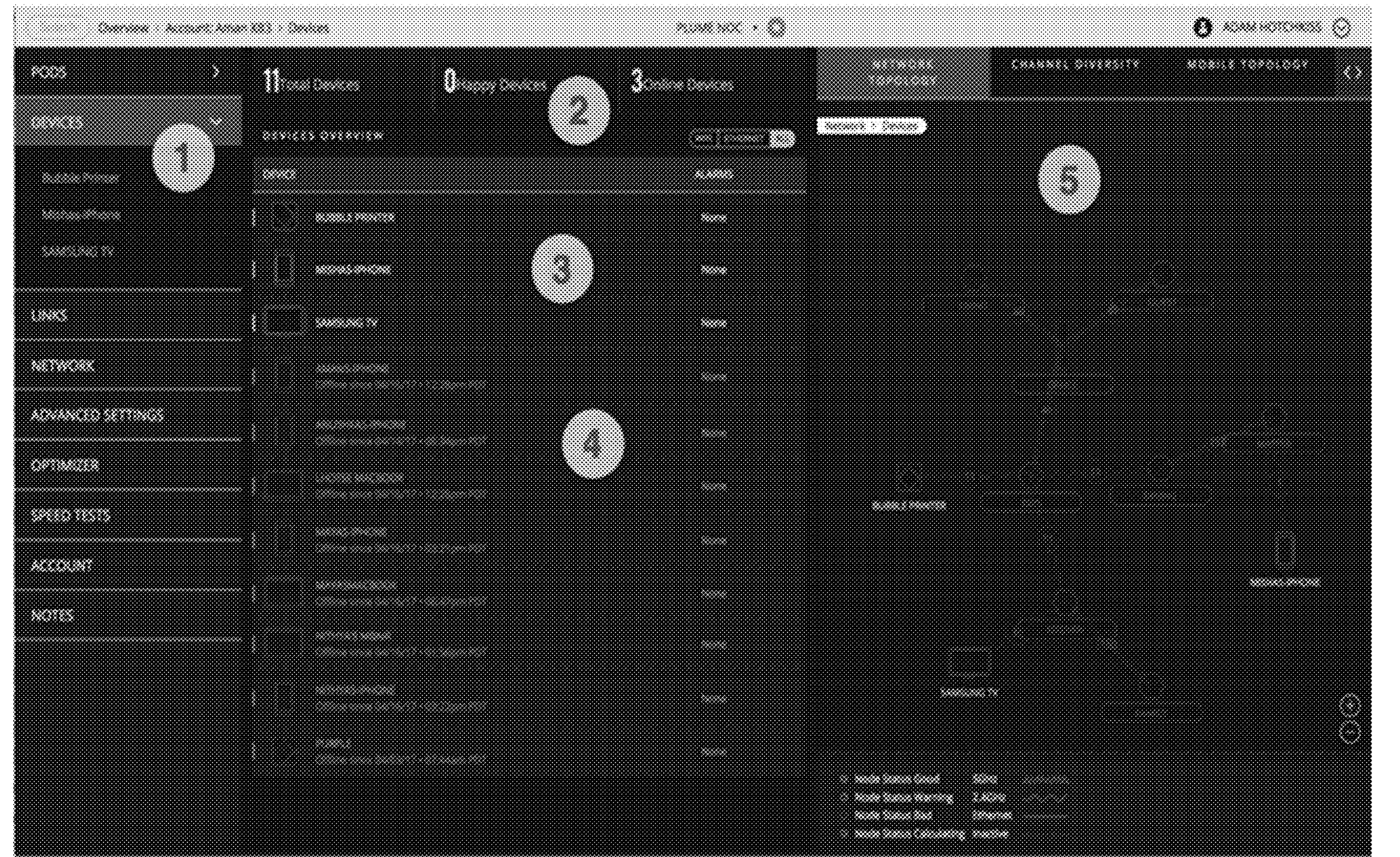
FIG. 35 is a screenshot of a client devices view illustrating all client devices connected in a Wi-Fi network associated with an account.

FIG. 35 is a screenshot of a client devices view illustrating all client devices connected in a Wi-Fi network associated with an account. The list shows currently connected as well as recently disconnected devices. The items in the NOC dashboard in FIG. 35 are as follows:

| No. | Function | Description |
|---|---|---|
| 1 | Navigation Tabs | Select these tabs to navigate between the different functions. |
| 2 | Device Status | Lists the total number of Devices seen by the network in the last 14 days, number of devices without alarms, and number of devices currently online. |
| 3 | Online Device List | Shows the online devices, their hostname or MAC if the hostname is not available and if any alarms are active. |
| 4 | Offline Device List | Shows the offline devices, their hostname or MAC if the hostname is not available, the recent alarm state when it went offline and the time it was last seen online. |
| 5 | Network Topology View | This frame holds details of the AP-to-AP and AP-to-Device connection details. Connections are updated in real time. Only the Devices are highlighted in this view. |

NOC Dashboard Operations—AP-to-AP Link PHY Rates

Figure 36:
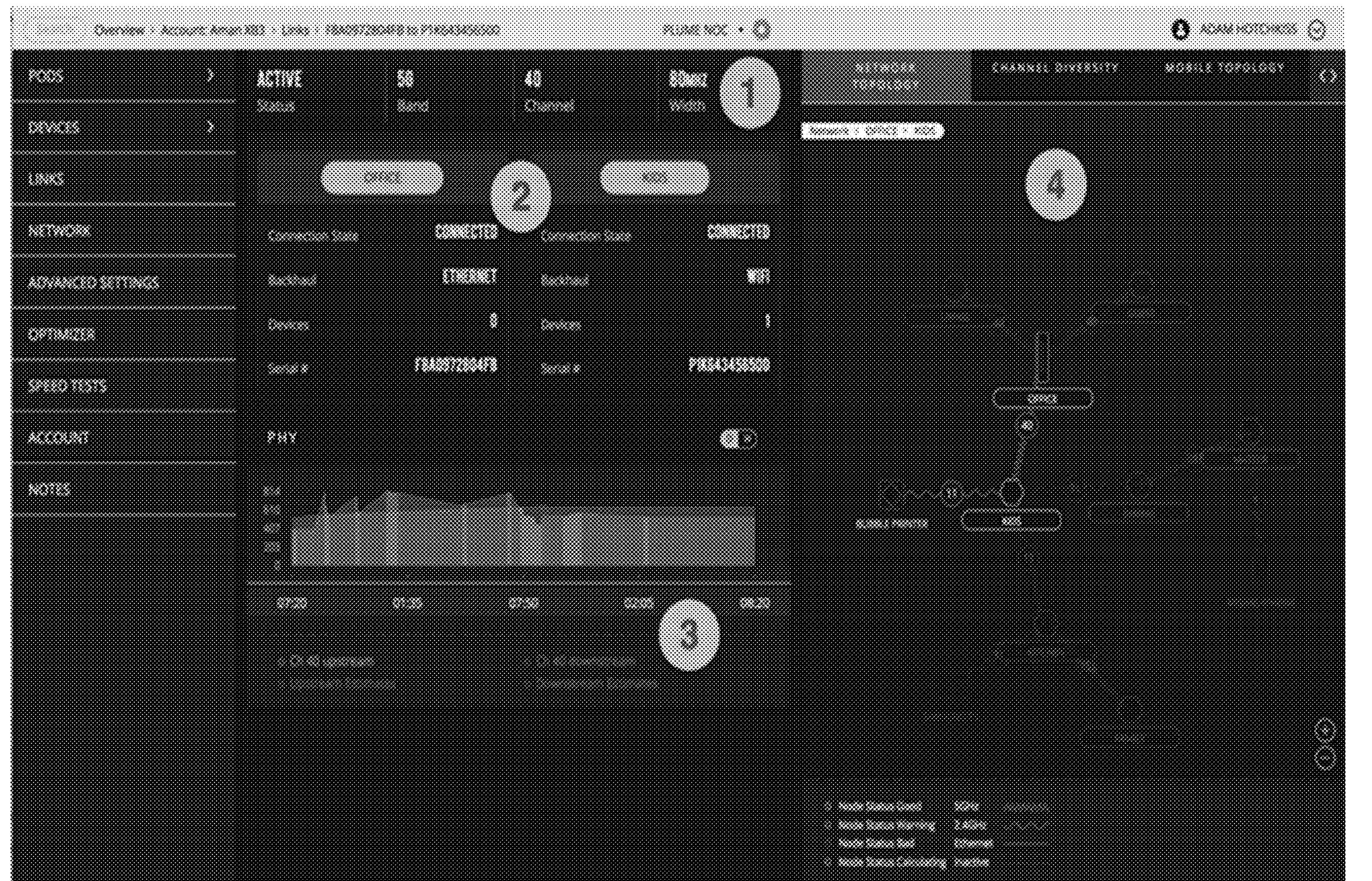
FIG. 36 is a screenshot of backhaul link information.

FIG. 36 is a screenshot of backhaul link information. By clicking on the channel number in the Network Topology Map of any backhaul connection, the observed PHY rates for both the uplink and downlink direction is graphed. The PHY rates can be only available when more than 1 MB of traffic is transferred in the minute. The items in the NOC dashboard in FIG. 36 are as follows:

| No. | Function | Description |
|---|---|---|
| 1 | Link Summary | Provides the status of the link, including Wi-Fi band (2.4 GHz or 5 GHz), channel and channel bandwidth. |
| 2 | Link Details | The link details provide information of the link “From” and “To” to define the direction of the link data. Additional details include the AP IDs and the backhaul connection details. |
| 3 | PHY Rate Graph | When more than 1 MB per minute is transferred on the link, a weighted average PHY rate measurement is recorded and graphed in both directions. A 24 hour or 1-week timeline view is available. |
| 4 | Network Topology View | This frame holds details of the AP-to-AP and AP-to-Device connection details. Connections are updated in real time. Only the link selected and any connected clients are shown on the map. |

NOC Dashboard Operations—Device Details

Figure 37:
FIG. 37 is a screenshot of client device details for an individual device.

FIG. 37 is a screenshot of client device details for an individual device. By selecting any Device from the Device List or on the topology, the details and history of statistics of that device are shown. The items in the NOC dashboard in FIG. 37 are as follows:

| No. | Function | Description |
|---|---|---|
| 1 | Device List | When selecting the Device navigation tab, a list of connected devices will appear in the navigation tree. Each device is selectable to see details of the device. |
| 2 | Device Summary | The summary of the Device includes:<br>1) Device Nickname, which is editable<br>2) MAC address<br>3) IP address<br>4) Connected AP<br>5) Channel<br>6) Connection Health Status |

-continued

| No. | Function | Description |
|---|---|---|
| 3 | Band Steering Details | Band Steering details include: 1) If the device is capable of 2.4 GHz and 5 GHz connections based on connection history, the capability is shown by the green check mark for having connected on that band or red "X" for never having connected on that band 2) Device band steering metrics for each connecting AP, which include a number of failed attempts, successful attempts, connections, disconnections and sticky client kicks. Sticky client kicks occur for devices that "stick" to the AP even when the RSSI is very low. |
| 4 | Data Consumption Summary | Provides the Wi-Fi data consumption in both the UL and DL direction for the last 24 hours, 7 days and 30 days. |
| 5 | RSSI History | Graphs the 25th percentile and 75th percentile of the RSSI readings for each 15 minutes. Both 24 hour and 7-day histories are available. Connections on 2.4 GHz are color-coded with white and red lines, and 5 GHz connections are shown with dark and light blue lines so the user can quickly determine the propensity of the device to connect on either band. Averages over the graph period for both 2.4 GHz and 5 GHz readings are shown. |
| 6 | Coverage Alarms | For both 24 hour and 7-day histories, the Coverage Alarm is shown for the connected device. Alarms are triggered for each 15-minute window if the RSSI falls below a predefined threshold. The percentage of time the device is in alarm is summarized as a percentage. If the device is not connected during a 15 minute period, no data is shown. |
| 7 | Bandwidth Usage | This graph shows the UL and DL data transmitted each 15-minute increment for the past 24 hours and 7 days period. Total data consumption numbers are summarized for the graph. |
| 8 | Network Topology View | This frame holds details of the AP-to-AP and AP-to-Device connection details. Connections are updated in real time. Only the active Device and the APs used to connect the device back to the GW are shown in this view. |

NOC Dashboard Operations—Device Health Metric

Figure 38:
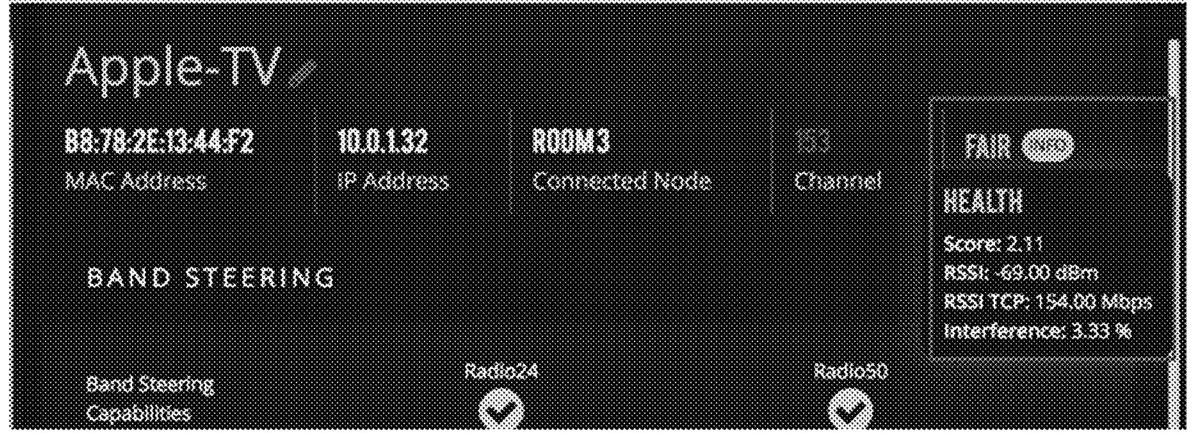
FIG. 38 is a screenshot of device health for an example client device.

FIG. 38 is a screenshot of device health for an example client device. The Device Health Metric values can be seen by hovering over the status. The Health Metric determines the health or quality of the Wi-Fi connection to the device and is split up into the following four main indicators:

- Excellent—The connection quality is very high without impairments from interference.
- Good—The connection quality has a good estimated bit rate with little to no interference.
- Fair—The connection estimated bit rate may not be good enough to sustain services like 4 k video streaming, because of low RSSI, MCS or moderate interference.
- Poor—The connection RSSI or PHY rates are very low, or the link is experiencing very high interference. Connectivity to the device is possible, but streaming or real-time services may not work well without buffering or degraded service.

Each minute, a connected device can have a Health Metric Score calculated based on the following inputs:

- Score—A score from 1 to 5 is generated for the link, which is helpful for troubleshooting purposes.
- RSSI—The RSSI of the connected device is collected per minute and shown in dBm.
- RSSI or PHY Rate converted to TCP—Based on the read RSSI or when data is present the actual PHY Rate of the connection, the system calculates the maximum TCP bitrate possible (e.g., like running a speed test) between the access point and the Device. This value is shown Mbps.
- Interference—The amount of airtime taken by outside Interference from a neighboring AP or other APs in the same home is shown. The TCP bitrate is affected proportionally by the amount of interference and is used in the calculation of the connection Health Metric.
- The capability of the connected device—Devices supporting 802.11ac vs. 802.11n and different MIMO capabilities are scored differently. The maximum capabilities of each device are determined based on statistics collected about the device.

Note, the connection health metric is measuring the quality of the connection between the last access point and selected Device. It is not taking into consideration the speed of the backhaul connection speed.

NOC Dashboard Operations—Access Point View for an Account

Figure 39:
FIG. 39 is a screenshot of an access point view.

FIG. 39 is a screenshot of an access point view. The items in the NOC dashboard in FIG. 39 are as follows:

| No. | Function | Description |
|---|---|---|
| 1 | Pod (AP) List | When selecting the Pod navigation tab, a list of the connected APs is shown in the sub-navigation tree. |

-continued

| No. | Function | Description |
|---|---|---|
| 2 | AP Summary | The summary of the AP includes: 1) Device Nickname (editable) 2) AP ID (Serial Number in the case of a Pod) 3) MAC address 4) FW version |
| No. | Function | Description |
| | | 5) Connection Health Metric (more about this below) 6) LAN IP address as assigned by upstream DHCP server to the Pod/AP 7) No. of connected devices 8) Wi-Fi channel assigned to both radios 9) Time since the device was connected to the WAN IP |
| 3 | AP Utilities | Three utilities exist in this menu: 1) Unclaim the Pod or AP from the location with the option of preserving the original package ID with the other Pods 2) Flash the LED by placing the Pod into a "Locate Mode" or place it back to normal be selecting "Normal" 3) Reboot the Pod remotely |
| 4 | Wi-Fi Capacity Measurement | The Wi-Fi Capacity measurement is on a per-radio basis and estimates the total capacity the radio can send to connected clients and backhaul connections simultaneously with limitations of the current connections. The metric takes into account PHY rates, the capability of the connected clients, the ratio of airtime required to send data for each client and the amount of interference to determine the overall capacity. The Wi-Fi Capacity measurement is valid only when data is being transmitted on the AP radio. This metric can be greatly affected depending on the Wi-Fi connected device capabilities. Large shifts in |
| No. | Function | Description |
| | | Wi-Fi capacity are a sign that something has changed with that Wi-Fi network affecting Wi-Fi speed available. For example, if a slow device connects to the Wi-Fi radio, it has the potential to bring down the speed of the network for other connected devices. Based on the amount of traffic consumed by the slow device, the overall Wi-Fi capacity of the radio will be reflected in the graph. |
| 5 | Coverage Alarms | For both 24 hour and 7-day histories, the Coverage Alarm is shown for the AP if any Device connected to the AP is in alarm. Alarms are triggered for each 15-minute window if the RSSI falls below a predefined threshold. The percentage of time the AP is in alarm is summarized as a percentage. A capacity alarm is also shown if the capacity of the AP to all of its associated clients drops below a threshold. |
| 6 | Bandwidth Usage | This graph shows the UL and DL data transmitted for each 15-minute increment for the past 24 hours and 7 days period. Total data consumption numbers are summarized for the graph. |
| 7 | Channel Utilization | This graph shows two airtime statistics: 1) Total Channel Utilization Total Channel Utilization represents the total airtime used as a percentage by the AP/Pod and from Interference from a neighboring AP on the same channel 2) Interference Interference is showing the airtime used as a percentage ONLY by a neighboring AP on the same channel. The difference between these two readings is the amount of airtime used by the AP to Tx and Rx data from connected devices and backhaul connections. For example, if the Total Channel Utilization is 80% and the Interference is 40%, then the AP is using 40% of the airtime for Tx and Rx traffic and 40% is used by Interference. Readings are provided for both 2.4 GHz and 5 GHz radios. 24 hour and 7 days histories are available, each one showing readings in 15-minute increments. |

-continued

| No. | Function | Description |
|---|---|---|
| 8 | Speed Test Results | This graph shows the UL and DL speed test results for 24 hours and 7 day periods of time. Speed test results are optionally run for AP and run Ookla style speed test between the AP and a server on the Internet. |
| 9 | Network Topology View | This frame holds details of the AP-to-AP and AP-to-Device connection details. Connections are updated in real time. Only the active Pod/AP and the APs used to connect back to the GW are shown in this view. |

NOC Dashboard Operations—AP Health Metric

Figures 40, 41:
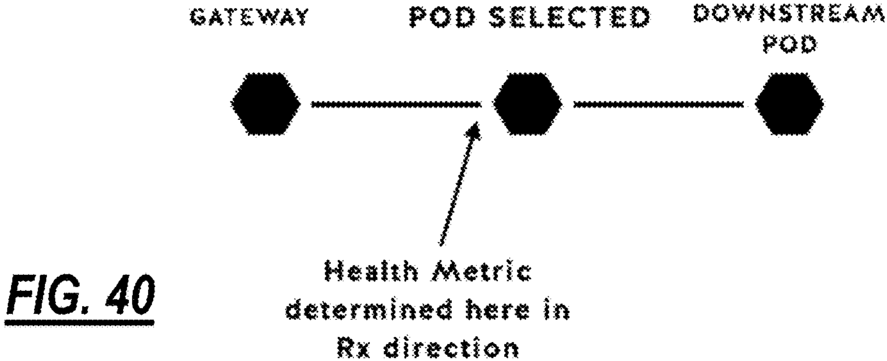
FIG. 40 is a network diagram of a Wi-Fi network illustrating an AP health metric.
FIG. 41 is a screenshot of an AP health metric view.

FIG. 40 is a network diagram of a Wi-Fi network illustrating an AP health metric and FIG. 41 is a screenshot of an AP health metric view. The AP Health Metric values can be seen by hovering over the status. The AP Health Metric determines the health or quality of the Wi-Fi backhaul connection in the Rx direction connection to the access point coming from another access point upstream towards the Gateway as shown in FIG. 40. The value of the AP health metric can be similar to the device health metric.

NOC Dashboard Operations—Optimizer

Figure 42:
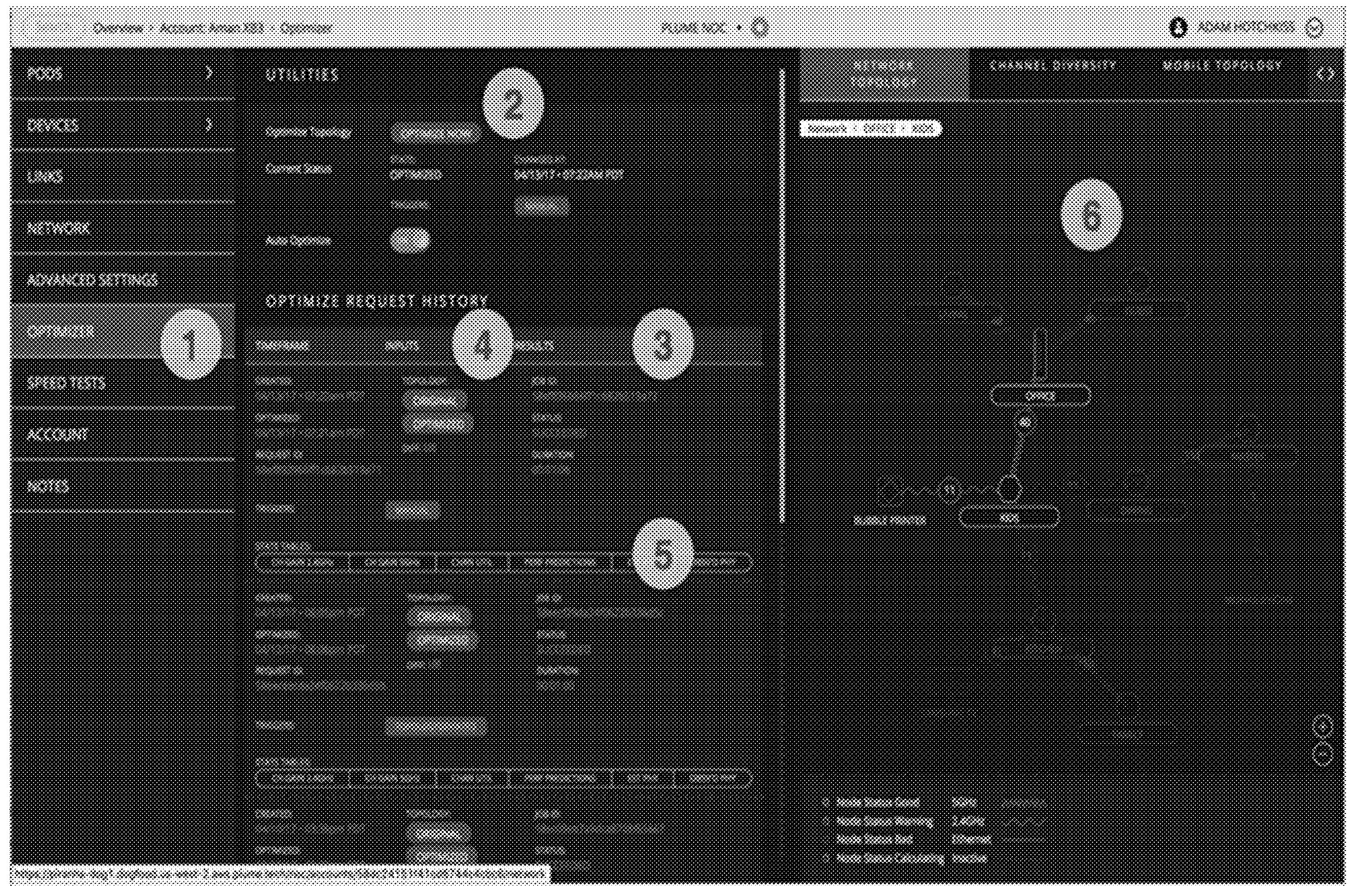
FIG. 42 is a screenshot of an optimizer view.

FIG. 42 is a screenshot of an optimizer view. The Optimizer reads the status of the network and performs optimizations based on events, such as new APs joining the network, Wi-Fi interference over long periods of time, RSSI between APs changing significantly, etc. By selecting the "Optimizer" tab on the navigation tree, the following view in FIG. 42 is present. The items in the NOC dashboard in FIG. 42 are as follows:

| No. | Function | Description |
|---|---|---|
| 1 | Navigation Tabs | Select these tabs to navigate between the different functions. |
| 2 | Optimizer Status | The Optimizer status contains the following:<br>1) Option to manually kick off an optimization by selecting the "Optimize Now" button. This is only valid if an optimization is not already in progress.<br>2) Current State and the time the state was changed. The allowed states are:<br>Optimized-The network is optimized.<br>In Progress-An optimization is underway.<br>Failed-The previous optimization failed to configure the network.<br>3) The Triggers status provides the reason for the optimization change. This could be for<br>Manual-The button was pressed to start an optimization manually.<br>Topology Deviated-An AP-to-AP connection in the topology changed, requiring a re-optimization to occur.<br>Stats Changed-The statistics (e.g., interference, RSSI or PHY rates) for the link changed by such an amount as to re-trigger an optimization.<br>4) Toggle to turn On or Off the system auto optimizations. If this is disabled, the location network will not optimize unless the "Optimize Now" button is pressed. |
| 3 | Optimization History | For each optimization that occurs in the network, an event is captured and available for review. Each event includes:<br>1) Job ID for database reference of the optimization<br>2) Status: Succeed/In Progress/Failed<br>3) Duration of the optimization from start to finish, including network topology changes<br>4) Created Date: date and time the optimization started<br>5) Optimized: date and time the optimization finished<br>6) Request ID for database reference of the optimization request<br>7) Trigger describing why the optimization occurred (see above for Trigger descriptions) |
| 4 | Topology Changes | Select the "Original" and "Optimized" buttons to see the topology connections when the optimization request was made and the suggested topology from the optimizer. The Optimized topology suggested by the optimizer might not match the current network topology if the topology changes failed to occur. |

-continued

| No. | Function | Description |
|---|---|---|
| 5 | Stats Tables | The Optimizer stats tables record the input fed to the optimizer for the reference job. The stats tables include: 1) RSSI Channel Gains between each AP in the network for both 2.4 GHz and 5 GHz connections 2) The amount of airtime that is busy for each AP and each channel at the time of the optimization request. 3) Performance Predictions from the GW Pod to each AP/Pod for the chosen topology. 4) The estimated PHY rates for each AP-to-AP connection. 5) The actual observed PHY rates for each AP-to-AP connection for the topology, when available. |
| 6 | Network Topology View | This frame holds the current or historical network topology as selected in the optimization history. |

Wi-Fi Network Control Via an NOC

Figure 43:
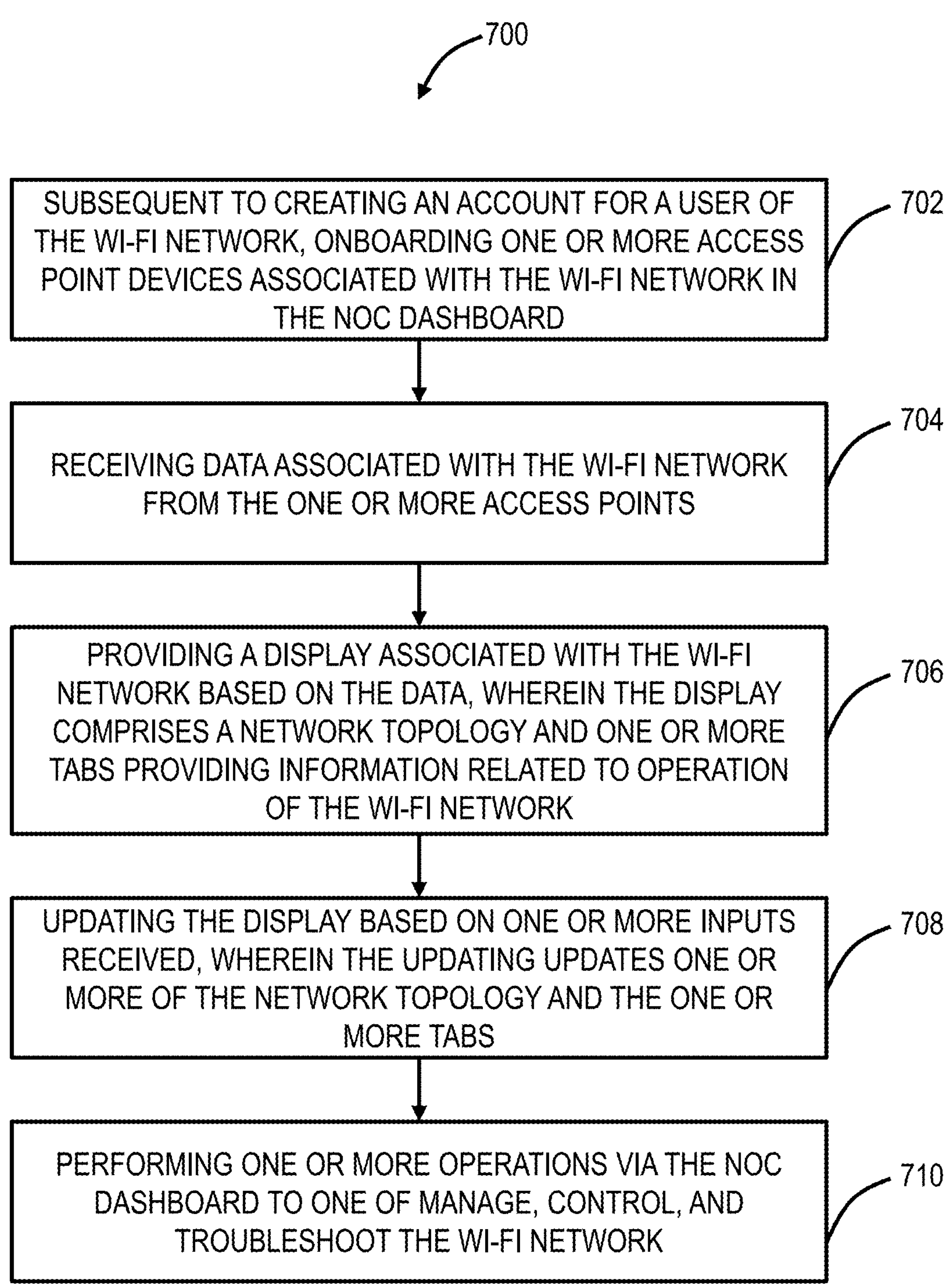
FIG. 43 is a flowchart of a method of managing a Wi-Fi network of a plurality of Wi-Fi networks from a cloud-based Network Operations Control (NOC) dashboard.

Referring to FIG. 43, in an embodiment, a flowchart illustrates a method 700 of managing a Wi-Fi network of a plurality of Wi-Fi networks from a cloud-based Network Operations Control (NOC) dashboard. The method 700 includes, subsequent to creating an account for a user of the Wi-Fi network, onboarding one or more access point devices associated with the Wi-Fi network in the NOC dashboard (step 702); receiving data associated with the Wi-Fi network from the one or more access points (step 704); providing a display associated with the Wi-Fi network based on the data, wherein the display includes a network topology and one or more tabs providing information related to operation of the Wi-Fi network (step 706); updating the display based on one or more inputs received, wherein the updating updates one or more of the network topology and the one or more tabs (step 708); and performing one or more operations via the NOC dashboard to one of manage, control, and troubleshoot the Wi-Fi network (step 710).

The one or more access point devices can include a plurality of devices such as the access points 14, and wherein the onboarding can include providing a unique identifier of a device and automatically associated all of the plurality of devices to the account based on the unique identifier. For example, the association can be in manufacturing, at the point of sale, etc. such as six access points 14 in a package and any one of the unique identifiers causes all six to be onboarded. The onboarding can include inputting one of serial numbers and Media Access Control (MAC) address for the one or more access point devices in the NOC dashboard.

The onboarding can include receiving an indication of an association between the account and the one or more access point devices from the Wi-Fi network. For example, the access point devices can be configured to communicate to the NOC dashboard once installed. Alternatively, the access point devices can be locally onboarded by a user with an application that communicates the association to the NOC dashboard. Further, the access point devices can be loaded with a control agent, either in manufacturing or during deployment, which communicates to the NOC dashboard.

Subsequent to the receiving, the method 700 can further include storing the data for the Wi-Fi network in a secure manner which is accessible only in the NOC dashboard based on user permission. Of note, the NOC dashboard can support thousands to millions of different Wi-Fi networks under management. As such, there is a need to ensure an administrator can only see authorized data. Also, the secure manner can include anonymizing the data so there is no correlation with the actual end user. This is advantageous when the NOC dashboard manages multiple Wi-Fi networks for different service providers. The aggregate network-wide data is available, albeit in a secure manner.

The performing can include one or more of establishing or changing a Service Set Identifier (SSID) of the Wi-Fi network and establishing or changing a password for accessing the Wi-Fi network. The performing can include setting of network parameters of the Wi-Fi network including one or more of Domain Name System (DNS) settings, Universal Plug and Play (UPnP), Dynamic Host Configuration Protocol (DHCP) reservations, bridge versus router mode, and port forwarding settings. The performing can include causing a specific access point device to provide an indicator for locating by a local user.

For example, controls or actions that can be taken from the NOC dashboard can include, without limitation: the Ability to control operation of the LED, for example, blink it in order for a customer to locate it; claim access point devices; reboot multiple devices in a single location with a single click; redirect access point devices. Redirection refers to the ability to change which carrier (e.g., operator of the NOC dashboard) an Access Point is associated with. For example, an access point pod originally configured to contact the cloud at carrier A, and become part of carrier A's network may subsequently need to be configured to contact the cloud for carrier B so as to become part of carrier B's network. Other controls and actions can include, without limitation: unclaim while preserving (or not) pack IDs (this has to do with which home the access point devices are associated with); enable or disable optimizations, client steering, band steering; manual trigger of log pulls, e.g., a single click captures logs from all devices and moves it to a cloud server; setting of network parameters including DNS settings, DHCP reservations, bridge vs. router mode, port forwarding, UPnP settings; change account password; assign account into multiple groups; reboot individual access point devices or the entire network; freeze devices, with times, etc.

The display can provide graphs of one or more metrics associated with the Wi-Fi network. The display can provide aggregated network-wide statistics and alarms for the plurality of Wi-Fi networks. The display can provide network-wide statistics and alarms for the Wi-Fi network, wherein the network-wide statistics can include a graph of channels used in the Wi-Fi network. The Wi-Fi network can include a distributed Wi-Fi network, and wherein the network topology graphically illustrates client links and backhaul links between a plurality of access point devices.

The one or more tabs can display information related to the one or more access point devices and related to wireless links, wherein a health score is displayed for each of the one or more access point devices and the wireless links, and wherein the health score is a weighted combination of a plurality of factors. The one or more tabs can include a topology time machine which graphically illustrates a topology of the Wi-Fi network and changes over a specified time period. The one or more operations can include an optimization of the Wi-Fi network, and wherein the one or more tabs can include a status of the optimization, a history of optimizations, and statistics associated with the optimization.

In another embodiment, an apparatus executing a cloud-based Network Operations Control (NOC) dashboard for management of a Wi-Fi network of a plurality of Wi-Fi networks includes a network interface communicatively coupled to the plurality of Wi-Fi networks; a processor communicatively coupled to the network interface; and memory storing instructions that, when executed, cause the processor to, subsequent to creation of an account for a user of the Wi-Fi network, onboard one or more access point devices associated with the Wi-Fi network in the NOC dashboard; receive data associated with the Wi-Fi network from the one or more access points; provide a display associated with the Wi-Fi network based on the data, wherein the display includes a network topology and one or more tabs provide information related to operation of the Wi-Fi network; update the display based on one or more inputs received, wherein the display is updated in one or more of the network topology and the one or more tabs; and perform one or more operations via the NOC dashboard to one of manage, control, and troubleshoot the Wi-Fi network.

In a further embodiment, a non-transitory computer-readable storage medium includes computer readable code stored thereon for programming a computer to perform the steps of, subsequent to creating an account for a user of the Wi-Fi network, onboarding one or more access point devices associated with the Wi-Fi network in the NOC dashboard; receiving data associated with the Wi-Fi network from the one or more access points; providing a display associated with the Wi-Fi network based on the data, wherein the display includes a network topology and one or more tabs providing information related to operation of the Wi-Fi network; updating the display based on one or more inputs received, wherein the updating updates one or more of the network topology and the one or more tabs; and performing one or more operations via the NOC dashboard to one of manage, control, and troubleshoot the Wi-Fi network.

Wi-Fi Network Failover to Cellular Connection With Throttling of Traffic

In some embodiments, configurations and reporting can be implemented between a gateway device of a local Wi-Fi network (e.g., a home) and a central controller or cloud service. The central controller can receive monitored data and/or reports from the gateway devices of multiple Wi-Fi networks and process the information to determine network operations. For example, the central controller may be configured to determine:

1) which Wi-Fi networks (e.g., homes) have failed over from the wired broadband Wi-Fi network to an associated cellular network.
2) which serving cells are within range of each gateway device, which may be based on inputs received from mobile operator or cellular services, the inputs including degradation data detected by the gateway devices.

According to one embodiment, the present disclosure may include failover to the cellular network when there is a failure of the wired connections of the Wi-Fi gateway device. Along with failover detection, the present disclosure may include throttling of traffic via the cloud service. Specifically, it may usually be undesirable to overload the cellular network; this is particularly true if there is a widescale or regional outage that causes a large number of homes to failover to cellular in the same region. Also, some cellular plans include pay per data schemes and it would be undesirable for users to get high bills. Further, cellular is typically a lower data rate than the wired connection and it would make sense to throttle the highest priority traffic to preserve real-time performance.

One method for a Wi-Fi network may include a failover procedure from Wi-Fi connection to cellular connection along with the action of throttling traffic. The process may include steps, via a processing device configured to execute the steps, as instructions stored in a non-transitory computer-readable medium, and performed via the cloud service. The process may include detecting an outage on wired connections for any of the plurality of Wi-Fi networks; determining if any of the plurality of Wi-Fi networks have switched to a cellular connection as a failover based on the outage; and determining whether to throttle traffic on any cellular connection based on the failover and instructing corresponding gateways accordingly.

The cloud service can be connected to multiple Wi-Fi networks. The outage can be detected based on the plurality of Wi-Fi networks communicating the wired connections are down. Also, the users can be correlated geographically.

The traffic can be throttled by instructing the gateway accordingly. For example, the access points 14, 18, 20, 22 can be configured to perform the throttling. In an embodiment, the traffic is throttled based on any of specific applications and specific uses. For the application, this includes the Wi-Fi networks 10 identifying the application, such as by packet inspection. The application-based throttling can identify high-priority applications for service (e.g., security monitoring, voice/video conferencing, etc.) as well as penalizing low-priority applications (e.g., data synchronization, entertainment, etc.). Also, the throttling can block specific uses such as system updates, backups, etc. For example, the specific uses can be ones that are not necessarily time critical and can wait for the restoration of the wired connection.

In an embodiment, the traffic can be throttled via a hard cap on how much data can flow through the cellular connection. In another embodiment, the traffic can be throttled by throughput, e.g., Mb/sec. In a further embodiment, the traffic can be throttled based on total data moved. For example, let all applications run until some total amount of data has been transferred and start to throttle after some limit has been reached. The limit could be per period of time, such as an hour, day, week, month, etc.

The traffic can be throttled based on virtual or conceptual local networks that are operational in the plurality of Wi-Fi networks and that have different priorities. This can include discriminating the throttling by different virtual or conceptual, or even actual physical local networks (LANs) based on assigned priorities. For example, throttle only on low-priority networks, such as a guest network or the like. Also, it is possible to prioritize certain networks such as an infrastructure network that is used for high-priority applications.

The throttling can be only under certain circumstances. For example, throttle only when there is a wide area outage, such as more than a certain number of users failover onto cellular. Another approach can include throttling only when the cellular network (infrastructure) indicates to the cloud service that it is overloaded. A further approach can include a cellular device (e.g., the gateway with a cellular connection) indicating that the cell appears to be getting overloaded. A further approach can include throttling applied differently to different users/subscribers depending on the tier of their subscription, Determining whether to throttle traffic can be based on feedback from a cellular control plane to the cloud service. The process can further include steering the corresponding gateways to different base stations to limit a load on any given base station. The process can further include receiving information from the corresponding gateways related to the cellular connection including an identification of a corresponding base station. The process can further include receiving information from the corresponding gateways related to the cellular connection including an identification of visible base stations; and steering the corresponding gateways to different base stations.

In an embodiment, the cloud service can be configured to limit the load on a particular base station, such as by distributing devices. This can be via the fixed wireless access system. The cloud service can steer different cellular devices (UEs) to different base stations to limit the load put upon any given base station.

In an embodiment, the cloud service can assign the base station to failover via cell ID beforehand, and this set of assignments could be distributed across all cells/base stations in a given area. In another embodiment, gateways can make their own choice of base station and report to the cloud service where they have connected. The cloud service can then analyze the loads and cause the gateways to move to different base stations as needed to adjust the load. In a further embodiment, there can be a blacklist (preventing connection) and a whitelist (allowing connection) for cells/base stations. This still allows the gateways some flexibility in choosing the cell that works best for it.

In another embodiment, it is possible to have the gateways connect on 4G vs. 5G—as base stations if independent capacity on 4G and 5G for distributing the load across all the resources. This selection should be made intelligently—gateways that need higher throughput should connect on 5G, gateways with lower throughput connect on 4G. That is, the gateways can connect on different bands by having the gateways advertise different band capabilities. All of the above can be programmed before the outage happens, or it could be programmed after the outage starts, as a way to correct an overload on a particular base station. The cloud service can determine overload at a base station without any information from the base station if each gateway reports to the cloud service the amount of data it is moving and which base station, band, and/or technology that it is using.

This process can be aided if the devices (e.g., gateways, etc.) report all the base stations they are able to see and could potentially connect to. If the cloud service has collaboration with a cellular carrier, they could provide the cloud service data about the cell loads and utilization, which would help in determining where the gateways should fail over to.

A gateway that includes cellular radios (i.e., "cellular gateway") may typically be located indoors. It is important to place the cellular gateway at a good reception area of strong signal strength and quality for better cellular experience (high speed, etc.). The present disclosure includes various approaches for optimizing the location of the cellular gateway. In an embodiment, the present disclosure includes use of a mobile device for estimating signal strength/quality, instead of moving the cellular gateway. In another embodiment, the cellular gateway can be provided with a power bank (e.g., USB-based) to temporarily power the cellular gateway while it is moved around. In a further embodiment, general heuristics can be provided for best practice as to where to locate. Also, in the case where the cellular connection is used as a backup for failover, the cellular gateway does not necessarily have to be the same as the modem/router, i.e., the wireless and wired connections can be at different locations.

Method for Displaying a NOC Dashboard With Wi-Fi Metrics and Cellular Metrics

Figure 50:
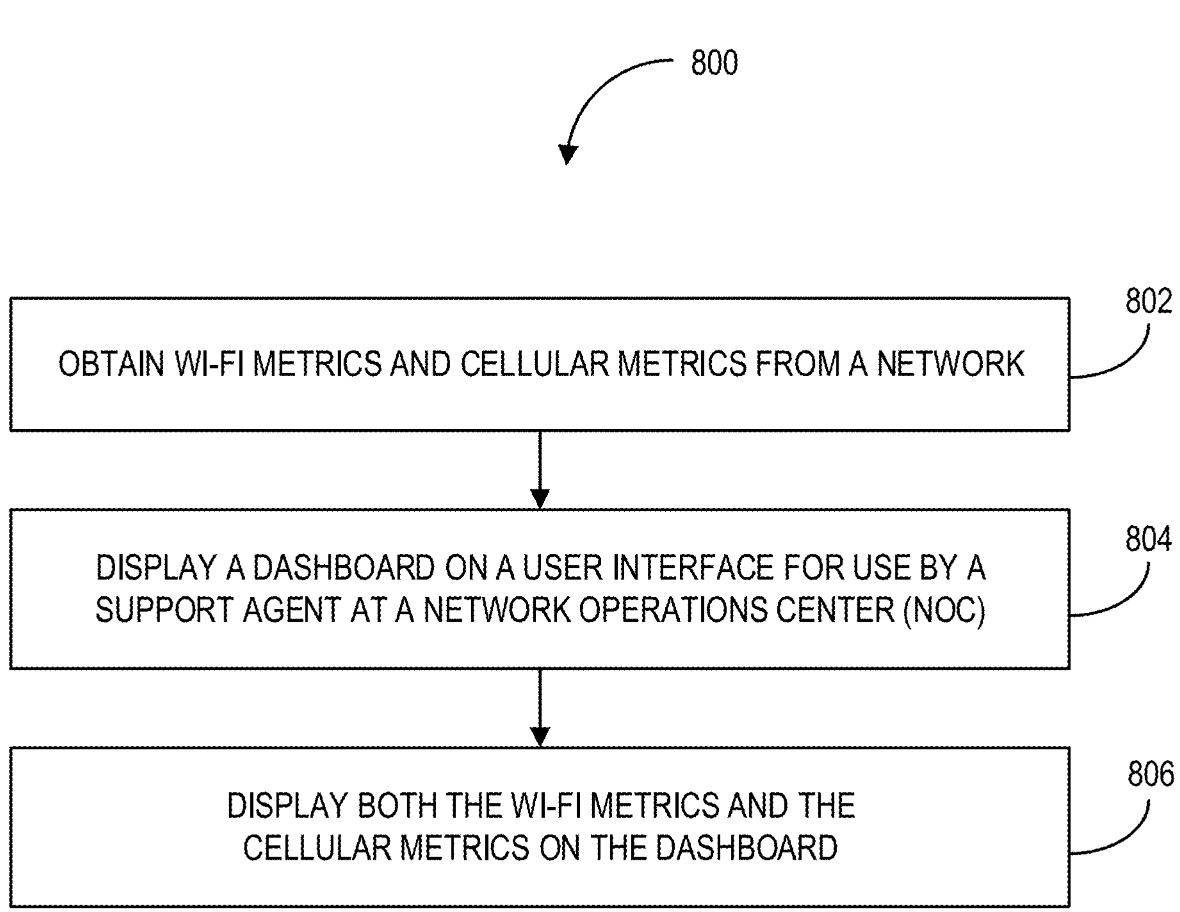
FIG. 50 is a flowchart of a method of presenting a dashboard on a user interface for use by a support agent at a NOC, where the dashboard shows both Wi-Fi metrics and cellular metrics.

FIG. 50 is a flowchart showing an embodiment of a method 800 of presenting a dashboard on a user interface for use by a support agent at a NOC, where the dashboard shows both Wi-Fi metrics and cellular metrics. As illustrated, the method 800 includes the step of obtaining Wi-Fi metrics and cellular metrics from a network, as indicated in block 802. The method 800 also includes displaying a dashboard on a user interface for use by a support agent at a Network Operations Center (NOC), as indicated in block 804. Also, the method 800 includes the step of displaying both the Wi-Fi metrics and the cellular metrics on the dashboard, as indicated in block 806. In some embodiments, the method 800 may be embedded in any suitable combination of hardware, software, firmware, etc., and may include logic or programming code (e.g., programs 216) for enabling a processing device (e.g., processor 202) to perform certain functionality to present Wi-Fi metrics and cellular metrics in a dashboard of a user interface (e.g., I/O interface 204). For example, the method 800 may be stored in any suitable non-transitory computer-readable media (e.g., memory 210) and executable by the processing device (e.g., processor 202).

Furthermore, the method 800 may include the step of displaying a customer view on the dashboard. For example, the customer view may illustrate local Wi-Fi metrics and local cellular metrics of a customer Wi-Fi system selected from a plurality of Wi-Fi systems on the network. The method 800 may further include receiving the local Wi-Fi metrics and local cellular metrics from User Equipment (UE) associated with the customer Wi-Fi system. For example, the UE may include a gateway device configured to connect the customer Wi-Fi system with the network and/or Customer Premises Equipment (CPE) configured in the customer Wi-Fi system. The UE, for example, may further include one or more mobile devices configured to communicate via the customer Wi-Fi system. In response to the support agent receiving a customer request from a customer associated with the customer Wi-Fi system, the method 800 may include enabling the support agent to debug the UE on the customer Wi-Fi system. The method 800 may also include the step of displaying Quality of Experience (QoE) parameters on the dashboard. For example, the QoE parameters may be associated with Wi-Fi quality and/or cellular quality on the customer Wi-Fi system. The QoE parameters, for example, may include a) a Received Signal Strength Indictor (RSSI) value, b) a Reference Signal Received Power (RSRP) value, c) a Reference Signal Received Quality (RSRQ) value, d) a Signal-to-Interference-plus-Noise Ratio (SINR) value, and/or other monitored values, which may be presented on the dashboard in graphical form.

The method 800 may further include the step of displaying a network-wide view of the network on the dashboard. For example, the network-wide view may show the Wi-Fi metrics and cellular metrics of a plurality of Wi-Fi systems of the network. In the network-wide view, the method 800 may further be configured to display QoE parameters on the dashboard, based on network-wide Wi-Fi quality and cellular quality. The method 800 may also include the step of determining correlations in performance issues among the plurality of Wi-Fi systems and then displaying parameters of these correlations. The correlations, for example, may be based on a) predetermined geographical areas, b) associated base stations or towers, c) frequency bands in use (e.g., Global System for Mobile communications (GSM) cellular frequency bands, such as 850 MHz, 900 MHz, 1900 MHz, 2100 MHz, etc.), d) service providers, e) LTE or 5G operational modes, f) aggregation mode or level (e.g., whether multiple channels are aggregated together and how), g) mmWave vs. sub-6 GHz frequency operation, h) gateway type, i) Wi-Fi or cellular channels used, and/or other variables.

The method 800 may further include the step of displaying both the Wi-Fi metrics and the cellular metrics according to a "troubleshooting mode" in which Wi-Fi and cellular parameters are monitored at a granularity of about one set of parameters per second. For example, a regular mode may show the data at a granularity of one set of parameters every minute or so. Also, the method 800 may include displaying both the Wi-Fi metrics and the cellular metrics during a failover event from Wi-Fi operation to cellular operation. The support agent (e.g., stationed at the NOC) may be allowed to perform one or more actions in response to the Wi-Fi metrics and cellular metrics. For example, the support agent may be able to a) configure an Access Point Name (APN) to operate in either a Wi-Fi mode or a cellular mode, b) configure Subscriber Identifier Module (SIM) profiles, c) set a throttle on the amount of traffic allowed over a wired portion of the Wi-Fi network, d) set a throttle on the amount of traffic allowed over a cellular portion of the Wi-Fi network, e) move from 5G operation to LTE operation, f) move from LTE operation to Ethernet operation, g) force a reset of a cellular connection, and/or other actions.

Therefore, the present disclosure describes systems and methods for generating dashboards for assisting a support agent. With the dashboards described herein, the support agent can be able to view both Wi-Fi data and cellular data in one common display system. With recent advances in communications to allow mobile device to utilize Wi-Fi system more frequently and then fall back (failover) to conventional cellular service, a support agent has a need to see both communication platforms of Wi-Fi systems (e.g., including gateway devices for connecting a local wireless system to Ethernet) and cellular systems. Therefore, the systems and methods of the present disclosure can present both communication systems under one dashboard.

Hence, some points of novelty with respect to conventional systems may include presenting information related to fixed wireless access (e.g., gateway devices in a local WLAN system) as opposed to just mobile devices, although information regarding the operations of the mobile devices is also obtained and utilized for display to the support agent. Furthermore, the system can obtain information only from client devices (e.g., Customer Premises Equipment (CPE), etc.) on the customer Wi-Fi system, which is typically not available on a network-wide scale. Instead, typical communication dashboards may only show the communications infrastructure up to the customer's WLAN and usually does not obtain operational information regarding devices within the premises of each customer's system. The dashboards of the present disclosure may be configured to combine Wi-Fi and cellular metrics in a single user interface display system for allowing the support agent to view Wi-Fi and cellular information in one app. Also, the dashboards show combined QoE measurements that factor Wi-Fi and cellular portions of the complete pathway.

NOC Dashboards With Wi-Fi Metrics and Cellular Metrics

Figure 51:
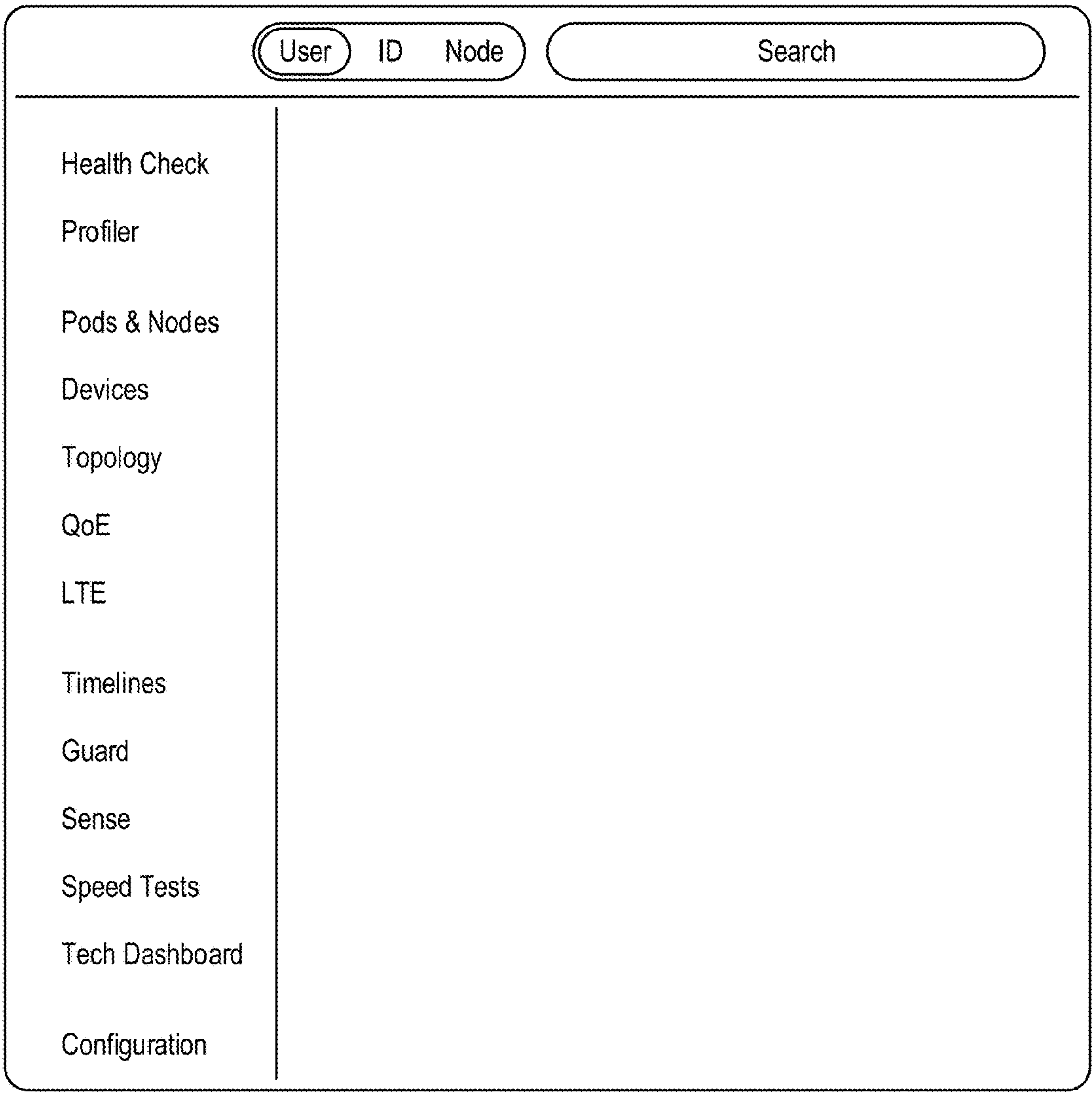
FIG. 51 is a screenshot of a NOC dashboard for showing Wi-Fi metrics and cellular metrics.

FIG. 51 is a screenshot showing an embodiment of a general NOC dashboard for presenting Wi-Fi metrics and cellular metrics to a user (e.g., support agent at a NOC). The support dashboard, for example, may be a dashboard used by a support agent when a customer calls in for assistance. As shown in FIG. 51, the dashboard includes tabs for allowing the user (e.g., support agent) to select among various categories, such as Health Check, Profiler, Pods & Nodes, Devices, Topology, QoE, LTE, Timelines, Guard, Sense, Speed Tests, Tech Dashboard, and Configuration. The dashboard can focus in on a single location at a time (e.g., as described with respect to FIGS. 53-55) to show measured metrics or statistics that can help the agent debug a problem at a customer residence. Also, the dashboard can focus on the entire network (e.g., as described with respect to FIG. 52) to show the metrics, statistics, data for helping the agent see an overall view the health of the network and to see certain trends related to sections of the network having common characteristics (e.g., same geographical areas, same service providers, etc.).

From the general NOC dashboard of FIG. 51, the support agent can select one of the categories to view certain aspects of the network. Some views show network-wide dashboards and displays that cover Wi-Fi and cellular features, network statistics, control features, etc. Thus, the dashboard is a single pane of glass to enable management of the entire network or even management on a customer basis (e.g., at a single customer Wi-Fi WLAN system).

Regarding the aspect of data that can be collected for the purposes of display network operations and parameters, this information can be received in any suitable manner and may be received from various sources. For example, in some embodiments, the Wi-Fi and cellular data may be obtained from User Equipment (UE) only. In other embodiments, the data may be obtained from both the UE and from a cellular infrastructure (e.g., base station).

According to some embodiments, the support agent may utilize the dashboard to not only view network parameters and see trends and common operational statistics, but also the dashboard may further allow the support agent to control certain aspects of the network to compensate for or recover from alarm conditions or other network states that are less than ideal. For example, in some embodiments, the support agent can control or force a state change from operation under 5G to another state of operation under LTE on certain portions of the network or even on an individual customer's premises. Also, the support agent can control or force a state change from LTE to wired or cabled (e.g., Ethernet connected) access to services in the cloud or on the Internet. In some cases, the dashboard may also enable the support agent to force a reset of a cellular connection.

Considering additional embodiments, the dashboard may be a cellular dashboard intended to measure the performance of cellular service that is based on Wi-Fi or WLAN pods (e.g., access points, repeaters, etc.). For example, network metrics can be grouped into following ways:

I. Summary View: a high level daily status of cellular service based Wi-Fi pods with a map of the entire network or portion of the network.

II. Alarms View: groups alarms into performance, operational, and configuration based triggers.

III. Analytics View: distribution of various cellular metrics to analyze the operating percentile.

IV. Offenders View: showing top and bottom performing locations with respect to cellular metrics.

V. Geographical View: showing metrics related to geo fencing of CPE, based on authorized location and cellular signals.

Summary View

Figure 52:
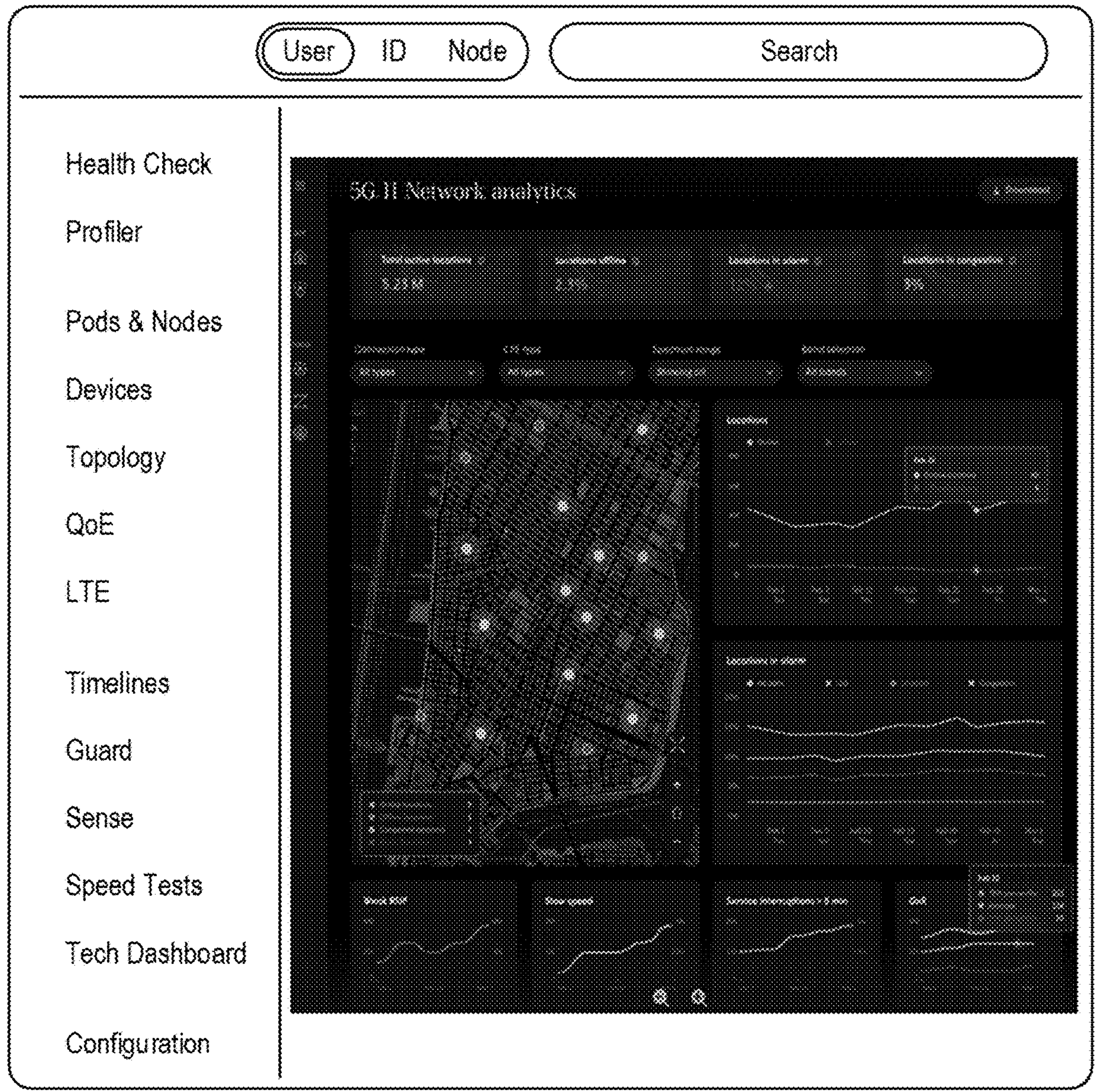
FIG. 52 is a screenshot of the NOC dashboard of FIG. 51 showing a network-wide view of metrics of the entire network.

FIG. 52 is a screenshot of the NOC dashboard of FIG. 51 showing a network-wide view of metrics of the entire network. The network-wide display on the dashboard may show statistics of one or more service providers across their entire network so they can see how well the network is working on average or statistically how well the network is performing across all locations or a set of locations. The dashboard of FIG. 52 may include a high-level daily status of cellular service based access point pods with a map.

The dashboard may show daily counts and/or percentages. For example, the dashboard app may be configured to receive monitored parameters of the network and calculate various summaries, totals, and/or other useful metrics. The dashboard may calculate and show the total number of active locations in the network on a particular day. This may include, for example, today's number of active (online) cellular pods, which may be configured to report their local monitored parameters online and may report at least once in a 24-hour period. The dashboard may also include the number or percentage of locations that are offline, which may be today's percentage of offline cellular pods out of a total number of cellular pods, whereby "offline" may represent being offline for an entire 24-hour period.

Also, the dashboard may calculate and display the number of percentage of locations that are in an alarm mode, which may be today's % of cellular pods in alarm at any time in the 24-hour period. For example, alarms may represent certain parameters or values falling outside certain operational ranges, locations having config issues, locations having performance issues according to a Quality of Experience (QoE) statistic, location where there is no data, locations that are unstable, areas where there is congestion etc. Regarding congestion issues, for example, the dashboard may show the number or percentage of locations that are considered to be congested, which may include showing today's % of cellular pods in a congestion state (e.g., low throughput below an acceptable threshold).

Furthermore, as shown in FIG. 52, the dashboard may show a map, which may include different types of icons representing online locations, offline locations, locations in alarm state, location in congestion, etc. Also, the dashboard may include line graphs or charts for showing various parameters, metrics, trends, etc. The line charts, for instance, may include daily trend of online and offline location counts and/or may include locations in the alarm state (e.g., daily trend of congestion issues, QoE trends, 'no data' stats or trends, unstable location count, out-of-geofence stats, information regarding locations that are not connected to preferred Cell Global Identity (CGI) equipment, a no-preferred list available, etc.

Also, the network-wide dashboard can also show other specific types of operational issues. For example, the dashboard may show weak Reference Signal Received Power (RSRP) statistics, such as the number or percentage of locations considered to have a weak RSRP (e.g., lower than −116 dBm). The dashboard can also show slow speed, such as the number of percentage of locations with slow speed (e.g., lower than 30 Mbps). Also, the dashboard can show the number of locations that have experienced service interruptions longer than a certain amount of time (e.g., five minutes) and/or the number of times per day that locations experience service interruptions of more than the predetermined time. The dashboard can also show QoE stats, such as the average QoE factors, high and low QoE factors, percentile (e.g., 25 percentile, 50 percentile, 75 percentile, etc.), QoE trends, etc., on a daily, weekly, or monthly basis.

In some embodiments, the application or logical program for controlling the dashboard may obtain information from multiple devices throughout the network. Again, the information can be obtained from the regular infrastructure elements, but also can obtain information from gateway devices configured to connect a customer Wi-Fi system to the network as well as the customer equipment (e.g., UE, CPE, etc.) within each specific Wi-Fi system connected to the network enabling communication for multiple Wi-Fi systems.

In particular, according to some embodiments, the app or program associated with the dashboard may look for correlations in performance issues across network. The various factors for detecting correlation may include commonality among a number of Wi-Fi systems (e.g., customer or residential systems). For example, Wi-Fi systems may be correlated with respect to geographical areas (e.g., related to geo fences), utilization of common base stations and/or cell towers, utilization of a common frequency band, service provider, operational mode with regard to LTE vs. 5G, aggregation level, operational mode with regard to mmWave vs. sub-6 GHz, common gateway type, common Wi-Fi channels usage, common cellular channel frequencies, etc.

Figure 53:
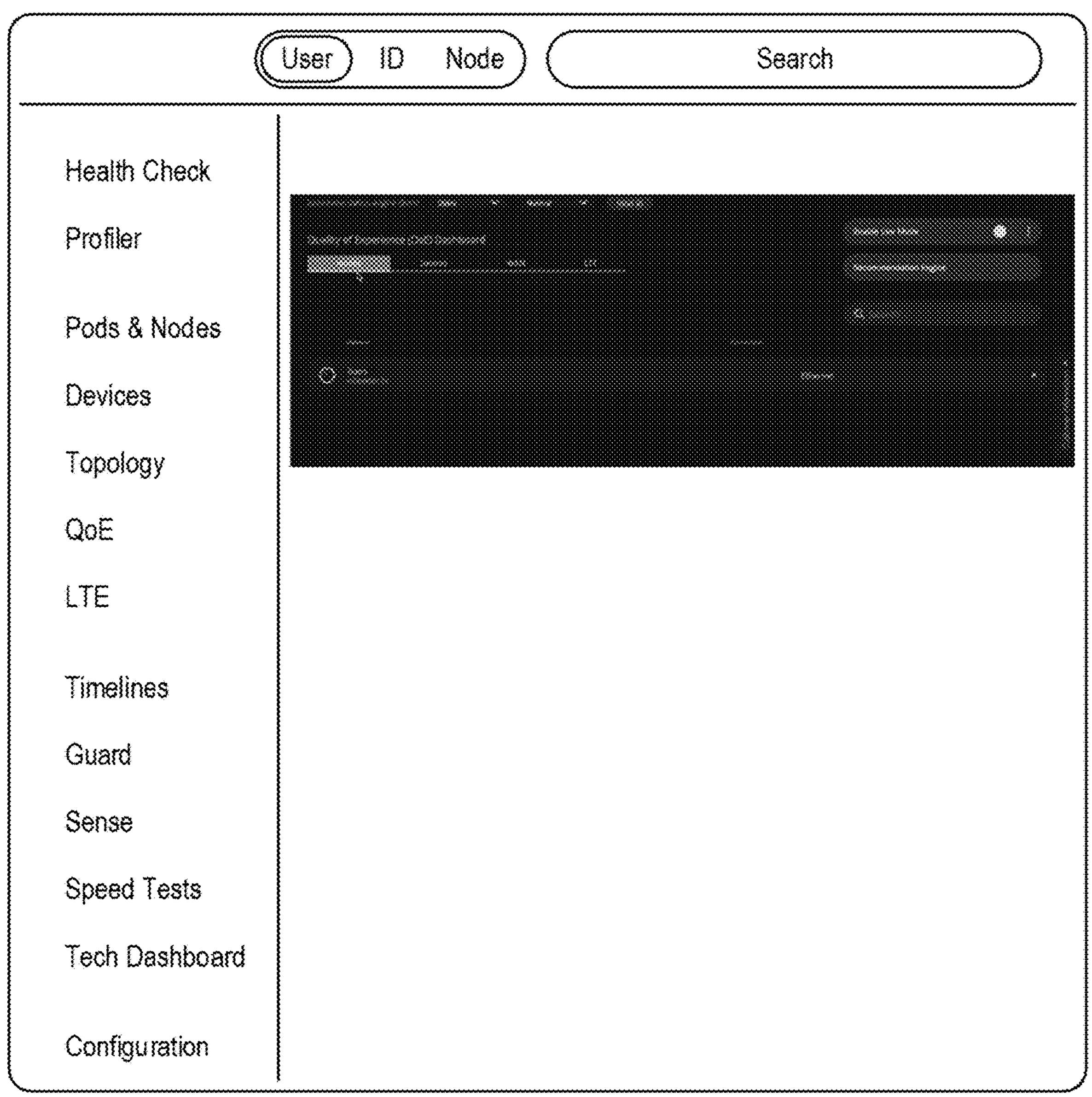
FIGS. 53-55 are screenshots of the NOC dashboard of FIG. 51 showing a customer view of metrics of a customer Wi-Fi system selected from a plurality of Wi-Fi systems of the network.
Figure 54:
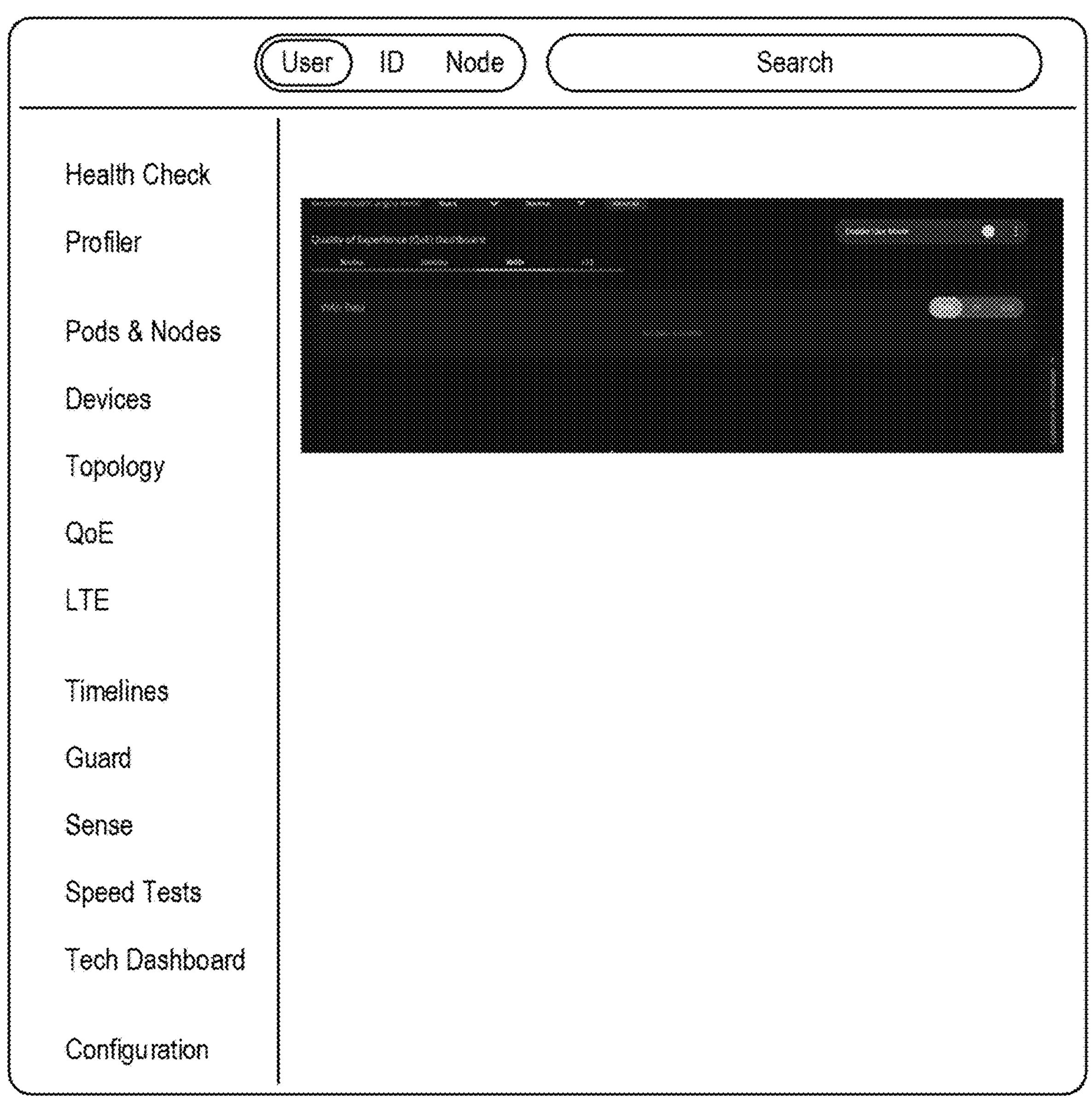
Figure 55:
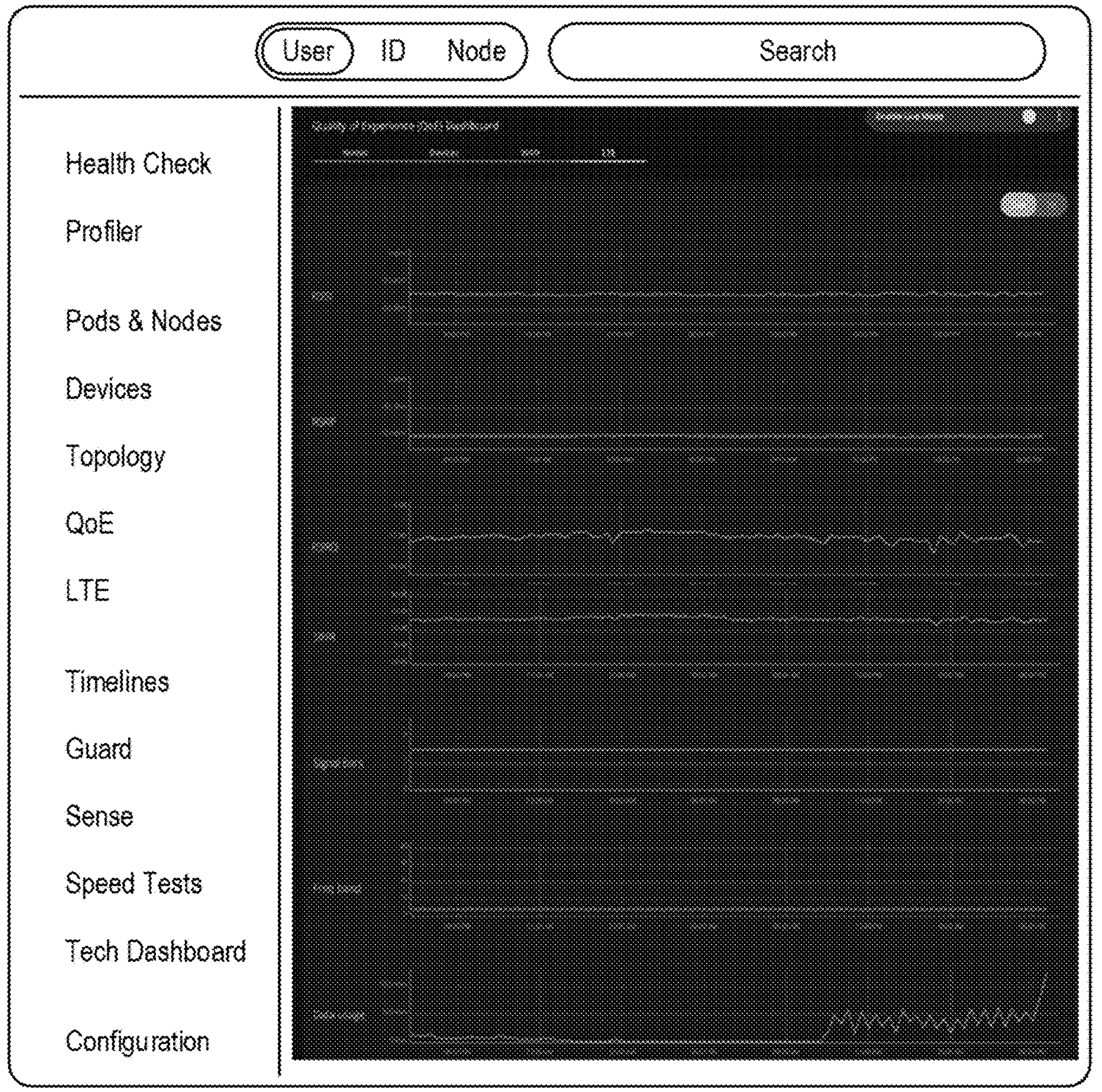

FIGS. 53-55 are screenshots of the NOC dashboard of FIG. 51 showing a customer view of metrics of a customer Wi-Fi system selected from a plurality of Wi-Fi systems of the network. For example, these displays may be provided when the support agent selects the QoE tab from the panel on the left side of the dashboard. When the QoE dashboard is selected, option tabs are shown in the main display area of the dashboard. The option tabs, for example, may include Nodes, Devices, WAN, LTE. If the WAN tab is selected, for example, the display shown in FIG. 52 may be shown. If Nodes or Devices are selected, information obtained from UE and/or CPE at a customer's premises may be displayed in a suitable format.

Furthermore, the QoE screen includes an option that allows the support agent to view the information or metrics in a regular mode in which data is obtained once every minute, which provides an adequate general status report of the devices on the network. However, the support agent may optionally select a "Live Mode" or "Troubleshooting Mode" that is configured to cause the network to obtain data at a finer resolution (e.g., parameters received once every second). The Live Mode thereby allow the support agent to get a real-time view of what is happening at a customer residence to be able to better troubleshoot any issues that may exist. Also, in some embodiments, the dashboard may allow the support agent to resolve some of these issues by remotely forcing changes in the system in an attempt to correct the problems.

In particular, FIG. 53 shows the selection of the Nodes tab. In this example, the Nodes in the customer Wi-Fi system shows one node identified as "Stairs" representing a device that has Ethernet connection (e.g., to the network, Internet, cloud, etc.). FIG. 54 shows the selection of the WAN tab, which does not include any available information in this example. The WAN display may include user-selected buttons for allowing the support agent to select 24 h, 7 d, 30 d, etc., to view the network data over a 24-hour period, over a weekly period (e.g., seven days), or over a monthly period (e.g., 30 days). Also, FIG. 55 shows the selection of the LTE tab.

When the LTE tab is selected by the support agent, the dashboard of FIG. 55 shows various parameters of the cellular system at the customer's premises. Again, mobile devices utilized at the customer's premises may initially be configured to operate over Wi-Fi through a gateway device (e.g., Access Point Name (APN) device, etc.) for operations according to Ethernet communications protocols and cellular communications protocols via the gateway.

The app and/or systems associated with the LTE dashboard may include monitoring equipment to pull stats from smart phones and/or other mobile devices from the same customer Wi-Fi system (e.g., within a customer's home). The support agent may be configured to view this dashboard to get an understanding of service level of alternative carriers in the same area. Also, the support agent may remotely control the customer's equipment (or instruct the customer to perform certain actions) to make changes as needed to fix various issues. For example, some changes to the local Wi-Fi system may include configuring or reconfiguring an APN device. Changes may also include specifying a SIM profile or which SIM is to be in use, setting primary vs. secondary SIM profiles, etc. Also, the support agent may set a throttle on the amount of traffic allowed, which could be implemented in a Wi-Fi portion, even though the intent may be to limit cellular traffic. The dashboard may also enable the support agent to change settings per location and change views between a stats display and an aggregated dashboard display across an entire network.

As shown in FIG. 55, the LTE dashboard shows various parameters monitored over time according to the selected time period (e.g., 24 hour, 7 day, 30 day, etc.). In the illustrated example, the 24-hour period is shown from about 6 am on a first day to about 6 am on the next day. The LTE dashboard include graphs of RSSI, RSRP, RSRQ, SINR, the number of "signal bars," the frequency band, and data usage. In other embodiments, the LTE dashboard may include fewer or more of these parameters on the display.

Figure 56:
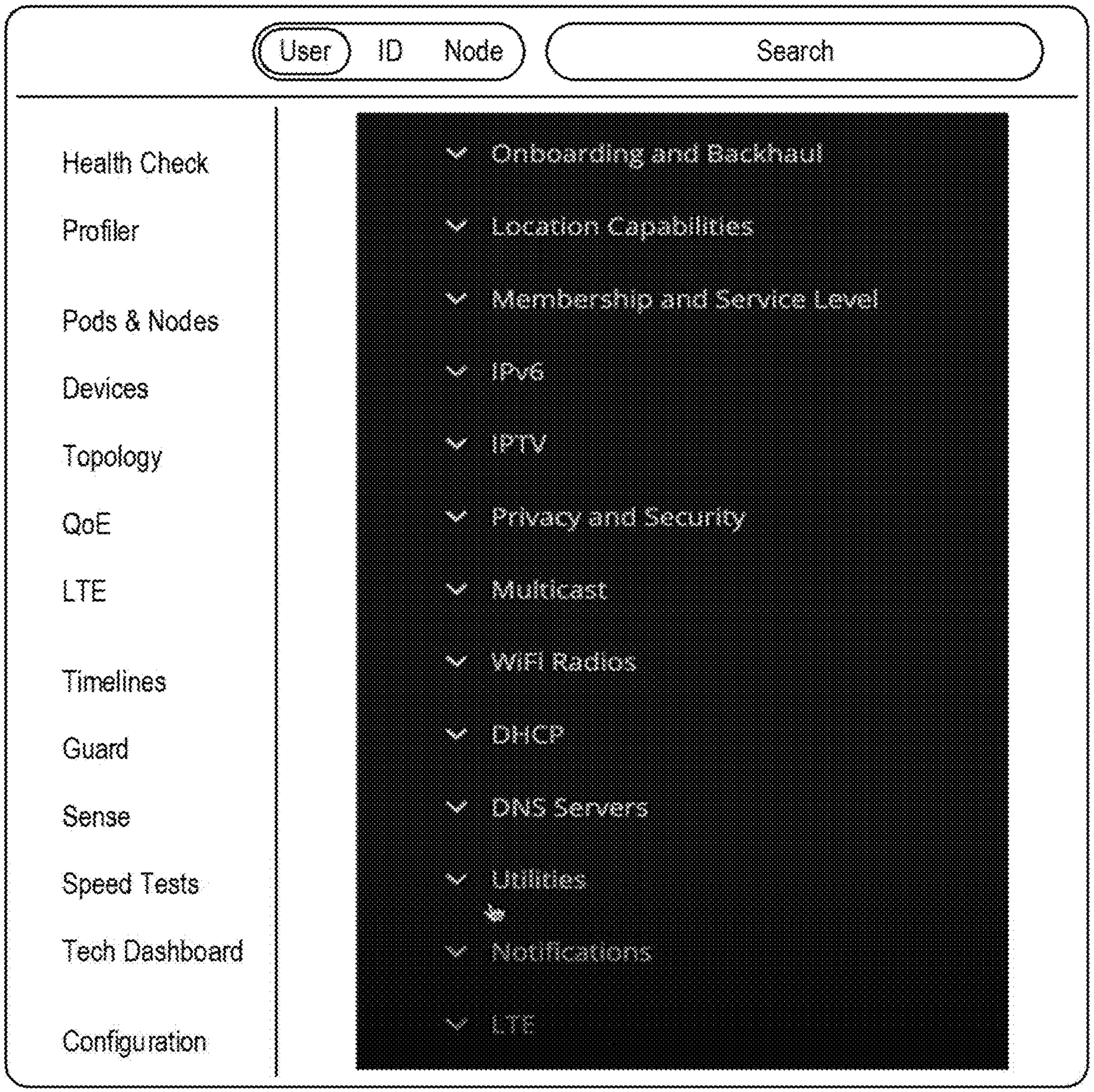
FIG. 56 is a screenshot of the NOC dashboard of FIG. 51 showing a Quality of Experience (QoE) mode with QoE metrics of the network.

FIG. 56 is a screenshot of the dashboard when the support agent selects the Configuration tab from the panel on the left side of the dashboard shown in FIG. 51. As a result of selecting the Configuration mode in the NOC dashboard, the display shows options that the support agent can select to configure a Wi-Fi system. Again, when a person calls up or contacts the support agent in some way, the support agent is able to bring up the view of that customer's local Wi-Fi system and then enter configuration settings as appropriate. Also, the support agent (or network administrator) may utilize the NOC dashboard to view system-wide operation statistics and make network-wide configuration changes as needed as well.

When QoE mode is selected, the dashboard as shown in FIG. 56 may provide a single support tool that shows Wi-Fi and cellular status. The QoE mode shows a unified QoE stat that includes cellular broadband and Wi-Fi in the customer system (e.g., in the home Wi-Fi sub-network). In some embodiments, the dashboard app may be configured to process the Wi-Fi and cellular information in a way to make it easier for the support agent to make a reasonable comparison. For example, the app can align the separate stats for QoE with respect to Wi-Fi and cellular, such as by using similar scaling and/or thresholds. Also, the support agent may be able to use the Live Mode, as mentioned above, which shows data obtained per second and can be a better way to troubleshoot the system. Moreover, the dashboard can display various graphs and/or data regarding QoE parameters during a transition from Wi-Fi to cellular during a failover event in which the lower-power Wi-Fi system is unavailable for a mobile device (e.g., out of range, congested with other traffic, etc.) and the mobile device switches over to the higher-power operation of cellular service using cell towers and satellites.

As illustrated in the example of FIG. 56, the main display area of the dashboard may show various options that can be selected in the Configuration mode. For example, the options may include Onboarding and Backhaul, Location Capabilities, Membership and Service Level, IPv6, IPTV, Privacy and Security, Multicast, Wi-Fi Radios, DHCP, DNS Servers, Utilities, Notifications, LTE, Agent Integration, etc.

Figure 57:
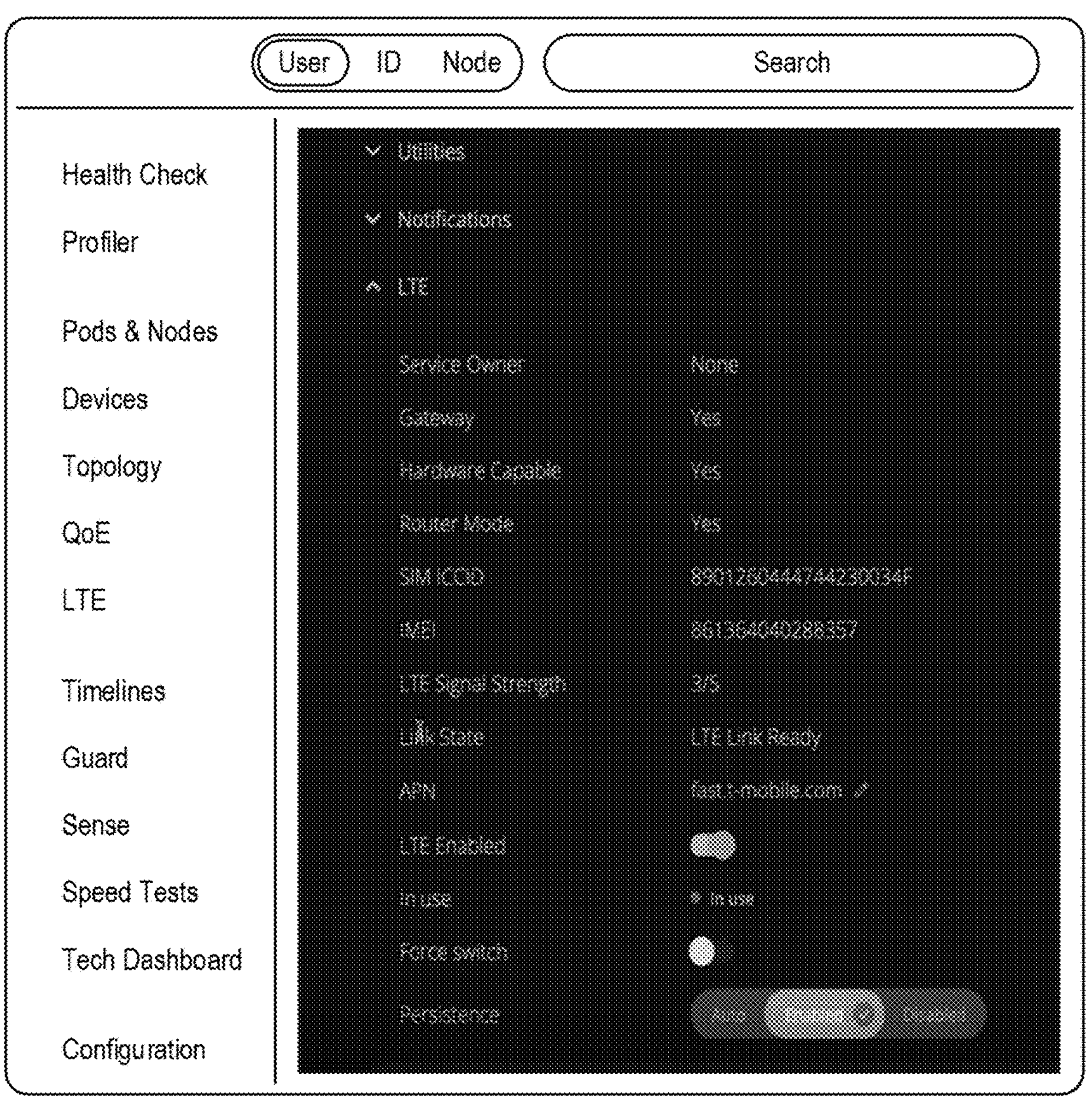
FIG. 57 is a screenshot of the NOC dashboard of FIG. 51 showing the QoE mode of FIG. 56 with QoE metrics of an LTE portion of a customer Wi-Fi system.

FIG. 57 is a screenshot of a screen or display that is shown when the LTE option shown in the Configuration mode of FIG. 56 has been selected. Thus, the screen of FIG. 57 enables the support agent to change or configure LTE settings for the customer's local Wi-Fi system. For example, the support agent may have the ability to configure certain categories, such as Service Owner, Gateway, Hardware Capable, Router Mode, SIM ICCID, IMEI, LTE Signal Strength, Link State, APN, LTE Enabled, In Use, Force Switch, Persistence, etc.

Locations in Alarm

In addition to the parameters and options shown in FIGS. 51-57, the dashboards, display screens, user interfaces, etc. may be configured to show "alarm" conditions on a network scale, in a common sub-network (e.g., common geo area, common service provider, etc.), and/or on an individual customer scale. The alarms can be broken down into categories related to how the alarms were detected, such as performance-based triggers, operational-based triggers, and configuration-based triggers.

A. Performance-Based Alarms

Again, various QoE characteristics may analyzed to determine if certain factors are detected as being outside acceptable ranges. For example, if the RSRP value indicates that the customer devices are operating in a "poor" range (e.g., less than −120 dBm), then an alarm state may be triggered. For example, the performance-based alarms may show when the number and/or percentage of locations (e.g., local Wi-Fi systems) within a daily window has an unacceptable QoE value or score.

In one embodiment, the QoE score may be defined by the table below:

| QoE Ratio | QoE Score |
|---|---|
| 0.00 to 0.75 | 1 |
| 0.75 to 1.25 | 2 |
| 1.25 to 2.00 | 3 |
| 2.00 to 4.00 | 4 |
| >4.00 | 5 |

where the "QoE ratio" may be equal to the ratio of estimated throughput (e.g., estimated using values of the RSRQ, SINR, etc.) to the actual throughput (e.g., Tx/Rx bytes through cellular gateway per second). This ratio may be calculated and can then be used to represent the QoE score.

If the QoE score is less than a certain value (e.g., two), then the QoE-based or performance-based alarm may be triggered.

Another performance-based alarm may include the detection of zero traffic or the number and/or percentage of locations with a daily Tx/Rx byte count of zero. Another alarm may include a "weak signal strength" alarm based on the number and/or percentage of locations with daily RSRP value of less than a certain threshold (e.g., −115 dBm). Performance-based alarms may also include "weak signal quality" alarms that are related to the number and/or percentage of locations with daily RSRQ value of less than a certain threshold (e.g., −15 dB). Also, a "weak SINR value" alarm may be raised, such as if the number and/or percentage of locations has daily SINR values of less than a certain threshold (e.g., 0 dB).

Still more performance-based alarms may include a detection of LTE failover usage and raising an alarm if the number or percentage of locations has a daily LTE failover usage greater than 5 minutes. Also, LTE failover events>1 may indicate that the number or percentage of locations has daily LTE failover events greater than one. Furthermore, a "slow throughput" alarm may represent a situation where the number or percentage of locations with daily LTE downlink throughput is less than a certain limit (e.g., <30 Mbps). Also, a "no cellular coverage" may represent when the number or percentage of locations with no cellular signal is greater than a certain limit. A "low signal bars" alarms may represent when the signal strength (in unit-less "signal bars") is below two signal bars in a certain number or percentage of locations. Also, an "average ISP outage event duration" alarm is another performance-based alarm that may be raised if the duration exceeds a certain acceptable limit.

B. Operational-Based Alarms

Alarm conditions based on operational data may include a number of different scenarios. For example, operational-based alarms may include a certain number or percentage of offline locations exceeding a threshold. These alarms may also include the number or percentage of CPE devices that are outside a geofence or not on one or more preferred whitelist (allowed) CGIs, and/or when there is no CGI preferred whitelist generated for a CPE.

C. Configuration-Based Alarms

Configuration-based alarms may include a "no SIM" alarm if the number or percentage of CPE of locations without cellular SIMs exceeds a predetermined threshold. This alarm may also be raised if there is a "registration failure," such as if the number and/or percentage of locations with failed LTE registration exceeds a limit. Also, another configuration-based alarm may be based on CPE not claimed in association with a customer account.

Performance Analytics

The distribution of various cellular metrics can be used by the dashboard app or program to analyze various operating percentiles. For example, network performance may be analyzed and presented on the dashboard in response to a request from the support agent. The performance of the network and/or portions of the network may include:

1. RSRP Distribution
2. RSRQ Distribution
3. SINR Distribution
4. Signal Bars Distribution
5. Downlink Throughput Distribution
6. Round-trip-time (msec
7. #Connected Devices Distribution
8. Serving Primary Frequency Band Distribution
9. Serving Primary Frequency Bandwidth and/or other distribution characteristics.

Offender Locations

Cellular metrics from each of a plurality of local Wi-Fi systems and/or a plurality of UE or CPE at the Wi-Fi systems may be obtained. From the cellular metrics, the dashboard app or program associated with monitoring and processing metrics may include analysis of the metrics to determine top and bottom performing locations with respect to these cellular metrics. For example, this analysis may include the detection of:

1. Top/Bottom RSRP Locations
2. Top/Bottom RSRQ Locations
3. Top/Bottom Downlink Throughput
4. Top/Bottom SINR
5. Top/Bottom RTT and/or other factors.

Geo Metrics

Metrics related to geo fencing of CPE, based on authorized location and cellular signals, may include:

1. A combination of the following time-series datasets
    a. the number and/or percentage of CPE devices that report to the network but are not permitted to have service and/or are shut down;
    b. the number and/or percentage of CPE devices that report to the network but are outside of the geo location fence; and
    c. the number and/or percentage of CPE devices that report to the network but are not connected to any preferred CGI unique ID.
2. Number or percentage of CPE devices that were changed to connect to a different CGI by a Wi-Fi cloud service as a result of high congestion on one or more of a given group of preferred CGIs.
3. Number or percentage of CPE devices that do not have any preferred CGI list available.
4. Number or percentage of CPE devices that have a CGI preferred list but are not connected to any of the CGIs in that list.
5. Number or percentage of CPE devices that have a CGI preferred list, but all CGIs in the list suffer from high congestion.

Therefore, according to various implementations, the systems and methods of the present disclosure are configured to provide useful dashboard, user interface, Graphical User Interface (GUI), or display screens that present information for a support agent, network administrator, technician, IT personnel, etc., such as those performing support and/or troubleshooting services for Wi-Fi customers. For example, the support personnel may be operating from any suitable location that allows a view of operations on a network, such as at a NOC, Network Management System (NMS), etc.

In some implementations, the systems and methods may be configured to obtain Wi-Fi metrics and cellular metrics from the network. Then, the systems and methods may display a dashboard on a user interface (for use by a support agent at a NOC). Finally, the systems and methods generally are configured to display the Wi-Fi metrics and cellular metrics on the dashboard.

According to more detailed embodiments, the implementations may include performing the step of displaying a network-wide view of the Wi-Fi metrics and cellular metrics on the dashboard. Alternatively, the dashboard-related procedures may include the step of displaying a customer view on the dashboard, wherein the customer view illustrates Wi-Fi metrics and cellular metrics of a customer Wi-Fi system of a plurality of Wi-Fi systems of the network.

The dashboard may be used by the support agent when a customer calls for assistance. The support agent can see the customer's specific Wi-Fi system, including metrics, statistics, status of the Wi-Fi system. This data may be received, in some cases, from the customer devices only (e.g., gateway devices, UE, access points, etc.) and not from the infrastructure components. These metrics can help the support agent debug any issues on the customer premises. In some implementations, however, the data may be received from infrastructure components as well and/or may be received from a fixed wireless/Wi-Fi access device or gateway in a Wi-Fi network to obtain UE or CPE information in the Wi-Fi network. This may include customer device not including mobile devices. Optionally, metrics may be obtained from UE and cellular infrastructure components in the Wi-Fi network.

The systems and methods may include calculating certain values from the raw data to determine the status of certain devices or portions of the network. For example, this may include the calculation of unified/combined QoE measurements based on both cellular and Wi-Fi quality. The calculation may also include using a scaling process to automatically align and provide a comparison between the Wi-Fi and the cellular metrics. The systems and methods may also calculate correlations in performance issues among multiple Wi-Fi networks for multiple customers.

The dashboard may include a normal mode that shows metrics monitored per minute and/or a troubleshooting mode that shows metrics monitored per second in real-time. The metrics (and changes) may show parameters obtained during a failover event from Wi-Fi to cellular.

In some embodiments, the systems and methods may be based on certain states or conditions, such as if a system or device is within a geo area, is associated with a specific base station or tower, uses a certain band, uses a certain service provider, uses an LTE or a 5G mode, the specific aggregation level, mmWave vs. sub-6 GHz frequency, gateway type, Wi-Fi or cellular channels used (and corresponding frequencies), or others.

In response to viewing network metrics and receiving alarms regarding the metrics being outside acceptable limits, the support agent may be able to utilize the dashboard or an associated control system for performing actions in the network to resolve any issue or to change configurations or settings to improve the operating characteristics or optimize the systems. For example, in response to various metrics, the support agent can a) configure an APN on the Wi-Fi network, b) configure SIM profiles, c) set a throttle on the amount of traffic allowed over wired portion of the Wi-Fi network, d) set a throttle on the amount of traffic allowed over cellular portion of the Wi-Fi network, e) move from 5G to LTE to Ethernet access, f) force reset of cellular connection, etc.

Also, as mentioned above, the dashboards or displays may be grouped in different ways. For example, the dashboards may be configured to group the metrics and/or the devices within groups of sub-systems by a) a summary or high-level view, which may show daily status of UE, b) alarms, c) analytics, d) lowest performing offenders with respect to location of cellular metrics, where "offenders" refer to those locations where predetermined acceptable thresholds or ranges are not met, e) geography, etc.

The NOC dashboard is meant to show the same cadence (e.g., time period over which data is displayed) of cell metrics as is shown for Wi-Fi. When a support agent first opens up the dashboard, the time-series data may be shown over a certain interval of time (e.g., 15 minutes, 30 minutes, etc.), which may include most of the cellular metrics that may be needed to properly analysis a Wi-Fi system. In the QoE page, the display may show RSSI, RSRP, RSRQ, SINR, cellular bandwidth, frequency band, signal bars associated with the current traffic, etc. The dashboard, as mentioned above, may show various levels of granularity (e.g., data per unit time) for both Wi-Fi and cellular metrics. The support agent can change among the various levels (e.g., dataset every one minute, every one second, etc.). For example, time-series datasets obtained every second may be used for troubleshooting and can be referred to as Super Live Mode. Also, in addition to showing data over a time interval, the data may be shown in real-time (e.g., Live Mode). The support agent may be able to see real-time time-series data of what is happening on equipment at a customer's location.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having computer-readable programming code stored thereon for enabling a processing device to perform steps of:

obtaining Wi-Fi metrics and cellular metrics from a network, the cellular metrics corresponding to metrics of the network operating during a failover from Wi-Fi operation to cellular operation, the failover being triggered by a failover event, the failover event corresponding to a failure condition in Wi-Fi service;

displaying a dashboard on a user interface for use by a support agent at a Network Operations Center (NOC); and displaying both the Wi-Fi metrics and the cellular metrics on the dashboard, the display corresponding to the failover event from the Wi-Fi operation to the cellular operation, the display of both the Wi-Fi metrics and the cellular metrics being according to a troubleshooting mode in which a set of parameters is monitored at a granularity of the set of parameters per a unit of time, the set of parameters comprising at least one Wi-Fi parameter and at least one cellular parameter.

2. The non-transitory computer-readable medium of claim 1, wherein the processing device is further configured to perform the step of displaying a customer view on the dashboard, the customer view illustrating local Wi-Fi metrics and local cellular metrics of a customer Wi-Fi system selected from a plurality of Wi-Fi systems on the network.

3. The non-transitory computer-readable medium of claim 2, wherein the processing device is further configured to receive the local Wi-Fi metrics and the local cellular metrics from User Equipment (UE) associated with the customer Wi-Fi system, the UE including one or more of a gateway device configured to connect the customer Wi-Fi system with the network and Customer Premises Equipment (CPE) configured in the customer Wi-Fi system.

4. The non-transitory computer-readable medium of claim 3, wherein the UE further includes one or more mobile devices configured to communicate via the customer Wi-Fi system.

5. The non-transitory computer-readable medium of claim 3, wherein, in response to the support agent receiving a customer request from a customer associated with the customer Wi-Fi system, the processing device enables the support agent to debug the UE on the customer Wi-Fi system.

6. The non-transitory computer-readable medium of claim 2, wherein the processing device is further configured to display Quality of Experience (QoE) parameters on the dashboard, the QoE parameters associated with one or more of Wi-Fi quality and cellular quality on the customer Wi-Fi system.

7. The non-transitory computer-readable medium of claim 6, wherein the QoE parameters include one or more of a Received Signal Strength Indicator Indictor (RSSI) value, a Reference Signal Received Power (RSRP) value, a Reference Signal Received Quality (RSRQ) value, and a Signal-to-Interference-plus-Noise Ratio (SINR) value.

8. The non-transitory computer-readable medium of claim 1, wherein the processing device is further configured to perform the step of displaying a network-wide view of the network on the dashboard, the network-wide view showing the Wi-Fi metrics and the cellular metrics of a plurality of Wi-Fi systems of the network.

9. The non-transitory computer-readable medium of claim 8, wherein the processing device is further configured to display Quality of Experience (QoE) parameters on the dashboard, based on network-wide Wi-Fi quality and cellular quality.

10. The non-transitory computer-readable medium of claim 8, wherein the processing device is further configured to:

determine correlations in performance issues among the plurality of Wi-Fi systems; and display parameters of the correlations based on one or more of predetermined geographical areas, associated base stations or towers, frequency bands in use, service providers, LTE or 5G operational mode, aggregation level, mmWave vs. sub-6 GHz frequency operation, gateway type, and Wi-Fi or cellular channels used.

11. The non-transitory computer-readable medium of claim 1, wherein the processing device is further configured to enable the support agent to perform one or more actions in response to the Wi-Fi metrics and the cellular metrics, and wherein the one or more actions include a) configuring an Access Point Name (APN) with respect to Wi-Fi operation or cellular operation, b) configuring Subscriber Identifier Module (SIM) profiles, c) setting a throttle on an amount of traffic allowed over a wired portion of the Wi-Fi network, d) setting a throttle on an amount of traffic allowed over a cellular portion of the Wi-Fi network, e) moving from 5G operation to LTE operation, f) moving from LTE operation to Ethernet operation, and g) forcing a reset of a cellular connection.

12. An apparatus executing a cloud-based Network Operations Control (NOC) dashboard for management of a plurality of Wi-Fi networks, the apparatus comprising:

a network interface communicatively coupled to the plurality of Wi-Fi networks via the Internet;

a processor communicatively coupled to the network interface; and memory storing instructions that, when executed, cause the processor to:

obtain Wi-Fi metrics and cellular metrics from a network, the cellular metrics corresponding to metrics of the network operating during a failover from Wi-Fi operation to cellular operation, the failover being triggered by a failover event, the failover event corresponding to a failure condition in Wi-Fi service;

display a dashboard on a user interface for use by a support agent at a Network Operations Center (NOC); and display both the Wi-Fi metrics and the cellular metrics on the dashboard, the display corresponding to the failover event from the Wi-Fi operation to the cellular operation, the display of both the Wi-Fi metrics and the cellular metrics being according to a troubleshooting mode in which a set of parameters is monitored at a granularity of the set of parameters per a unit of time, the set of parameters comprising at least one Wi-Fi parameter and at least one cellular parameter.

13. The apparatus of claim 12, wherein the processor is further configured to display a customer view on the dashboard, the customer view illustrating local Wi-Fi metrics and local cellular metrics of a customer Wi-Fi system selected from a plurality of Wi-Fi systems on the network.

14. The apparatus of claim 13, wherein the processor is further configured to receive the local Wi-Fi metrics and the local cellular metrics from User Equipment (UE) associated with the customer Wi-Fi system, the UE including one or more of a gateway device configured to connect the customer Wi-Fi system with the network and Customer Premises Equipment (CPE) configured in the customer Wi-Fi system.

15. The apparatus of claim 13, wherein the processor is further configured to display Quality of Experience (QoE) parameters on the dashboard, the QoE parameters associated with one or more of Wi-Fi quality and cellular quality on the customer Wi-Fi system, wherein the QoE parameters include one or more of a Received Signal Strength Indicator Indictor (RSSI) value, a Reference Signal Received Power (RSRP) value, a Reference Signal Received Quality (RSRQ) value, and a Signal-to-Interference-plus-Noise Ratio (SINR) value.

16. The apparatus of claim 12, wherein the processor is further configured to:

display a network-wide view of the network on the dashboard, the network-wide view showing the Wi-Fi metrics and the cellular metrics of a plurality of Wi-Fi systems of the network; and display Quality of Experience (QoE) parameters on the dashboard based on network-wide Wi-Fi quality and cellular quality.

17. A method comprising steps of:

obtaining Wi-Fi metrics and cellular metrics from a network, the cellular metrics corresponding to metrics of the network operating during a failover from Wi-Fi operation to cellular operation, the failover being triggered by a failover event, the failover event corresponding to a failure condition in Wi-Fi service;

displaying a dashboard on a user interface for use by a support agent at a Network Operations Center (NOC); and displaying both the Wi-Fi metrics and the cellular metrics on the dashboard, the display corresponding to the failover event from the Wi-Fi operation to the cellular operation, the display of both the Wi-Fi metrics and the cellular metrics being according to a troubleshooting mode in which a set of parameters is monitored at a granularity of the set of parameters per a unit of time, the set of parameters comprising at least one Wi-Fi parameter and at least one cellular parameter.

18. The method of claim 17, further comprising the step of enabling the support agent to perform one or more actions in response to the Wi-Fi metrics and the cellular metrics, wherein the one or more actions include a) configuring an Access Point Name (APN) with respect to Wi-Fi operation or cellular operation, b) configuring Subscriber Identifier Module (SIM) profiles, c) setting a throttle on an amount of traffic allowed over a wired portion of the Wi-Fi network, d) setting a throttle on an amount of traffic allowed over a cellular portion of the Wi-Fi network, e) moving from 5G operation to LTE operation, f) moving from LTE operation to Ethernet operation, and g) forcing a reset of a cellular connection.

* * * * *